(12) United States Patent
Klingenbrunn et al.

(10) Patent No.: US 8,787,172 B2
(45) Date of Patent: Jul. 22, 2014

(54) METHOD AND APPARATUS FOR QOS CONTEXT TRANSFER DURING INTER RADIO ACCESS TECHNOLOGY HANDOVER IN A WIRELESS COMMUNICATION SYSTEM

(75) Inventors: Thomas Klingenbrunn, San Diego, CA (US); Uppinder Singh Babbar, San Diego, CA (US); Srinivasan Balasubramanian, San Diego, CA (US); Shyamal Ramachandran, San Diego, CA (US); Arvind Swaminathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 644 days.

(21) Appl. No.: 12/819,314

(22) Filed: Jun. 21, 2010

(65) Prior Publication Data

US 2011/0310850 A1    Dec. 22, 2011

(51) Int. Cl.
| | |
|---|---|
| *G01R 31/08* | (2006.01) |
| *H04W 4/00* | (2009.01) |
| *H04W 36/00* | (2009.01) |
| *H04W 36/14* | (2009.01) |
| *H04L 12/56* | (2006.01) |

(52) U.S. Cl.
CPC .......... *H04W 36/14* (2013.01); *H04W 36/0044* (2013.01); *H04L 47/2408* (2013.01)
USPC ........... 370/236; 370/230; 370/329; 370/331; 455/436

(58) Field of Classification Search
CPC .................... H04W 28/0263; H04W 28/0268; H04W 36/0044; H04W 36/0027
USPC ............. 370/230, 230.1, 235, 236, 252, 328, 370/329, 331, 392, 447; 455/432.1, 436
See application file for complete search history.

(56) References Cited

U.S. PATENT DOCUMENTS

| 7,280,505 B2 | 10/2007 | Chaskar et al. |
| 7,466,703 B1 * | 12/2008 | Arunachalam et al. ........ 370/392 |

(Continued)

FOREIGN PATENT DOCUMENTS

| EP | 1531645 A1 | 5/2005 |
| EP | 1708423 A1 | 10/2006 |

(Continued)

OTHER PUBLICATIONS

Ericsson et al., "Separation of NAS signaling and PCC concepts", 3GPP Draft, S2-086394_REV-S2-086345_SDF-23401, 3rd Generation Partnership Project (3GPP), Mobile Competence Centre, 650, Route Des Lucioles, F-06921 Sophia-Antipolis Cedex, France, no. Phoenix, Sep. 24, 2008 XP050312126, [retrieved on Sep. 24, 2008].

(Continued)

*Primary Examiner* — Redentor Pasia
(74) *Attorney, Agent, or Firm* — John J. Ketchum

(57) ABSTRACT

Systems and methodologies are described herein that facilitate efficient transfer of quality of service (QoS) context during inter-radio access technology (RAT) handovers. In particular, techniques are described herein for establishing rules for whether a user equipment unit (UE) or an associated network should establish QoS for a mixed-mode application, identifying flow to bearer mappings when translating QoS across an inter-RAT handover, mapping QoS parameters of respective RATs, mitigating QoS depreciation upon multiple handovers, performing one or more actions if QoS is not acceptable in a new RAT, maintaining QoS during tunnel mode, and handling scenarios in which a UE moves between a RAT using network-initiated QoS and a RAT using UE-initiated QoS.

11 Claims, 40 Drawing Sheets

(56) References Cited

U.S. PATENT DOCUMENTS

| | | |
|---|---|---|
| 8,204,505 B2 | 6/2012 | Jin et al. |
| 2003/0035401 A1 | 2/2003 | Shaheen et al. |
| 2003/0039259 A1* | 2/2003 | Madour ................ 370/401 |
| 2003/0157935 A1 | 8/2003 | Kauhanen |
| 2004/0064555 A1 | 4/2004 | Cuny et al. |
| 2004/0198365 A1 | 10/2004 | Verma et al. |
| 2005/0163059 A1 | 7/2005 | Dacosta et al. |
| 2006/0002345 A1* | 1/2006 | Lapraye ................ 370/331 |
| 2007/0025297 A1 | 2/2007 | Lee et al. |
| 2007/0058545 A1 | 3/2007 | Nookala et al. |
| 2007/0115887 A1 | 5/2007 | Baek et al. |
| 2007/0155376 A1 | 7/2007 | Payyappilly et al. |
| 2007/0160017 A1 | 7/2007 | Meier et al. |
| 2007/0242677 A1 | 10/2007 | Shaheen et al. |
| 2008/0019275 A1 | 1/2008 | Mudireddy et al. |
| 2008/0020775 A1 | 1/2008 | Willars |
| 2008/0025263 A1* | 1/2008 | Pelkonen ................ 370/332 |
| 2009/0010156 A1 | 1/2009 | Song et al. |
| 2010/0008292 A1* | 1/2010 | Ludwig et al. ........... 370/328 |
| 2010/0035495 A1 | 2/2010 | Stijnen |
| 2010/0074109 A1 | 3/2010 | Klingenbrunn et al. |
| 2010/0202291 A1 | 8/2010 | Synnergren et al. |
| 2010/0284278 A1* | 11/2010 | Alanara ................ 370/235 |
| 2011/0035495 A1* | 2/2011 | Ekstrom et al. .......... 709/225 |
| 2011/0310737 A1 | 12/2011 | Klingenbrunn et al. |
| 2011/0310851 A1 | 12/2011 | Klingenbrunn et al. |

FOREIGN PATENT DOCUMENTS

| | | |
|---|---|---|
| EP | 1903801 A2 | 3/2008 |
| EP | 2007161 A1 | 12/2008 |
| JP | 2004297157 A | 10/2004 |
| JP | 2005539444 A | 12/2005 |
| WO | WO-2004028190 A1 | 4/2004 |
| WO | WO2004034592 | 4/2004 |
| WO | WO2007128343 | 11/2007 |
| WO | 2007144757 A2 | 12/2007 |
| WO | WO2009090582 A1 | 7/2009 |
| WO | WO-2010053066 A1 | 5/2010 |

OTHER PUBLICATIONS

Ericsson: "Operator Controlled QoS" 3GPP TSG SA WG2, XX, XX, No. S2-060049, Jan. 16, 2006, p. 5PP, XP007901697.
International Search Report and Written Opinion—PCT/US2010/046384, International Search Authority—European Patent Office—Feb. 8, 2011.
International Search Report and Written Opinion—PCT/US2010/046385, ISA/EPO—May 19, 2011.
Ludwig R, et al., "An evolved 3GPP QoS concept" Internet Citation May 10, 2006, pp. 388-392, XP002482553 Retrieved from the Internet: URL:http://ieeexplore.ieee.org/ie15/11096/35441 101 682842.pdf?tp=&isnumber=&arnumber=I682842 [retrieved on 2008-06-021.
Taiwan Search Report—TW099128134—TIPO—Feb. 17, 2014.

* cited by examiner

METHOD AND APPARATUS FOR QOS CONTEXT TRANSFER DURING INTER RADIO ACCESS TECHNOLOGY HANDOVER IN A WIRELESS COMMUNICATION SYSTEM

BACKGROUND

I. Field

The present disclosure relates generally to wireless communications, and more specifically to techniques for managing handover of a device between respective networks in a wireless communication environment.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

A wireless multiple-access communication system may simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-input-single-output (SISO), multiple-input-single-output (MISO), single-input multiple-output (SIMO), or a multiple-input-multiple-output (MIMO) system.

In various wireless communication network implementations, applications and/or other means for conducting wireless communication can operate according to various Quality of Service (QoS) parameters, which can specify respective requirements for the application in terms of data rates, error rates, channel quality, or the like. Accordingly, in some cases a user equipment unit (UE) and/or other suitable device in a wireless communication network, and/or the wireless communication network itself, can initiate QoS reservation procedures to facilitate communication between the UE and the network. Further, in the event that a UE initiates a handover between different radio access technologies (RATs) based on various criteria, it can be appreciated that an established QoS context corresponding to the UE may in some cases need to be transferred from one RAT involved in the handover to another RAT. Accordingly, it would be desirable to implement techniques for facilitating transfer of QoS context and/or other QoS parameters during an inter-RAT handover within a wireless communication environment in a substantially efficient manner.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise identifying at least one Internet Protocol (IP) flow and respective IP flow traffic format templates (TFTs) respectively associated with the at least one IP flow; receiving quality of service (QoS) establishment messaging from an associated network corresponding to at least one bearer and at least one bearer TFT related to respective bearers; and determining association between respective IP flows and bearers at least in part by matching IP flow TFTs to bearer TFTs.

A second aspect described herein relates to a wireless communications apparatus, which can comprise a memory that stores data relating to at least one IP flow and respective IP flow TFTs respectively associated with the at least one IP flow. The wireless communications apparatus can further comprise a processor configured to receive QoS establishment messaging from an associated network corresponding to at least one bearer and at least one bearer TFT relating to respective bearers and to determine association between respective IP flows and bearers at least in part by matching IP flow TFTs to bearer TFTs.

A third aspect described herein relates to an apparatus operable in a wireless communication system, which can comprise means for identifying one or more TFTs corresponding to respective packet flows; means for obtaining signaling from an associated network relating to QoS parameters corresponding to a specified bearer that is associated with a bearer TFT; and means for mapping one or more of the respective packet flows to the specified bearer at least in part by matching TFTs corresponding to the respective packet flows to the bearer TFT.

A fourth aspect described herein relates to a computer program product, which can comprise a computer-readable medium. The computer-readable medium, in turn, can comprise code for causing a computer to identify one or more TFTs corresponding to respective packet flows; code for causing a computer to obtain signaling from an associated network relating to QoS parameters corresponding to a specified bearer that is associated with a bearer TFT; and code for causing a computer to map one or more of the respective packet flows to the specified bearer at least in part by matching TFTs corresponding to the respective packet flows to the bearer TFT.

A fifth aspect described herein relates to a method operable in a wireless communication system, which can comprise identifying a first set of QoS parameters associated with a first radio access technology (RAT) and a second set of QoS parameters associated with a second RAT; obtaining information relating to a utilized network communication application and at least one QoS parameter in the first set of QoS parameters associated with the utilized network communication application; and mapping the at least one QoS parameter in the first set of QoS parameters associated with the utilized network communication application to at least one QoS parameter in the second set of QoS parameters independently of the utilized network communication application.

A sixth aspect described herein relates to a wireless communications apparatus, which can comprise a memory that stores data relating to a first set of QoS parameters associated with a first RAT, a second set of QoS parameters associated with a second RAT, and a network application. The wireless communications apparatus can further comprise a processor configured to obtain information relating to at least one QoS parameter in the first set of QoS parameters that is associated with the network application and to map the at least one QoS parameter in the first set of QoS parameters that is associated with the network application to at least one QoS parameter in the second set of QoS parameters independently of the network application.

A seventh aspect described herein relates to an apparatus operable in a wireless communication system, which can comprise means for obtaining information relating to a first set of QoS parameters associated with a first RAT, a second set of QoS parameters associated with a second RAT, and an application that facilitates network communication; means for identifying at least one QoS parameter in the first set of QoS parameters that relates to the application; and means for mapping the at least one QoS parameter in the first set of QoS parameters that relates to the application to at least one QoS parameter in the second set of QoS parameters independently of the application.

An eighth aspect described herein relates to a computer program product, which can comprise a computer-readable medium. The computer-readable medium, in turn, can comprise code for causing a computer to obtain information relating to a first set of QoS parameters associated with a first RAT, a second set of QoS parameters associated with a second RAT, and an application that facilitates network communication; code for causing a computer to identify at least one QoS parameter in the first set of QoS parameters that relates to the application; and code for causing a computer to map the at least one QoS parameter in the first set of QoS parameters that relates to the application to at least one QoS parameter in the second set of QoS parameters independently of the application.

A ninth aspect described herein relates to a method operable in a wireless communication system, which can comprise identifying an application that facilitates communication with an associated network; obtaining respective QoS parameters from the application that relate to respective RATs; identifying a handover of the application from a first RAT to a second RAT; and mapping at least one QoS parameter associated with the application and relating to the first RAT to at least one QoS parameter associated with the application and relating to the second RAT based at least in part on the respective QoS parameters obtained from the application.

A tenth aspect described herein relates to a wireless communications apparatus, which can comprise a memory that stores data relating to an application that facilitates communication with an associated network and a handover of the application from a first RAT to a second RAT. The wireless communications apparatus can further comprise a processor configured to obtain respective QoS parameters from the application that relate to respective RATs and to perform a mapping of at least one QoS parameter associated with the application and relating to the first RAT to at least one QoS parameter associated with the application and relating to the second RAT based at least in part on the respective QoS parameters obtained from the application.

An eleventh aspect described herein relates to an apparatus operable in a wireless communication system, which can comprise means for obtaining a set of QoS parameters from a network application that relate to respective RATs and means for mapping at least one QoS parameter in the set of QoS parameters obtained from the network application that is associated with a first RAT to at least one QoS parameter in the set of QoS parameters obtained from the network application that is associated with a second RAT.

A twelfth aspect described herein relates to a computer program product, which can comprise a computer-readable medium. The computer-readable medium, in turn, can comprise code for causing a computer to obtain a set of QoS parameters from a network application that relate to respective RATs and code for causing a computer to map at least one QoS parameter in the set of QoS parameters obtained from the network application that is associated with a first RAT to at least one QoS parameter in the set of QoS parameters obtained from the network application that is associated with a second RAT.

A thirteenth aspect described herein relates to a method operable in a wireless communication system, which can comprise identifying a user equipment unit (UE) and a QoS parameter used by the UE on a RAT; detecting exit of the UE from the RAT and re-entry of the UE to the RAT; and re-establishing QoS for the UE in response to the re-entry of the UE to the RAT based at least in part on the QoS parameter used by the UE on the RAT.

A fourteenth aspect described herein relates to a wireless communications apparatus, which can comprise a memory that stores data relating to a UE and a QoS parameter used by the UE on a RAT. The wireless communications apparatus can further comprise a processor configured to detect exit of the UE from the RAT and re-entry of the UE to the RAT and to re-establish QoS for the UE in response to the re-entry of the UE to the RAT based at least in part on the QoS parameter used by the UE on the RAT.

A fifteenth aspect described herein relates to an apparatus operable in a wireless communication system, which can comprise means for identifying a QoS parameter utilized by a network device over an associated RAT in response to the network device leaving the associated RAT via a first handover and means for establishing QoS for the network device in response to the network device re-entering the associated RAT via a second handover based at least in part on the QoS parameter utilized by the network device over the associated RAT.

A sixteenth aspect described herein relates to a computer program product, which can comprise a computer-readable medium. The computer-readable medium, in turn, can comprise code for causing a computer to identify a QoS parameter utilized by a network device over an associated RAT in response to the network device leaving the associated RAT via a first handover and code for causing a computer to establish QoS for the network device in response to the network device re-entering the associated RAT via a second handover based at least in part on the QoS parameter utilized by the network device over the associated RAT.

A seventeenth aspect described herein relates to a method operable in a wireless communication system, which can comprise obtaining information relating to a mapping relationship between QoS parameters associated with a first RAT and QoS parameters associated with a second RAT; identifying a QoS parameter utilized on the first RAT; and mapping the QoS parameter utilized on the first RAT to a QoS parameter associated with the second RAT based at least in part on the mapping relationship between the QoS parameters associated with the first RAT and the QoS parameters associated with the second RAT.

An eighteenth aspect described herein relates to a wireless communications apparatus, which can comprise a memory that stores data relating to a first RAT, a second RAT, a mapping relationship between QoS parameters associated with the first RAT and QoS parameters associated with the second RAT, and a QoS parameter utilized on the first RAT. The wireless communications apparatus can further comprise a processor configured to map the QoS parameter utilized on the first RAT to a QoS parameter associated with the second RAT based at least in part on the mapping relationship between the QoS parameters associated with the first RAT and the QoS parameters associated with the second RAT.

A nineteenth aspect described herein relates to an apparatus operable in a wireless communication system, which can comprise means for identifying a first RAT and a second RAT on which at least one application can conduct network communication; means for obtaining information relating to a mapping between respective QoS parameters for the first RAT and respective QoS parameters for the second RAT; and means for establishing QoS for the application on the second RAT at least in part by obtaining a QoS parameter for the second RAT that corresponds to a QoS parameter for the first RAT that is utilized by the application according to the mapping.

A twentieth aspect described herein relates to a computer program product, which can comprise a computer-readable medium. The computer-readable medium, in turn, can comprise code for causing a computer to identify a first RAT and a second RAT on which at least one application can conduct network communication; code for causing a computer to obtain information relating to a mapping between respective QoS parameters for the first RAT and respective QoS parameters for the second RAT; and code for causing a computer to establish QoS for the application on the second RAT at least in part by obtaining a QoS parameter for the second RAT that corresponds to a QoS parameter for the first RAT that is utilized by the application according to the mapping.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
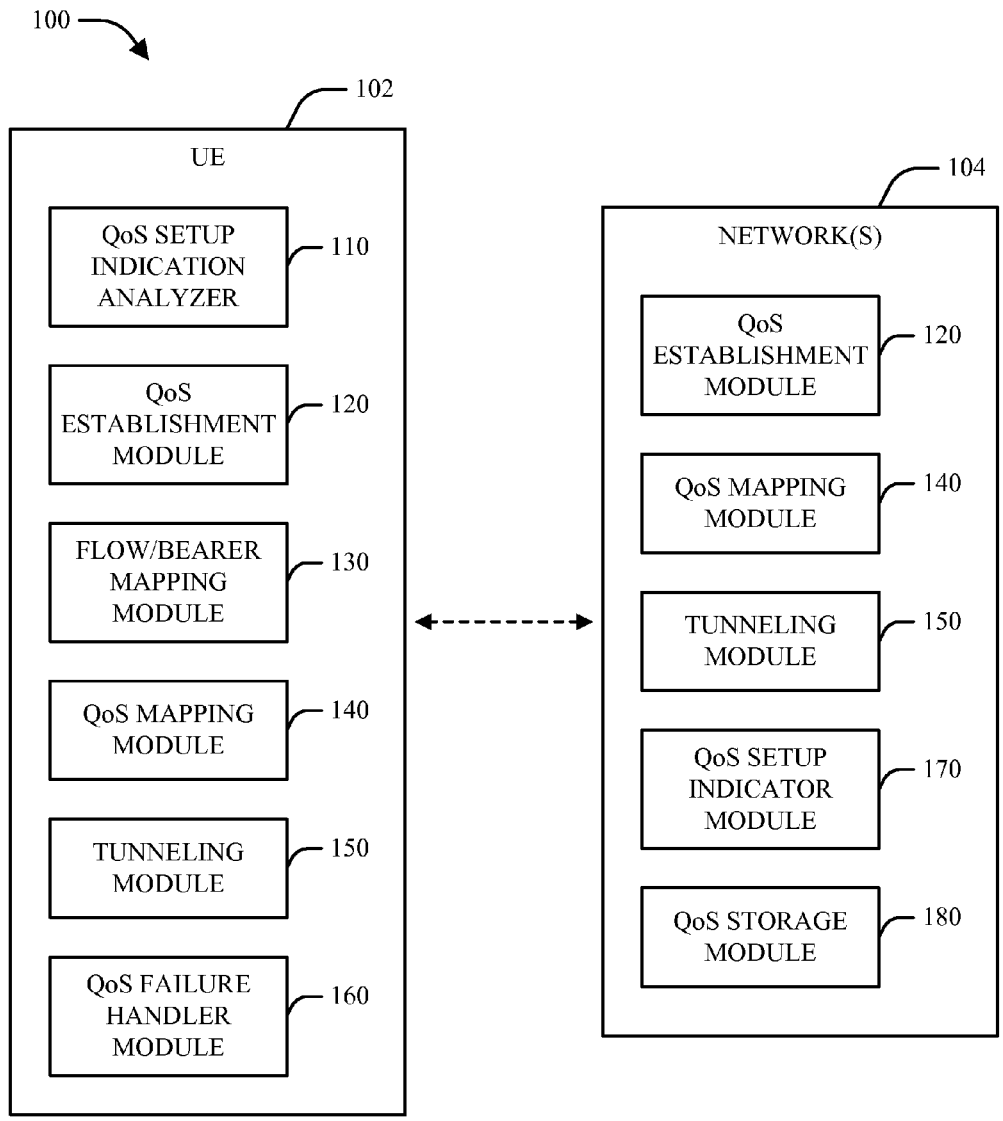
FIG. 1 is a block diagram of a system that facilitates efficient QoS context transfer with respect to an inter-RAT handover in a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or omit some or all of the devices, components, modules etc. discussed in connection with the figures. A combination of these approaches can also be used.

Referring now to the drawings, FIG. 1 illustrates a system 100 that facilitates efficient QoS context transfer with respect to an inter-RAT handover in a wireless communication system in accordance with various aspects described herein. As shown in FIG. 1, system 100 can include one or more UEs 102 (also referred to herein as mobile devices or stations, terminals, access terminals (ATs), etc.), which can communicate with one or more networks 104. In one example, respective networks 104 can operate according to various RATs, such as, for example, 3GPP LTE, High Rate Packet Data (HRPD), WiMax, WLAN, UMTS, or the like. Further, respective networks 104 in system 100 can include and/or otherwise be associated with one or more network entities, such as base stations (e.g., Node Bs or Evolved Node Bs (eNBs), cells or network cells, access points (APs), network nodes, etc.) providing communication service to respective UEs 102, network controllers, and/or other suitable network entities. In accordance with one aspect, UE 102 can engage in one or more uplink (UL, also referred to herein as reverse link (RL)) communications with network(s) 104, and similarly network(s) 104 can engage in one or more downlink (DL, also referred to herein as forward link (FL)) communications to UE 102.

In accordance with one aspect, UE 102 can be a multi-radio wireless device and/or another suitable device operable to communicate according to a plurality of RATs. Accordingly, UE 102 can be capable of communication with multiple networks 104, each of which can be associated with one or more RATs. In one example, in the event that UE 102 leaves the coverage of a network 104, requires services other than those provided by a RAT associated with a current serving network 104, and/or upon occurrence of other suitable triggering events, UE 102 and one or more networks 104 can perform a handover operation, wherein UE 102 leaves a first network 104 (herein referred to as a source network) and enters a second network 104 (herein referred to as a target network). In the event that the source and target networks 104 for the handover utilize different RATs, the handover is referred to as an inter-RAT, or IRAT, handover. With respect to the following description, it should be appreciated that, while various examples herein are provided for a handover between LTE and HRPD RATs, the techniques provided herein can be applied in the context of any inter-RAT handover between any suitable RATs. Further, unless explicitly stated otherwise, it is to be appreciated that the claimed subject matter is not intended to be limited to any specific RATs or handovers therebetween.

In accordance with another aspect, UE 102 can utilize one or more network applications for communication to network(s) 104 and/or other entities in system 100. Such applications can be associated with various QoS parameters, which can specify a minimum required performance for the application in terms of maximum bit rate (MBR), aggregated MBR (AMBR), guaranteed bit rate (GBR), channel quality (e.g., given in terms of a QoS class identifier (QCI), etc.) or the like. In one example, UE 102 can utilize QoS reservation procedures to obtain such parameters for one or more associated applications. Subsequently, an inter-RAT handover can be initiated for UE 102, at which time the QoS context corresponding to UE 102 can be configured to be transferred from the source RAT to the target RAT. Accordingly, it would be desirable to implement techniques to perform such QoS context transfer in a substantially quick manner. Further, it would be desirable to implement functionality by which UE 102 can handle cases where it is unclear whether UE 102 or a network 104 should initiate QoS. Third, in the event that QoS parameters differ between different RATs, it would be desirable to implement techniques to enable a network 104 to assign translated QoS in the new RAT based on resource availability. Fourth, it would be desirable for UE 102 to have the ability to determine whether the new QoS is acceptable or not and to take appropriate action in either case.

In the specific, non-limiting case of a handover between LTE and HRPD, various applications and/or other operations in system 100 can be configured with the option of enabling a network or a device to initiate QoS. Accordingly, it is unclear in some cases which rules UE 102 should follow to determine, e.g., whether UE 102 or network 104 should initiate QoS for a given application. It can be appreciated that initiation of QoS by both UE 102 and network 104 can result in decreased efficiency; therefore, it can be appreciated that clearly defined procedures for defining QoS are desirable.

Further, in the event that a transfer is attempted from one radio domain to another, system 100 can operate under an expectation that the source network 104 is responsible for pushing QoS to the target network 104 in a handover subsequent to setting up QoS flows and performing other such operations. Thus, in the example of an LTE to HRPD handover, QoS can be pushed from the LTE network to the HRPD network. However, in such a case the rules for continuing the QoS may be unclear due to translation between RATs. In addition, further complications can arise in the case of a handover from a network where QoS is network-initiated to a network where QoS is device-initiated, or vice versa, for which solutions are desirable.

In another specific example, it can be appreciated that different radio domains can have different rules for specifying QoS such that QoS parameters are not the same across RATs. Thus, for example, LTE can specify QoS parameters via QCI, which can be implemented as a numerated value where each value represents a differing QoS class (e.g., best-effort service, latency-sensitive service, data rate-sensitive service, etc.). In contrast, Evolved HRPD (eHRPD) can specify QoS via flow profiles or the like, which can be implemented as distinct values that indicate traffic type, required latency and/or data rate, or the like. In another contrasting example, WLAN can specify QoS via a specified number of QoS levels (e.g., 4), which can distinguish between the control part and data part of a particular flow (e.g., resulting in 8 total QoS levels, corresponding to 4 service types for control and 4 service types for data). Accordingly, due to the differing level of detail between QoS parameters utilized by different RATs and differing expectations of the respective RATs regarding how QoS values are mapped between different RATs, it can in some cases be unclear how to map QoS between RATs.

Thus, in view of at least the above, UE 102 and network(s) 104 in system 100 can utilize various techniques and/or other means for addressing the above shortcomings of QoS management in an inter-RAT handover and facilitating efficient transfer of QoS context during such a handover in accordance with various aspects. For example, a QoS setup indication analyzer 110 at UE 102 and/or a QoS setup indicator module 170 at network 104 can be utilized to define and/or apply rules for whether UE 102 or network 104 should establish QoS (e.g., via a QoS establishment module 120) for a mixed-mode operation upon an inter-RAT handover. In a second example, UE 102 can utilize a flow/bearer mapping module 130 and/or other means to determine an internet protocol (IP) bearer mapping when translating QoS across an inter-RAT handover. In a third example, UE 102 and/or network 104 can include a QoS mapping module 140 that facilitates mapping QoS parameters of different RATs. In a fourth example, UE 102 and/or network 104 can utilize a tunneling module 150 and/or other means to maintain QoS during a tunnel mode in the context of an inter-RAT handover. In a fifth example, a QoS failure handler module 160 at UE 102 can be utilized to facilitate one or more actions in the event that QoS is not acceptable in a new RAT. In a sixth example, UE 102 and/or network 104 can include a QoS storage module 180 and/or other means to avoid QoS depreciation upon multiple handovers. Various examples by which modules 110-180 and/or other suitable mechanisms associated with UE 102 and network 104 can be utilized are provided in further detail herein.

It can be appreciated that, by utilizing one or more of the techniques described herein, equivalent QoS can be continued on a target access technology after an inter-RAT handover. Otherwise, in the case of under-provisioned QoS, it can be appreciated that unsatisfactory user experience could occur, or in some cases a corresponding application could terminate the underlying service. Alternatively, in the case of over-provisioned QoS, it can be appreciated that wastage of QoS resources in the network, potential overbilling of a user, and/or other consequences could result.

Figure 2:
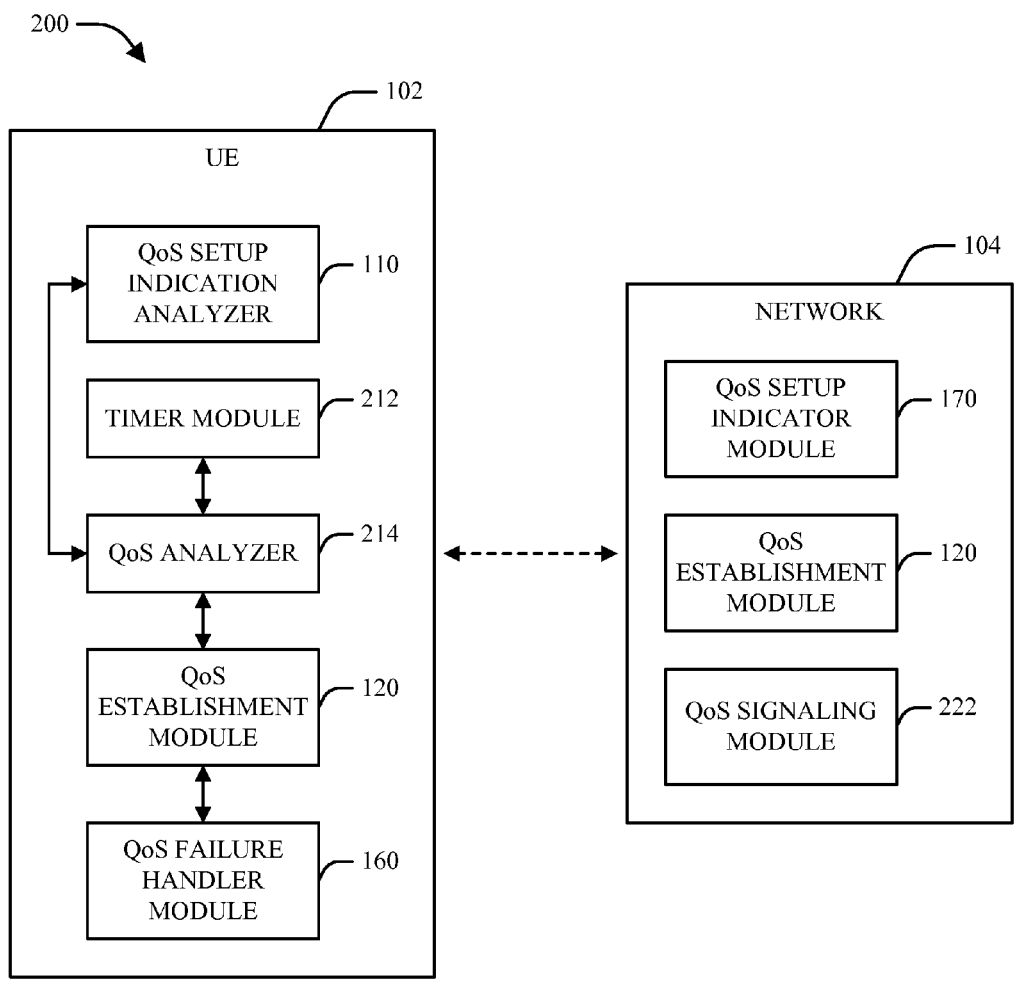
FIGS. 2-3 are block diagrams of respective systems that facilitate establishment of QoS for a mixed-mode application utilized in a wireless communication system in accordance with various aspects.

Turning next to FIG. 2, a first system 200 that facilitates establishment of QoS for a mixed-mode application utilized in a wireless communication system is illustrated. As shown in FIG. 2, system 200 can include a UE 102 and a network 104, which can communicate with each other according to one or more RATs and one or more network applications or other services. In one example, an application can be always UE initiated (e.g., a type 1 application), in which case QoS for the application is pushed from the device such that network 104 is not expected to initiate QoS. Alternatively, an application can be always network initiated (e.g., a type 2 application) such that network 104 is responsible for initiating QoS. However, for some types of applications, such as type 3 or "mixed mode" applications, it is unclear whether UE 102 or network 104 (e.g., via an application server (AS) and/or other means) is responsible for initiating QoS. Thus, in such a case both UE 102 and network 104 may try to initiate QoS, which can result in inefficiency and/or inconsistent or inaccurate QoS. By way of example, such an application can correspond to a service that uses network-controlled QoS in the home network but is configured to use UE-controlled QoS in visited networks where QoS cannot be guaranteed on the network side.

Accordingly, UE 102 and/or network 104 can utilize one or more techniques to establish rules and/or other mechanisms to determine how QoS is to be initiated for a mixed mode application. In a first example, network 104 can indicate (e.g., via QoS setup indicator module 170 or other means), using a flag and/or other mechanisms, who should be responsible for initiating QoS from among UE 102 and network 104. Thus, for example, network 104 can identify an application that facilitates communication with at least one UE 102, determine whether QoS for the application is to be network-initiated or initiated by the at least one UE 102, construct an indication of a result of the determination, and convey the indication to the at least one UE 102 (e.g., via QoS setup indicator module 170). In the event that QoS is to be established by network 104, a QoS establishment module 120 and/or other means at network 120 can be utilized to establish the QoS, and a QoS signaling module 222 or the like can be utilized to convey the established QoS to UE 102. Conversely, if QoS is to be UE-initiated, a QoS establishment module 120 or the like at UE 102 can be utilized to establish the QoS.

In one example, an indication of whether QoS is to be initiated by UE 102 or network 104 can be provided by network 104 on a per-application basis in the process of establishing QoS for an underlying application, or alternatively network 104 can provide global flags and/or other indications that provide that, for example, QoS for all applications and/or one or more classes or categories of applications will always be pushed by network 104 or never be pushed by network 104. Thus, QoS setup indicator module 170 can construct a global indication relating to whether QoS for a plurality of applications is to be network-initiated or initiated by at least one UE 102, upon which the global indication can be conveyed to the at least one UE 102, or alternatively QoS setup indicator module 170 can construct a per-application indication relating to whether QoS for the application is to be network-initiated or initiated by the at least one UE 102, based on which the per-application indication can be conveyed to the at least one UE 102.

Correspondingly, UE 102 can identify an application to be utilized for communication within system 200, receive an indication from a network 104 associated with the application relating to QoS initiation, and determine (e.g., via a QoS setup indication analyzer 110 and/or other suitable means) whether to initiate QoS for the application or to await network initiation of QoS for the application based at least in part on the indication. As described above, the indication can be a global indication relating to QoS initiation for a plurality of applications or a per-application indication relating to QoS initiation for one or more specific applications.

In accordance with one aspect, if an indication received by UE 102 provides that QoS for an application is to be mobile-initiated, UE 102 can initiate QoS for the application via QoS establishment module 120 and/or other suitable means. Alternatively, if the indication provides that QoS for an application is to be network-initiated, UE 102 can be configured to await network initiation of QoS for the application. However, it can be appreciated that in some cases where UE 102 is configured to await network initiation of QoS, network 104 may ultimately provide a QoS that is different than that required by the application. In such a case, UE 102 can utilize an internal timer, which can be controlled by a timer module 212 and/or other mechanisms, which can be utilized to trigger UE-initiated QoS setup and/or other appropriate actions if an acceptable QoS (e.g., as determined by a QoS analyzer 214, etc.) has not been set up by network 104 within a certain time. For example, UE 102 can initialize a timer in response to initiation of QoS (e.g., via a request for QoS by an application), await network initiation of QoS for the application for a length of time specified by the timer, and initiate QoS for the application if a QoS deemed acceptable for the application is not initiated by the network within the length of time specified by the timer. In a further example, in the event that UE-initiated QoS setup fails following expiration of the timer, a QoS failure handler module 160 can be utilized to notify the underlying application(s) and/or facilitate any other suitable actions for adaptation to the QoS setup failure.

Alternatively, UE 102 can be configured to always attempt initiation of QoS and to rely on network 104 to reject the QoS if network 104 elects to set up QoS itself. This is illustrated in further detail by system 300 in FIG. 3. In accordance with one aspect, UE 102 and network 104 in system 300 can operate using a trial and error approach, where there is no assumption regarding who initiates QoS. Instead, UE 102 can be configured to attempt QoS initiation in all cases, and network 104 can utilize a QoS rejection indicator module 322 and/or other means to convey a rejection to UE 102 that signifies that it will handle QoS initiation. Thus, in one example, network 104 can identifying a UE 102 and an application utilized by the UE 102 for network communication, detect attempted QoS initiation by the UE 102 with respect to the application, and communicate rejection messaging to the UE 102 in response to detecting the attempted QoS initiation by the UE with respect to the application if QoS for the application is deemed to be network-initiated. Conversely, UE 102 can attempt initialization of QoS for an application that facilitates communication with network 104, determine (e.g., using a QoS rejection analyzer 312 and/or other suitable means) whether a QoS rejection is received from network 104, and await initialization of QoS for the application from network 104 in response to receiving a QoS rejection from network 104 based at least in part on the QoS rejection.

In accordance with one aspect, QoS rejection indicator module 322 and/or other suitable mechanisms at network 104 can configure rejection messaging to indicate a "soft reject" or a soft QoS rejection in order to indicate that network initiation of QoS will be performed. For example, a special reason code can be utilized by network 104 (e.g., within a reason code field in the rejection messaging) to indicate that a QoS rejection is a soft reject, thereby allowing such a rejection to be distinguished from a regular QoS reject by UE 102. For example, QoS rejection analyzer 312 and/or other mechanisms associated with UE 102 can determine whether a QoS rejection received from network 104 includes at least one field indicating a soft rejection and facilitate awaiting initialization of QoS for the application from network 104 in response to receiving a QoS rejection from network 104 that includes at least one field indicating network initiation of QoS.

In accordance with another aspect, when UE 102 receives a soft reject message as described above, a timer module 212 and/or other suitable timer mechanism can be used by UE 102 to allow network 104 some time to set up the QoS. If network 104 does not set up QoS within the time specified by the timer, UE 102 can (e.g., via QoS failure handler module 160) notify the underlying application that no QoS is available, initiate QoS on its own, and/or take any other suitable action(s). For example, upon communicating rejection messaging to UE 102, network 104 can be configured to initiate QoS for an application within a predetermined time interval. Correspondingly, UE 102 can initialize a timer corresponding to the predetermined time interval and await initialization of QoS for the application from network 104 in response to receiving a QoS rejection from network 104 for the predetermined time interval corresponding to the timer. Subsequently, if it is determined that initialization of QoS deemed acceptable for the application has not been performed by network 104 upon expiration of the predetermined time interval corresponding to the timer, UE 102 can re-attempt initialization of QoS for the application, notify the application that QoS is not available for the application, and/or perform other suitable actions.

Figure 3:
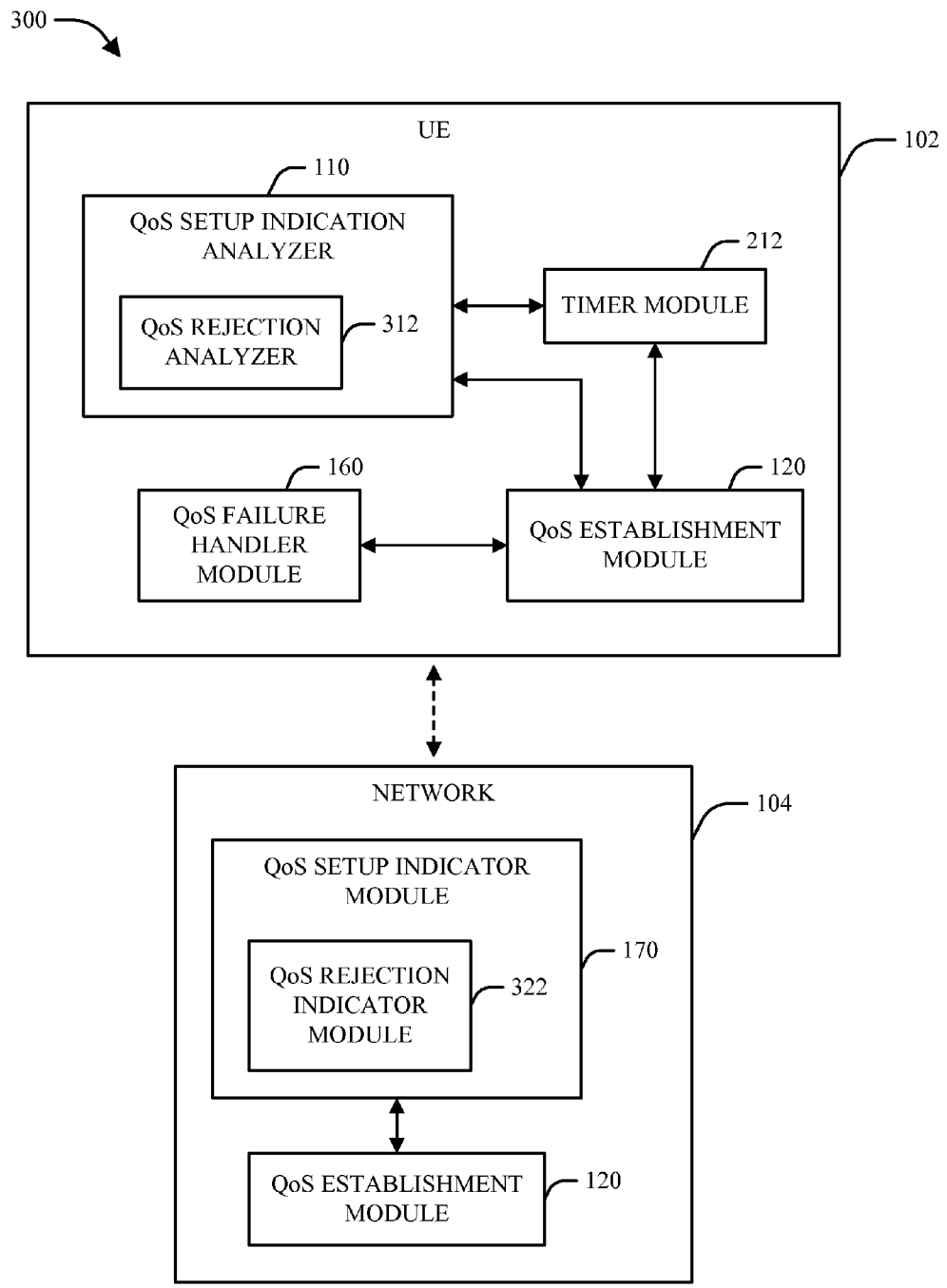

Accordingly, as illustrated by FIGS. 2-3, UE 102 can leverage timer module 212 in various manners. For example, timer module 212 can be utilized to implement a timer based on a soft reject, a default-activated timer, and/or any other suitable timer mechanisms. In one example, timer module 212 can be utilized to implement multiple aspects of functionality. Thus, for example, UE 102 can utilize a first timer to await initialization of QoS by network 104 and subsequently utilize a second timer to check for QoS rejection messaging while initializing QoS at UE, thereby providing a fail-safe in the case that network 104 does not support soft reject signaling or network 104 is designated to establish QoS (e.g., in the case of a network-initiated application) but fails to do so.

In accordance with another aspect, various mechanisms as illustrated by FIGS. 2-3 and/or other suitable mechanisms can be utilized to facilitate prioritization of QoS flows as used by UE 102 and/or network 104. For example, in the event that QoS flows are set up on the target side of a handover, UE 102 can be configured to associate with the target in a given priority order. Thus, an order selected for establishing QoS flows can be configured based on a priority order dictated by the relevant QoS parameters (e.g., QCI, etc.).

Figure 4:
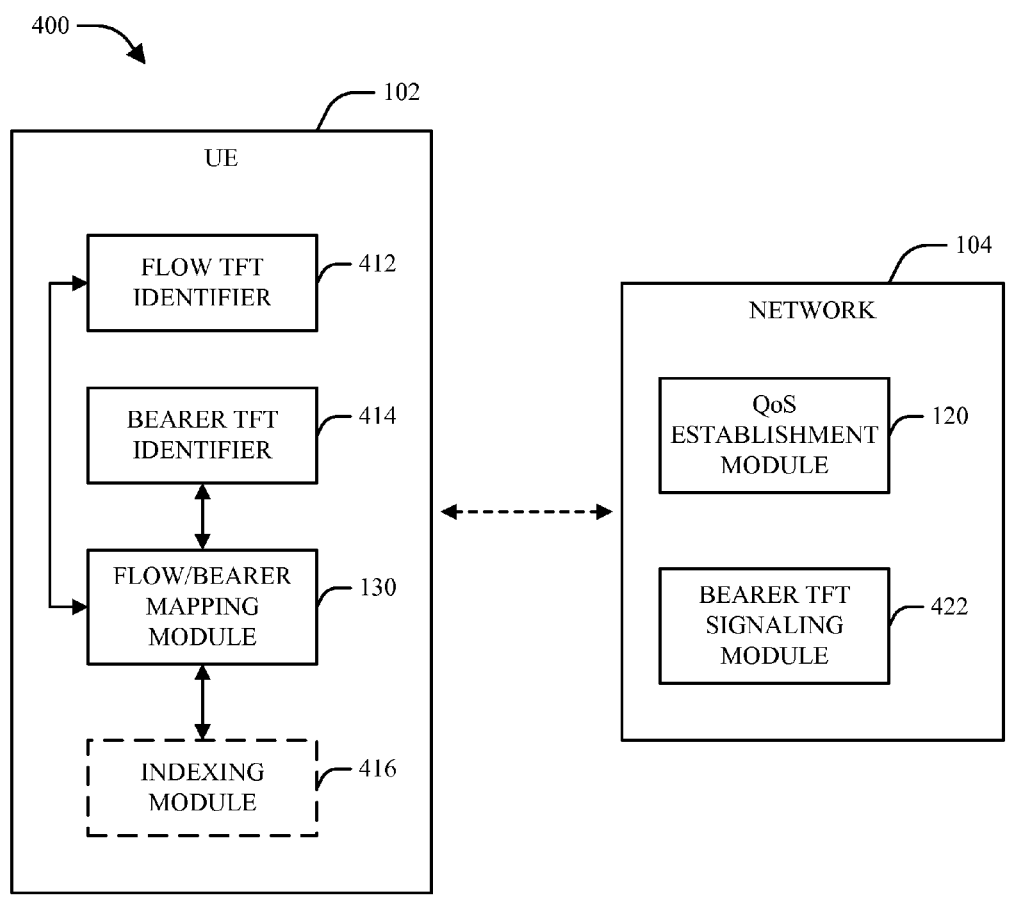
FIG. 4 is a block diagram of a system for identifying flow to bearer mappings in connection with translating QoS across an inter-RAT handover in accordance with various aspects.

Referring next to FIG. 4, a block diagram of a system 400 for identifying flow to bearer mappings in connection with translating QoS across an inter-RAT handover in accordance with various aspects is illustrated. In accordance with one aspect, an Internet Protocol (IP) flow can be characterized by a Traffic Format Template (TFT), which can be a filter that describes which packets are to be assigned to the flow. For example, a TFT can specify filter parameters such as IP and port addresses or the like, such that only packets with matching parameters will be routed onto the flow. In one example, a filter as provided by a TFT can be a unique description of a flow, which can describe the type of data that is to be applied for a given associated QoS. The associated QoS, in turn, can be given in terms of QCI, profile identifier, and/or any other identifier that indicates the characteristics of the flow. Thus, it can be appreciated that a TFT can identify a flow, and the type of the flow can be determined based on its QoS mapping. Further, a bearer can be characterized as a grouping of IP flows with the same QoS requirements. In other words, IP flows with the same QoS can generally be mapped onto the same bearer. In one example, the bearer can also have a TFT, which is the combined TFT of substantially all the IP flows mapped onto the bearer.

In accordance with one aspect, when network 104 sets up QoS (e.g., via QoS establishment module 120, etc.) after moving onto a new RAT, it can in some cases specify the bearer TFT only, using a bearer TFT signaling module 422 and/or other suitable means. Thus, UE 102 can be required to infer which IP flows are mapped onto the bearer, in order to determine if the IP flows will get the same QoS as on the old RAT.

Accordingly, UE 102 can utilize a flow/bearer mapping module 130 and/or other means to match the TFT of an IP flow with a bearer TFT (e.g., as respectively identified by a flow TFT identifier 412 and a bearer TFT identifier 414, etc.), such that the IP flow is mapped onto the bearer which will route the same packets as the IP flow TFT. Thus, for example, flow TFT identifier 412 can identify at least one IP flow and respective IP flow TFTs respectively associated with the at least one IP flow. Further, bearer TFT identifier 414 can receive QoS establishment messaging from network 104 corresponding to at least one bearer and at least one bearer TFT related to respective bearers. Based on the information identified by flow TFT identifier 412 and bearer TFT identifier 414, flow/bearer mapping module 130 can determine association between respective IP flows and bearers at least in part by matching IP flow TFTs to bearer TFTs. By way of specific, non-limiting example, QoS establishment messaging received from network 104 can correspond to an inter-RAT handover. In another specific example, a determination of respective IP flows that are associated with the bearer TFT can be performed by UE 102 in an application-independent manner. In a further example, TFT matching as performed by flow/bearer mapping module 130 can be based on full or partial TFT matches between a flow TFT and a bearer TFT. Accordingly, a matching determination as performed by flow/bearer mapping module 130 can be based on at least one of attempted detection of a substantially full match between IP flow TFTs and a bearer TFT or attempted detection of at least a partial match between IP flow TFTs and a bearer TFT.

In accordance with another aspect, TFT indexing and/or other similar operations can be performed by UE 102. For example, it can be appreciated that for each IP flow, all packets are configured to be routed to the same bearer. Accordingly, this characteristic can be exploited by UE 102 to simplify the procedure for determining a mapping by, e.g., constructing a specific packet header that matches the IP flow TFT and attempting matching of the constructed packet header against all bearer TFTs. By way of example, an IP TFT can be considered with a parameter 1 in range X and a parameter 2 in range Y. Accordingly, UE 102 can set parameter 1 and 2 to specific values and subsequently find the matching bearer TFT, as all packets from the IP flow will be mapped onto the corresponding bearer.

In accordance with a further aspect, it can be appreciated that for a mixed-mode application, the application will provide the minimum required QoS when ambiguity exists regarding the entity that is to initiate QoS. Accordingly, if the network pushes a QoS that is not acceptable based on the application profile, the application can recognize the unacceptable QoS and release the associated IP flow. Thus, in one example, UE 102 can assist an application in determining whether the QoS provided by the network is acceptable by performing TFT mapping as described above. More particularly, when network 104 pushes a specific QoS, it is not initially apparent for which application network 104 has pushed QoS, as the QoS is configured to indicate only the TFT itself and the mapping between the TFT and its respective corresponding applications may not in all cases be clear. Accordingly, the application can additionally specify TFT such that flow/bearer mapping module 130 and/or other mechanisms at UE 102 can determine which TFT(s) pushed by network 104 correspond to which application(s).

In view of the above, UE 102 can identify a QoS requirement for an application associated with a selected IP flow, compare the QoS requirement for the application associated with the selected IP flow to a QoS parameter provided within QoS establishment messaging for a bearer TFT with which the selected IP flow is associated, and release the selected IP flow if the QoS parameter provided within the QoS establishment messaging indicates a substantially unacceptable QoS for the application. In one example, the QoS requirement can be a QoS requirement provided by the application corresponding to substantially all radio access technologies (RATs) usable by the application. Additionally or alternatively, UE 102 can identify a reference QoS requirement provided by an application corresponding to a reference RAT usable by the application and map the reference QoS requirement to a QoS requirement corresponding to a RAT utilized by network 104.

Figure 5:
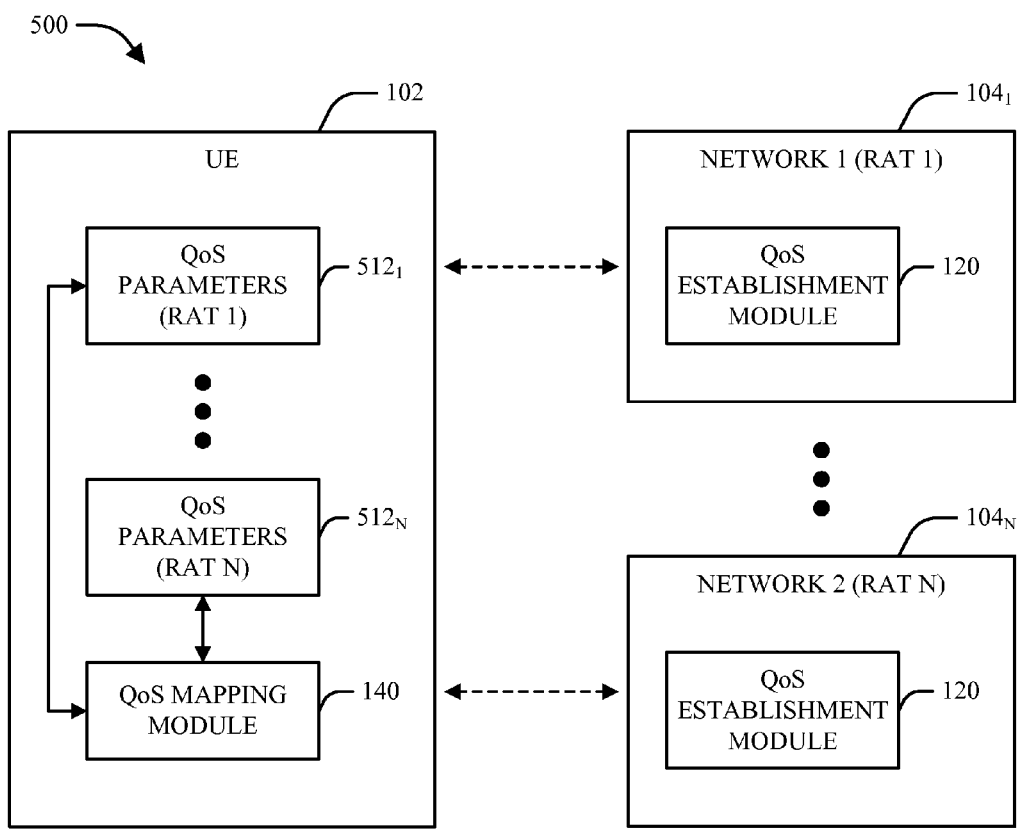
FIGS. 5-7 are block diagrams of respective systems that facilitate mapping of QoS parameters corresponding to multiple RATs in accordance with various aspects.

Turning next to FIG. 5, a system 500 that facilitates mapping of QoS parameters corresponding to multiple RATs in accordance with various aspects is illustrated. It can be appreciated that QoS parameters in some cases are not the same across RATs, and therefore it would be desirable to implement techniques by which UE 102 can map QoS parameters 512 for different RATs into parameters that are comparable. Accordingly, a QoS mapping module 140 at UE 102 can be utilized to remap QoS corresponding to multiple RATs (e.g., associated with respective networks 104) in the case of an inter-access technology handover.

Figure 6:
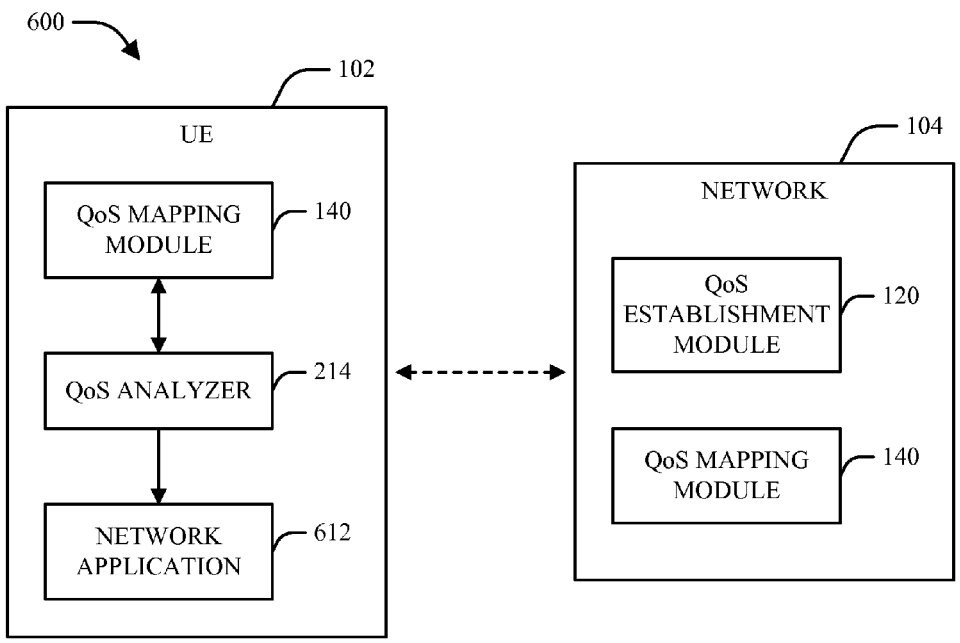

In accordance with a first aspect, QoS mapping module 140 can facilitate mapping of QoS parameters without interaction from an underlying application (e.g., within the data services layer of the protocol stack, etc.). Operation of QoS mapping module 140 in this manner is illustrated in further detail by system 600 in FIG. 6. As shown in FIG. 6, UE 102 can employ QoS mapping module 140 and/or one or more other mechanisms to identify a first set of QoS parameters associated with a first RAT and a second set of QoS parameters associated with a second RAT. Further, UE 102 can obtain information relating to a utilized network communication application, such as network application 612, and at least one QoS parameter in the first set of QoS parameters associated with network application 612. Based on this information, QoS mapping module 140 can map the at least one QoS parameter in the first set of QoS parameters associated with network application 612 to at least one QoS parameter in the second set of QoS parameters independently of network application 612. In one example, mapping of the at least one QoS parameter in the first set of QoS parameters associated with network application 612 to at least one QoS parameter in the second set of QoS parameters can be performed via software and/or any suitable mechanisms associated with QoS mapping module 140. In accordance with one aspect, mapping as performed by system 600 can be utilized for both UE- and network-initiated QoS transfer during a handover.

In one example, mapping as performed in system 600 can be performed in a similar manner by QoS mapping modules 140 respectively associated with UE 102 and network 104 in order to avoid QoS changing after multiple handovers which would potentially trigger additional QoS renegotiations. Thus, mapping of at least one QoS parameter in a first set of QoS parameters associated with network application 612 to at least one QoS parameter in a second set of QoS parameters can be performed by UE 102 in cooperation with a network entity (e.g., associated with network 104) with which network application 612 facilitates communication. In accordance with one aspect, further techniques for avoiding such additional QoS renegotiations are described in further detail herein.

In accordance with another aspect, if the QoS granted by network 104 is less than a mapped value, network application 612 can be notified and may subsequently take appropriate action. Otherwise, it can be appreciated that mapping of QoS parameters can be done in software and/or by other means transparently to network application 612. For example, as shown by system 600, a QoS analyzer 214 associated with UE 102 can determine whether at least one QoS parameter in the second set of QoS parameters obtained via the mapping described above facilitates a substantially acceptable QoS for network application 612. If the at least one QoS parameter in the second set of QoS parameters obtained via the mapping does not facilitate a substantially acceptable QoS for network application 612, QoS analyzer 214 can notify network application 612.

Figure 7:
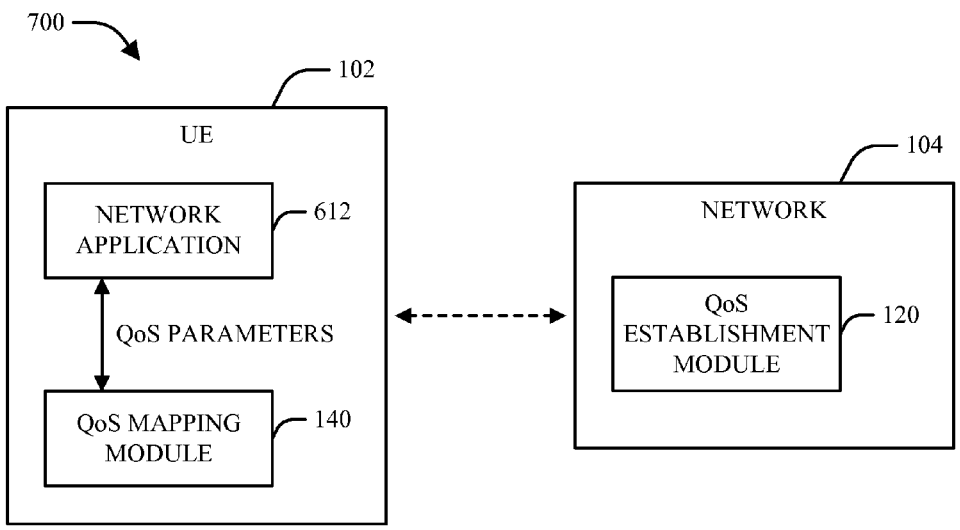

In accordance with a second aspect, a network application 612 can be configured to pass down QoS parameters for multiple access technologies upon registration, based on which mapping can be performed. Such a procedure is illustrated in further detail by system 700 in FIG. 7. As shown by system 700, a QoS mapping module 140 and/or other mechanisms associated with a UE 102 can identify an application, such as network application 612, that facilitates communication with an associated network (e.g., network 104), obtain respective QoS parameters from network application 612 that relate to respective RATs (e.g., via registration of network application 612), identify a handover of network application 612 from a first RAT to a second RAT, and map at least one QoS parameter associated with network application 612 and relating to the first RAT to at least one QoS parameter associated with network application 612 and relating to the second RAT based at least in part on the respective QoS parameters obtained from network application 612.

In one example, when UE 102 is connected on a RAT for which QoS is not indicated by network application 612, it can be appreciated that network application 612 can in some cases still obtain QoS after a handover if network 104 sets up the QoS; however, network application 612 may not be able to check the QoS. Accordingly, QoS mapping module 140 can be configured to determine whether at least one of QoS parameters relating to a first RAT associated with a handover or QoS parameters relating to a second RAT associated with the handover are obtained from network application 612. If such QoS parameters are not obtained from network application 612, QoS mapping module 140 can map at least one QoS parameter associated with network application 612 and relating to the first RAT to at least one QoS parameter associated with network application 612 and relating to the second RAT independently of network application 612. Alternatively, QoS mapping module 140 can await network establishment of QoS for network application 612 if at least one of QoS parameters relating to the first RAT or QoS parameters relating to the second RAT are not obtained from network application 612.

In some cases, it can be appreciated that a QoS mapping module 140 as applied in system 700 can identify a QoS mapping specified by network application 612 that differs from a QoS mapping selected by network 104 in the case of network-initiated QoS context transfer. In such a case, UE 102 can attempt renegotiation or QoS with network 104.

In another example, for UE-initiated QoS context transfer during an inter-RAT handover, only UE 102 may be configured to perform the mapping. Alternatively, for network-initiated QoS context transfer, both UE 102 and network 104 can be configured to perform the mapping. It can be appreciated that UE 102 can perform the mapping in such a case in order to check that the QoS assigned by network 104 is acceptable for network application 612.

In accordance with a third aspect, a hybrid approach of the two techniques respectively illustrated by systems 600 and 700 can be utilized for QoS mapping, where QoS mapping as illustrated by system 600 is used automatically if an application does not support the QoS mapping as illustrated by system 700. Thus, for example, if network application 612 does not provide QoS parameters, QoS mapping module 140 can be configured to perform mapping automatically. Further, referring again to system 600, if network application 612 is operable to provide QoS parameters, QoS mapping module 140 can obtain the a set of QoS parameters and a second set of QoS parameters from network application 612 and map at least one QoS parameter in the first set of QoS parameters obtained from network application 612 to at least one QoS parameter in the second set of QoS parameters obtained from network application 612.

In accordance with another aspect, QoS mappings can be specified in a consistent manner on the UE and network side such that multiple handovers going back and forth between the UE and network do not change QoS on either side, thereby facilitating network-initiated QoS transfer. By doing so, it can be appreciated that undesired behaviors can be prevented where, for example, the QoS drifts after multiple handovers due to QoS x at RAT A mapping to QoS y at RAT B, which in turn maps back to QoS x−1 at RAT A. In such a case, if an associated application is unaware of the degraded QoS, poor user experience can result due to degraded QoS parameters. Additionally or alternatively, if the application is aware of the degraded QoS, potential QoS renegotiation can result, which can lead to an increase of network resources for additional signaling, delays in setting up QoS, etc. Further, in the reverse case where QoS inflates after multiple handovers, wasted resources, potential overbilling, and/or other negative results could occur.

In one example, a mapping as applied herein to mitigate at least the above negative results can be configured to convert consistently back and forth between various QoS parameters. These parameters can include, but are not limited to, GPRS/UMTS traffic classes and/or other related QoS parameters; LTE QCI, MBR/GBR, and/or other related QoS parameters; 3GPP2 flow profiles; QoS parameters of other RATs, such as 802.11, WiMax, or the like.

Figure 8:
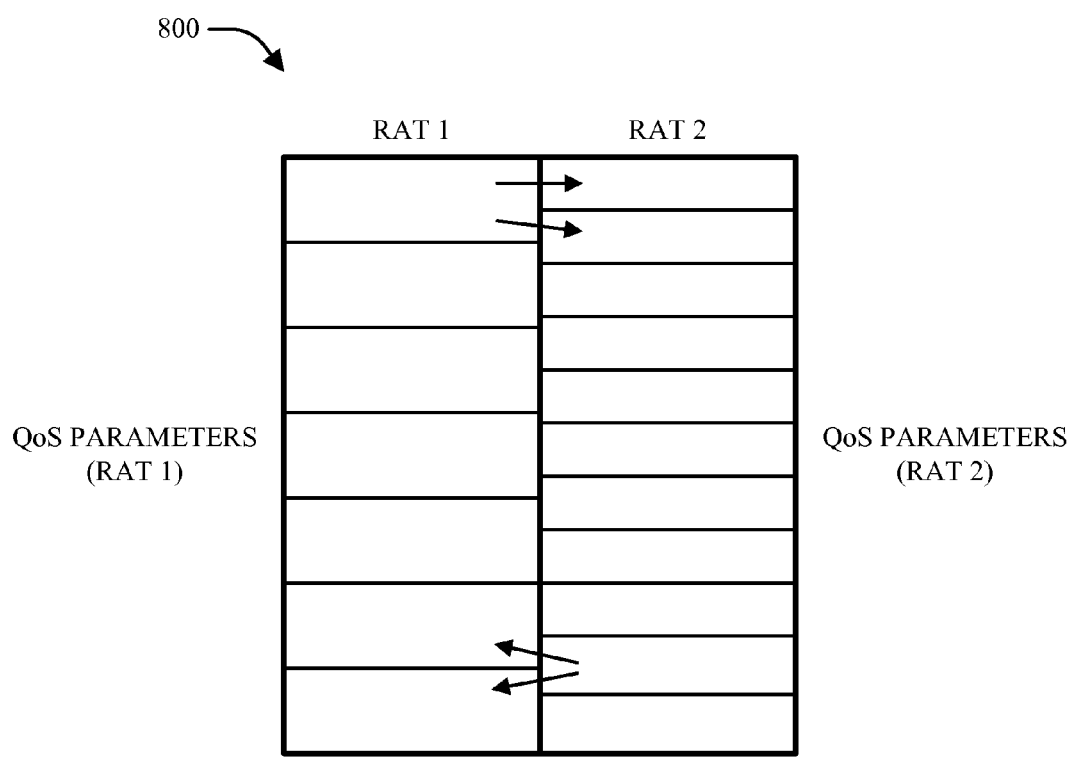
FIG. 8 illustrates an example QoS parameter configuration over a set of RATs on which various aspects described herein can function.

In another example, when moving between RATs, there can in some cases be a multiple-to-one mapping between QoS parameters, e.g., such as that shown by diagram 800 in FIG. 8. For example, in a case such as that shown by diagram 800, in a first RAT multiple QoS parameters {a, b, c} can map to a single QoS parameter x in a second RAT. However, if a UE is handed over from the first RAT to the second RAT and back to the first RAT again, it can be appreciated that the UE should be able to obtain its original QoS again. To facilitate the above, various techniques can be performed based on, for example, whether the network is able to store QoS context between inter-RAT handovers. These techniques are illustrated by systems 900-1000 in FIGS. 9-10.

Figure 9:
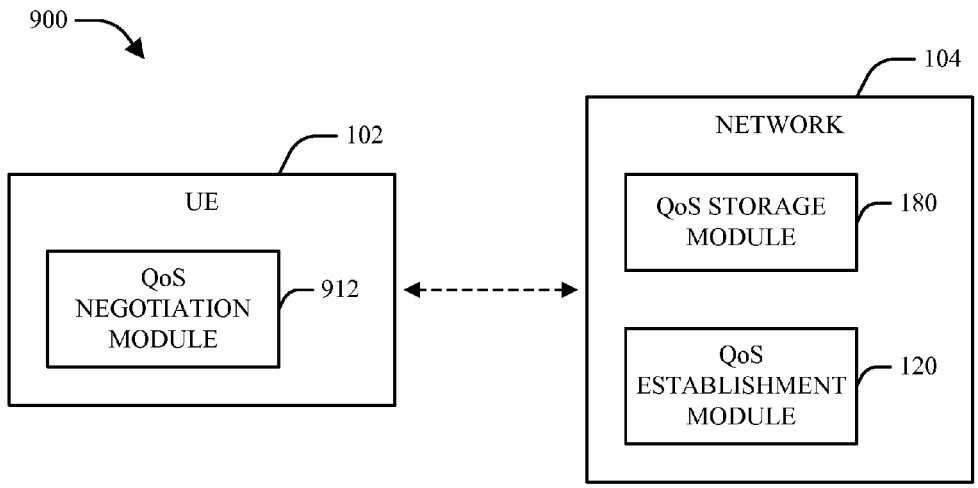
FIGS. 9-10 are block diagrams of respective systems that facilitate preservation of QoS parameters over successive handovers in accordance with various aspects.

Referring first to system 900 in FIG. 9, a network 104 can in some cases be configured with the capability, via a QoS storage module 180 or the like, to store the QoS that a corresponding UE 102 had when it left a given RAT. In such a case, even after multiple handovers between other RATs, whenever UE 102 comes back to the given RAT, the stored QoS for the RAT can be re-established. Thus, for example, network 104 can be operable to identify a UE 102 and a QoS parameter used by the UE on a RAT, detect exit of the UE 102 from the RAT and re-entry of the UE 102 to the RAT, and re-establish (e.g., via a QoS establishment module 120 and/or other suitable means) QoS for the UE 102 in response to the re-entry of the UE 102 to the RAT based at least in part on the QoS parameter used by the UE 102 on the RAT. Re-establishment of the QoS for UE 102 can be performed by, for example, storing the QoS parameter used by UE 102 on the RAT and re-establishing the QoS parameter used by UE 102 on the RAT in response to the re-entry of UE 102 to the RAT. In one example, network 104 can further be operable to indicate ability to store QoS parameters to UE 102.

As described above, network 104 can store QoS when UE 102 moves to a different RAT and utilize the stored mapping when UE 102 re-enters the original RAT. In accordance with one aspect, QoS changes on the other RAT can be monitored and applied to UE 102 to facilitate providing UE 102 with the most current QoS for its current RAT. Thus, for example, network 104 can be operable to obtain information relating to a changed QoS parameter established by UE 102 on a disparate RAT (e.g., via a QoS negotiation module 912 and/or other suitable means associated with UE 102) and re-establish the changed QoS parameter established by UE 102 on the disparate RAT in response to re-entry of UE 102 to the RAT associated with network 104.

In one example, QoS changes on the other RAT can be maintained continuously on a RAT utilized by network 104 as and when they happen. Thus, for example, network 104 can monitor the disparate RAT for QoS changes associated with UE 102. Additionally or alternatively, QoS changes on the other RAT can be pushed at and/or after a handover back to network 104, such that changed QoS parameters can be obtained by network 104 in response to re-entry of UE 102 to the RAT associated with network 104.

Figure 10:
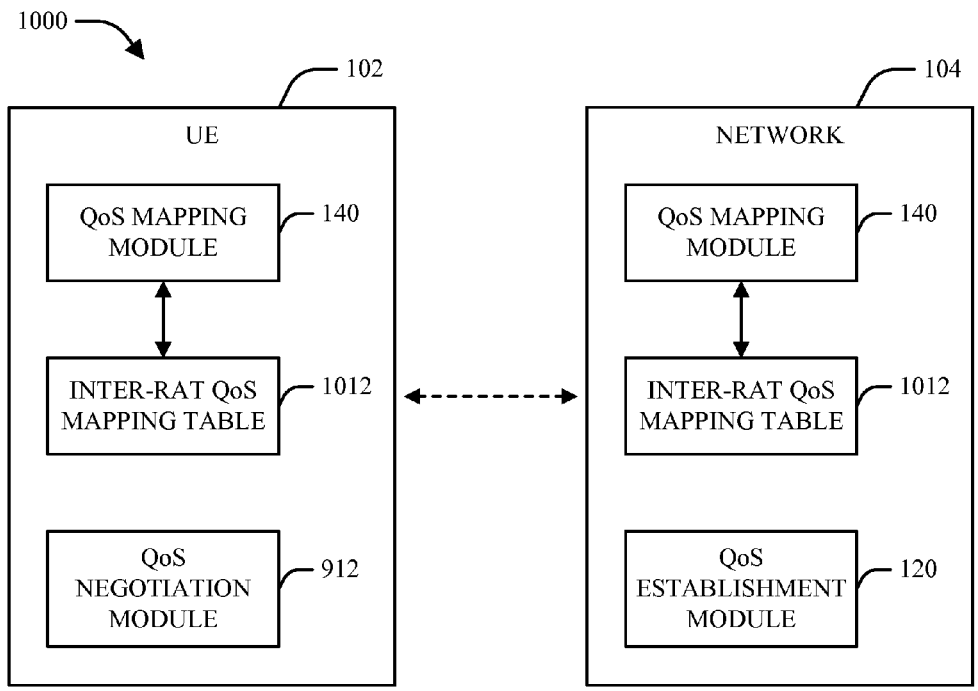

In accordance with another aspect, if network 104 is not configured with the ability to store the QoS that UE 102 had when it left a given RAT, QoS depreciation resulting from multiple handovers of UE 102 can be substantially prevented as shown by system 1000 in FIG. 10. As shown by system 1000, in the case that multiple-to-one mapping of QoS is possible between respective RATs, a standardized mapping table, such as inter-RAT QoS mapping table 1012, can be maintained where a standardized default value is used whenever multiple QoS values are possible. As further shown by system 1000, a QoS mapping module 140 at UE 102 and/or network 104 can be utilized to obtain information relating to a mapping relationship (e.g., specified by inter-RAT QoS mapping table 1012) between QoS parameters associated with a first RAT and QoS parameters associated with a second RAT, to identify a QoS parameter utilized on the first RAT, and to map the QoS parameter utilized on the first RAT to a QoS parameter associated with the second RAT based at least in part on the mapping relationship between the QoS parameters associated with the first RAT and the QoS parameters associated with the second RAT. Accordingly, if a QoS parameter utilized on a first RAT corresponds to a plurality of QoS parameters associated with a second RAT, QoS mapping module 140 can identify a mapping relationship between the QoS parameter utilized on the first RAT and a QoS parameter associated with the second RAT selected from the plurality of QoS parameters associated with the second RAT.

In one example, based on the above operation of QoS mapping module(s) 140, network 104 and/or UE 102 can utilize a default mapping value when coming back to a given RAT. Subsequently, software associated with UE 102 and/or other suitable mechanisms can attempt to renegotiate (e.g., via QoS negotiation module 912) with network 104 to obtain the same QoS it had before the handover. Thus, UE 102, via QoS negotiation module 912 or the like, can establish QoS with a network 104 associated with a given RAT according to a QoS parameter associated with the given RAT obtained via QoS mapping module 140. If such negotiation fails and QoS established with network 104 is deemed insufficient for at least one associated application, UE 102 can notify the affected application(s).

In another example, network 104 can be operable to indicate to UE 102 whether it is able to store QoS parameters (e.g., as shown by system 900). Accordingly, if UE 102 obtains an indication of capability of network 104 to establish (e.g., via a QoS establishment module 120, etc.) a QoS parameter associated with a corresponding RAT, UE 102 can obtain a mapped QoS parameter associated with said RAT from network 104.

Figure 11:
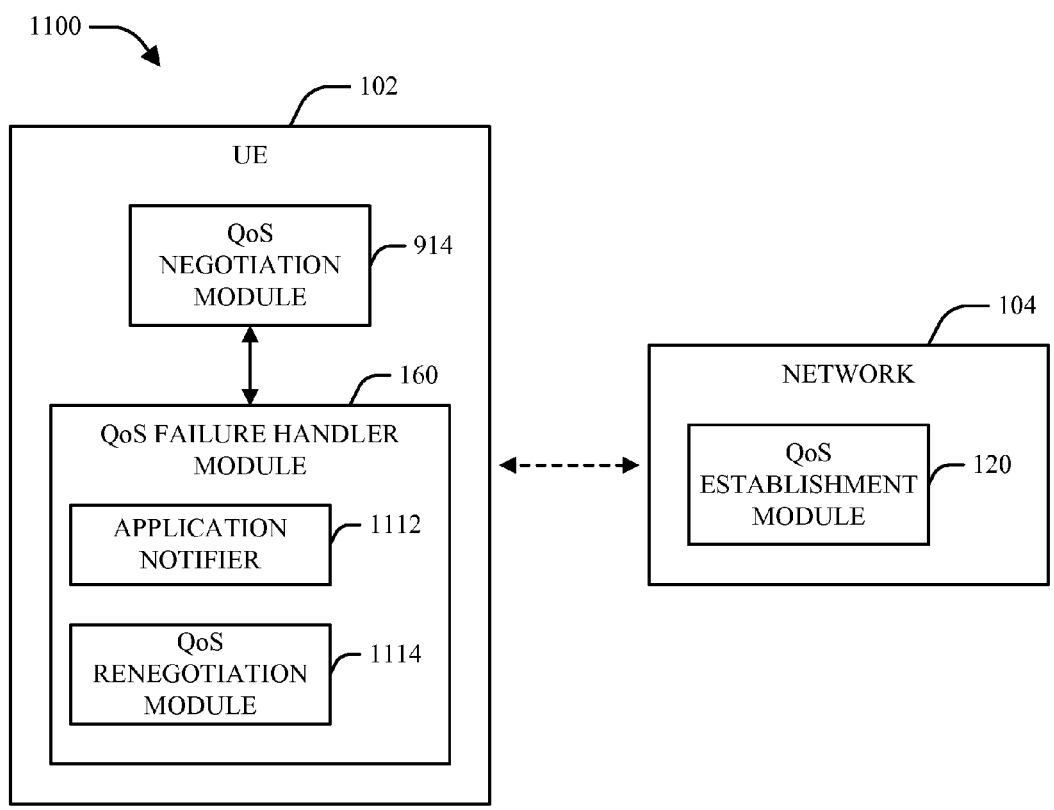
FIG. 11 is a block diagram of a system for handling insufficient QoS for one or more network applications following an inter-RAT handover in accordance with various aspects.

Referring next to FIG. 11, a system 1100 for handling insufficient QoS for one or more network applications following an inter-RAT handover in accordance with various aspects is illustrated. As shown by system 1100, after remapping QoS parameters (e.g., based on negotiation by a QoS negotiation module 914 at UE 102, a QoS establishment module 120 at network 104, etc.) pursuant to an inter-RAT handover, UE 102 can compare the QoS setup on the new RAT with the QoS on the old RAT. If UE 102 decides that QoS was downgraded as part of the inter-RAT handover, a QoS failure handler module 160 and/or other mechanisms at UE 102 can take one or more appropriate actions. For example, UE 102 can map a QoS parameter associated with a first RAT to a corresponding QoS parameter associated with a second RAT in association with an inter-RAT handover performed with respect to a network application, determine whether the second RAT provides sufficient QoS for the network application at least in part by comparing the QoS parameter associated with the first RAT and the QoS parameter associated with the second RAT, and facilitate (e.g., via QoS failure handler module 160) adaptation of the network application on the second RAT to a QoS of the second RAT if the second RAT is determined not to provide sufficient QoS for the network application.

In one example, QoS failure handler module 160 can utilize an application notifier 1112 and/or other means to notify an associated network application that inadequate or insufficient QoS was set up on the second (e.g., target) RAT. Subsequently, the application can take one or more appropriate actions such as, for example, releasing the connection, continuing with degraded QoS, etc. Alternatively, QoS failure handler module 160 can attempt renegotiation of the QoS parameter associated with the target RAT independently of the associated network application. In one example, such re-negotiation can be performed by a QoS renegotiation module 1114, which can be configured within the protocol data services layer of UE 102 and/or implemented as any other suitable entity. In one example, application notifier 1112 can be utilized to notify the associated network application of insufficient QoS on the second or target RAT in response to unsuccessful attempted renegotiation of the QoS parameter by QoS renegotiation module 1114.

In accordance with one aspect, whether application notifier 1112 and/or QoS renegotiation module 1114 will be utilized for a given scenario can be determined based on capabilities of an underlying network application. Thus, for example, QoS failure handler module 160 can identify whether a network application is configured with at least one procedure for handling insufficient QoS. Based on this determination, application notifier 1112 can notify the network application of insufficient QoS on a second RAT associated with a handover if the network application has at least one procedure for handling insufficient QoS. Otherwise, QoS renegotiation module 1114 can attempt renegotiation of the QoS parameter associated with the second RAT independently of the network application if the network application does not have at least one procedure for handling insufficient QoS.

In accordance with another aspect, QoS can be negotiated for various radio access technologies (e.g., HRPD) in two steps. In the first step (also referred to as the QoS authorization step), UE 102 can offer a range of QoS profiles, to which network 104 can respond with a subset of acceptable QoS profiles. In the second step, UE 102 can pick a specific profile and request the selected profile from network 104. By way of specific example, UE 102 can map LTE QoS to a multiple of HRPD profile IDs, which are offered in the QoS authorization step. Subsequently, network 104 can respond with a subset of the profile IDs, and UE 102 can determine if any of the authorized QoS profiles is acceptable. If not, UE 102 can cease attempting further negotiations with network 104 and an associated application can be notified to take appropriate action.

Accordingly, with regard to the above in more general terms, UE 102 can map a QoS parameter associated with a first RAT associated with a handover to a plurality of QoS parameters associated with a second RAT associated with the handover. UE 102 can then determine whether at least one QoS parameter in the plurality of QoS parameters associated with the second RAT corresponds to sufficient QoS for the network application and notify the network application of insufficient QoS on the second RAT if no QoS parameters in the plurality of QoS parameters associated with the second RAT correspond to sufficient QoS for the network application.

Figure 12:
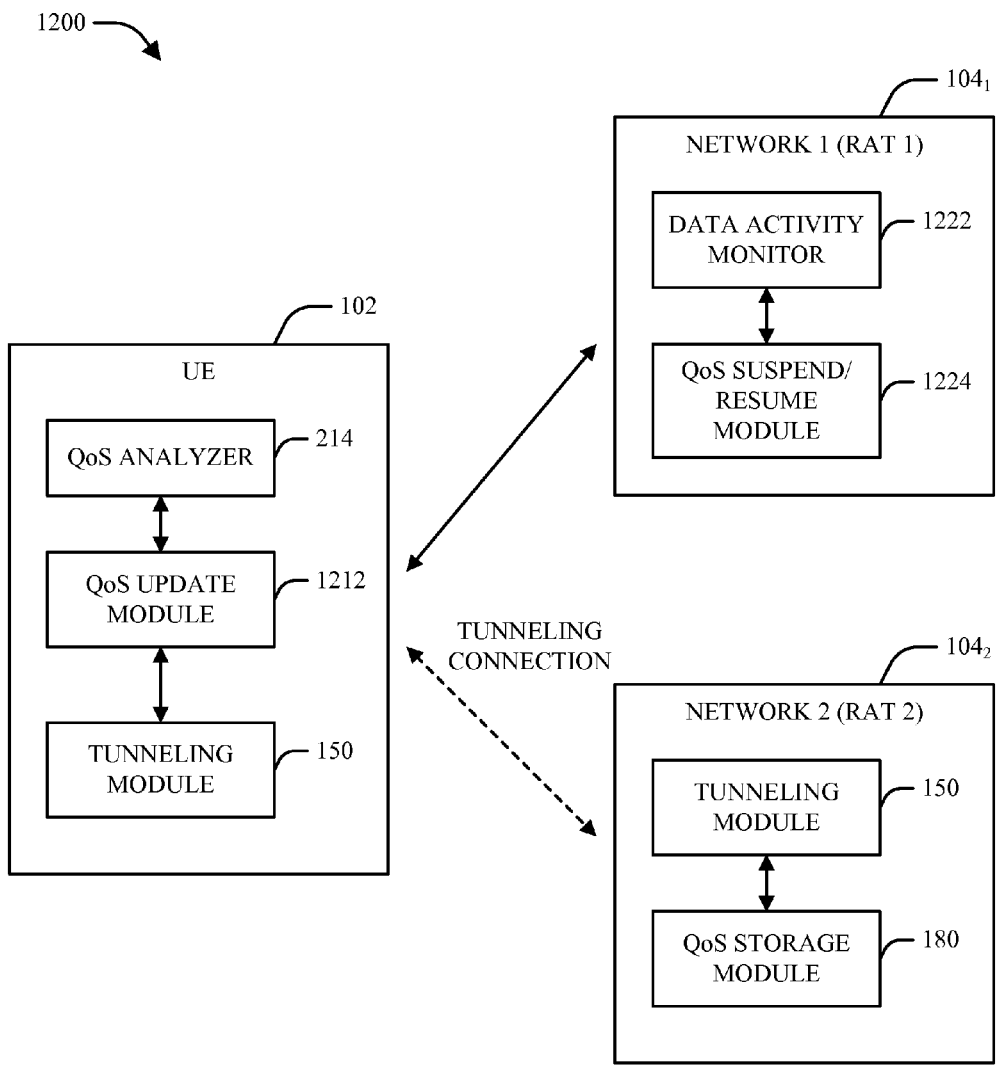
FIG. 12 is a block diagram of a system for maintaining QoS information over multiple RATs via tunnel mode operation in accordance with various aspects.

Turning to FIG. 12, a block diagram of a system 1200 for maintaining QoS information over multiple RATs via tunnel mode operation in accordance with various aspects is illustrated. As shown in system 1200, a UE 102 can communicate within a wireless communication environment via an associated network $104_1$, which can operate according to a given RAT. In accordance with one aspect, UE 102 and network $104_1$ can establish QoS corresponding to one or more applications. Further, to mitigate delays and/or other effects of a future handover to another network $104_2$ operating according to a different RAT, a tunneling connection can be maintained between UE 102 and network $104_2$ to facilitate maintenance of QoS during tunnel mode operation. As system 1200 illustrates, tunneling between UE 102 and network $104_2$ can be facilitated via respective tunneling modules 150 and/or other means at UE 102 and/or network $104_2$.

In accordance with one aspect, applications can suspend and resume QoS based on data activity. For example, a data activity monitor 1222 at network $104_1$ and/or any other suitable entities within system 1200 (e.g., UE 102) can suspend and/or resume QoS for one or more related applications based on data activity identified by a data activity monitor 1222. In the specific example of (e)HRPD, in the event that QoS is turned off, the QoS context can be kept by UE 102 and by the (e)HRPD serving gateway (HSGW). Accordingly, it can be appreciated that QoS context does not require reestablishment when QoS is subsequently re-enabled, thereby reducing call setup time and providing other suitable benefits. However, it can be appreciated that in the further specific example of an LTE core network, QoS can be configured to be removed when it is no longer needed such that it can require to be set up again from scratch when it is needed again.

Thus, for the specific, non-limiting example of network $104_1$ using LTE and network $104_2$ using eHRPD, UE 102 can utilize a QoS update module 1212 and/or other suitable mechanisms to maintain QoS context with the eHRPD gateway at network $104_2$ over the tunnel such that QoS can be available at network $104_2$ upon a handover to eHRPD. In one example, UE 102 can establish the QoS context in eHRPD as soon as possible via the tunnel, and both UE 102 and network $104_2$ can attempt to keep the QoS context over the tunnel up to date as and when it changes while on LTE. While over the tunnel, the associated QoS flows can be turned off in the HSGW. Subsequently, as soon as a handover to eHRPD occurs, the QoS flows can be turned on.

In accordance with one aspect, in order to avoid having to repeat setup of QoS on eHRPD every time QoS is resumed, an eHRPD gateway associated with network $104_2$ can utilize a QoS storage module 180 and/or other mechanisms to store the QoS. When in this state, the QoS can be flagged as "turned off" when the LTE core network actually removes the QoS. Thus, if UE 102 later moves back to (e)HRPD, QoS can simply be turned on at network $104_2$ rather than requiring repeated setup. In one example, a timer- or event-based mechanism can be used at network $104_2$ to turn off the QoS in the HSGW. Thus, as stated above for the specific, non-limiting example of a UE 102 interacting with LTE and eHRPD networks 104, the QoS context can be cached in the eHRPD and turned on and off via the tunnel when it is removed and recreated over LTE.

In accordance with another aspect, system 1200 can utilize QoS context updating via tunnel mode in a generalized manner for a multi-RAT environment as follows. In a first example, UE 102 can initialize QoS for a packet flow over a first network $104_1$, establish a QoS context for the packet flow on a second network $104_1$ via tunneling to the second network $104_1$ in response to the initializing, monitor for changes to the QoS for the packet flow (e.g., termination of the packet flow, re-establishment of the packet flow, etc.) over the first network $104_1$, and update the QoS context for the packet flow on the second network $104_2$ via the tunneling to the second network $104_2$ in response to respective monitored changes to the QoS for the packet flow over the first network $104_1$. Further, network $104_2$ can be operable to obtain information relating to a packet flow associated with a network device, such as UE 102, operating on a first network $104_1$ via tunneling to UE 102, initialize a QoS context for network $104_2$ in an inactive state corresponding to the packet flow, detecting entry of UE 102 into network $104_2$, and activate the QoS context for network $104_2$ in response to entry of UE 102 into network $104_2$. In one example, network $104_1$ can be further operable to receive updated QoS information relating to the packet flow on network $104_1$ via the tunneling to UE 102 and to update the QoS context for network $104_2$ corresponding to the packet flow according to the updated QoS information.

In accordance with one aspect, QoS can be maintained over a tunneling connection as shown in system 1200 in a variety of manners. In a first example, QoS for one or more flows and/or corresponding applications can be maintained in a constant manner over the tunnel. Alternatively, a QoS flow can be created on network $104_2$ via tunneling upon creation of the flow on network $104_1$ and subsequently turned on or off at network $104_2$ via the tunnel as the flow is discarded and recreated at network $104_1$, thereby saving resources associated with constantly maintaining QoS over the tunnel. For example, QoS storage module 180 and/or other means at network $104_2$ can be used to cache QoS for a flow while UE 102 is on network $104_1$, such that transfer of the QoS corresponding to the flow is performed upon movement of UE 102 to network $104_2$.

In one example, the specific technique utilized for maintaining QoS over the tunnel for a given flow can be implemented on a case-by-case basis. Thus, by way of example, constant tunneling can be performed selectively for certain flows based on relative priority of the flows, such that QoS for real-time flows, priority flows, or the like are maintained in a constant manner over the tunnel while QoS for other flows are not. In one example, this can facilitate savings in overhead associated with signaling, power, or the like, associated with maintaining QoS for all flows over the tunnel. For example, UE 102 in some cases can identify one or more packet flow types for which QoS tunneling is configured and establish a QoS context for the packet flow on the network $104_2$ via tunneling to network $104_2$ in response to the initializing if the packet flow is of a type included within the one or more packet flow types for which QoS tunneling is configured (e.g., as determined by a QoS analyzer 214 and/or other mechanisms at UE 102). As noted above, packet flow types for which QoS tunneling is configured can be identified by UE 102 based at least in part on relative packet flow priority.

In another example, the techniques described above can be applied to the case of a voice over IP (VoIP) call flow. For an example VoIP call service, it can be appreciated that a user can make, and subsequently terminate, a voice call multiple times in succession. Accordingly, instead of setting up QoS for VoIP in a first RAT and discarding the QoS in synchronization with events occurring in a second RAT, the QoS can be set up once and kept off when the application is terminated instead of discarded. Accordingly, it can be appreciated that loading on the tunnel can be alleviated, as the loading associated with turning on and/or turning off QoS is less than the loading associated with recreating QoS over the tunnel.

In accordance with one aspect, in the event that QoS for an application is installed at a network 104 and it is desired to turn the QoS for the application on at the network 104 (e.g., due to UE 102 moving to the network 104), the application can utilize a suspend/resume call and/or other means to facilitate management of the QoS. In one example, in the event that an application is terminated on a first RAT and the first RAT deletes the QoS, it can in some cases not be necessary to turn on and delete QoS on a second RAT as the application may restart and re-initiate QoS setup. Thus, in the event that an application becomes inactive on a first RAT, QoS for the application can be turned off over the tunnel. Subsequently, if an associated UE 102 moves to the second RAT, it can be determined whether the application is active and, if so, the QoS for the application can be turned on.

For example, based on the above, network $104_2$ can be operable to receive an indication that a packet flow is inactive on network $104_1$. Subsequently, in response to entry of UE 102 into network $104_2$, network $104_2$ can determine whether the packet flow is active. If the packet flow is not active, the QoS context for network $104_2$ can be discarded. Otherwise, if the packet flow is active, QoS can be established for the packet flow corresponding to the QoS context for network $104_2$. Further, upon receiving an indication that the packet flow is inactive on network $104_1$, network $104_2$ can discard the QoS context for network $104_2$ based on at least one factor, such as expiration of a predetermined time interval following receiving the indication that the packet flow is inactive on network $104_1$ and/or any other suitable factors.

Figure 13:
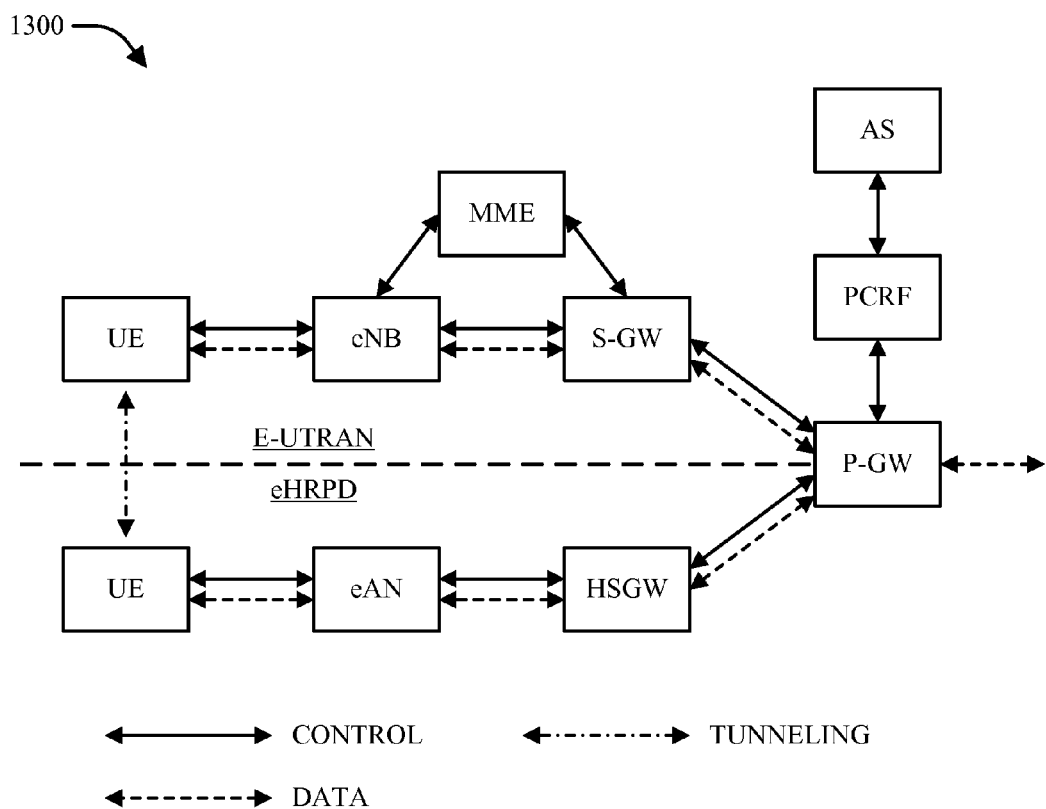
FIG. 13 illustrates an example tunneling configuration that can be utilized to maintain QoS information in accordance with various aspects.

In accordance with another aspect, an example tunneling structure that can be utilized in the specific example of a wireless communication environment including an Evolved UMTS (Universal Mobile Telecommunications System) Terrestrial Radio Access Network (E-UTRAN) and an eHRPD network is illustrated by diagram 1300 in FIG. 13. As FIG. 13 illustrates, a UE can interact with both the E-UTRAN and the eHRPD network via tunneling. The E-UTRAN can include an eNB, a Mobility Management Entity (MME), and a Serving Gateway (S-GW). Further, the eHRPD network can include an Evolved Access Network (eAN) and a HSGW. As further shown in diagram 1300, both RANs can interact with a PDN (Packet Data Network) Gateway (P-GW), a Policy and Charging Rules Function (PCRF), and an Application Server (AS). In a similar manner to that described above, the UE can facilitate maintenance of QoS over both RANs via tunneling mode. For example, at the S-GW, QoS can be created and/or deleted substantially every time when QoS is needed. Further, at the HSGW, a QoS flow can be created and subsequently turned on/off when QoS is needed (e.g., such that the QoS context is "cached").

For UE-initiated QoS with respect to diagram 1300, an application can indicate the QoS needed. For LTE, this can be translated into creation/deletion of QoS, while for eHRPD, QoS can merely be switched on or off, thereby keeping the context. Additionally or alternatively, for network-initiated QoS, the application server can indicate when QoS is needed to the PCRF, in which case the full QoS context can be created or deleted on each occasion.

Figure 14:
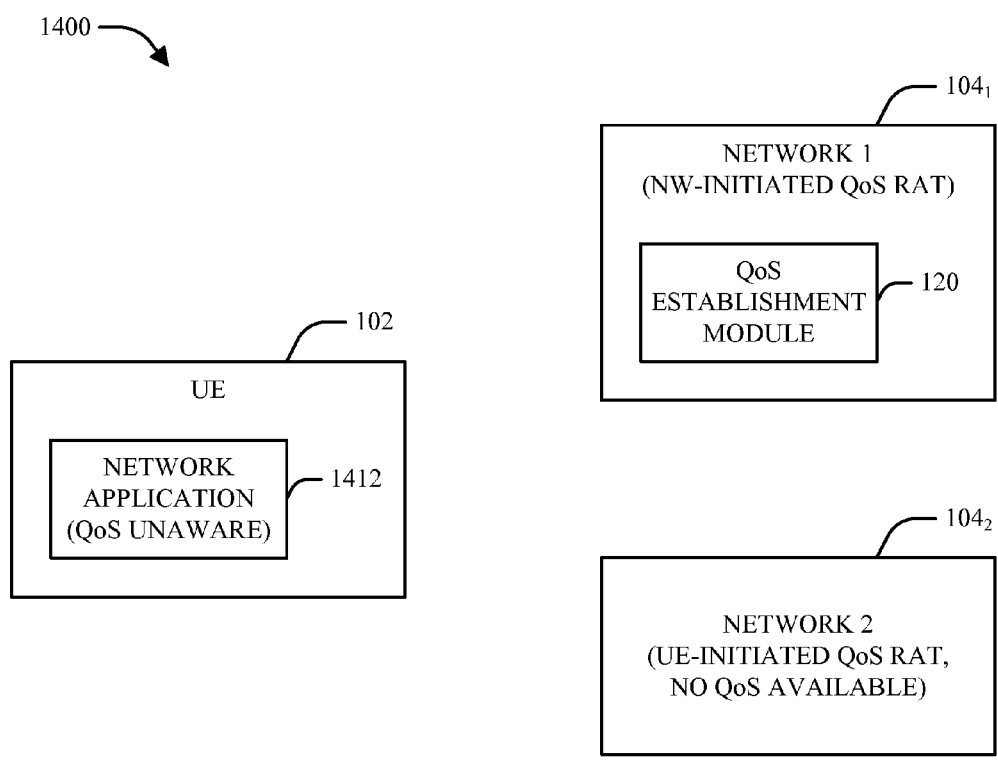
FIGS. 14-15 are block diagrams of respective systems that facilitate handling of QoS establishment operation during an inter-RAT handover in accordance with various aspects.

In accordance with a further aspect, a UE 102 and/or one or more networks 104 in a wireless communication environment can implement respective techniques for handling cases wherein the UE 102 moves between a RAT using network-initiated QoS and a RAT using UE-initiated QoS. In a first example, a technique that can be utilized to manage such a case is illustrated by system 1400 in FIG. 14. As shown by FIG. 14, in the event that UE 102 utilizes a QoS-unaware application 1442, QoS can be configured to never be requested by UE 102. Accordingly, when UE 102 moves from a network 104 associated with a RAT with network-initiated QoS to a network 104 associated with a RAT with UE-initiated QoS, the QoS will in some cases not be re-established. However, when UE 102 moves back to the network 104 operating according to the RAT with network-initiated QoS, the network 104 can (e.g., via a QoS establishment module 120, etc.) the QoS again. Accordingly, it can be appreciated that for QoS-unaware applications, QoS can in some cases only be available in RATs that support network-initiated QoS. Further, in the specific example that UE 102 moves to an E-UTRAN using network-initiated QoS, the E-UTRAN can decide whether to establish the QoS context with a HSGW corresponding to an eHRPD network (e.g., over a S101 tunnel) or not.

In one example, based on the above, UE 102 in system 1400 can identify an application that facilitates communication in system 1400, detect entry into a network 104 associated with a RAT, and determine whether QoS for the RAT is user-initiated or network-initiated. Based on this determination, UE 102 can direct operation of the application according to network-established QoS if QoS for the RAT is network-initiated or direct operation of the application independently of QoS if QoS for the RAT is user-initiated. In another example, UE 102 can be operable to detect entry into a first network 104 associated with a RAT for which QoS is network-initiated, establish a QoS context for the application according to QoS established by the first network 104, detect movement from the first network 104 to a second network 104 associated with a RAT for which QoS is user-initiated, and release the QoS context for the application in response to the movement.

Figure 15:
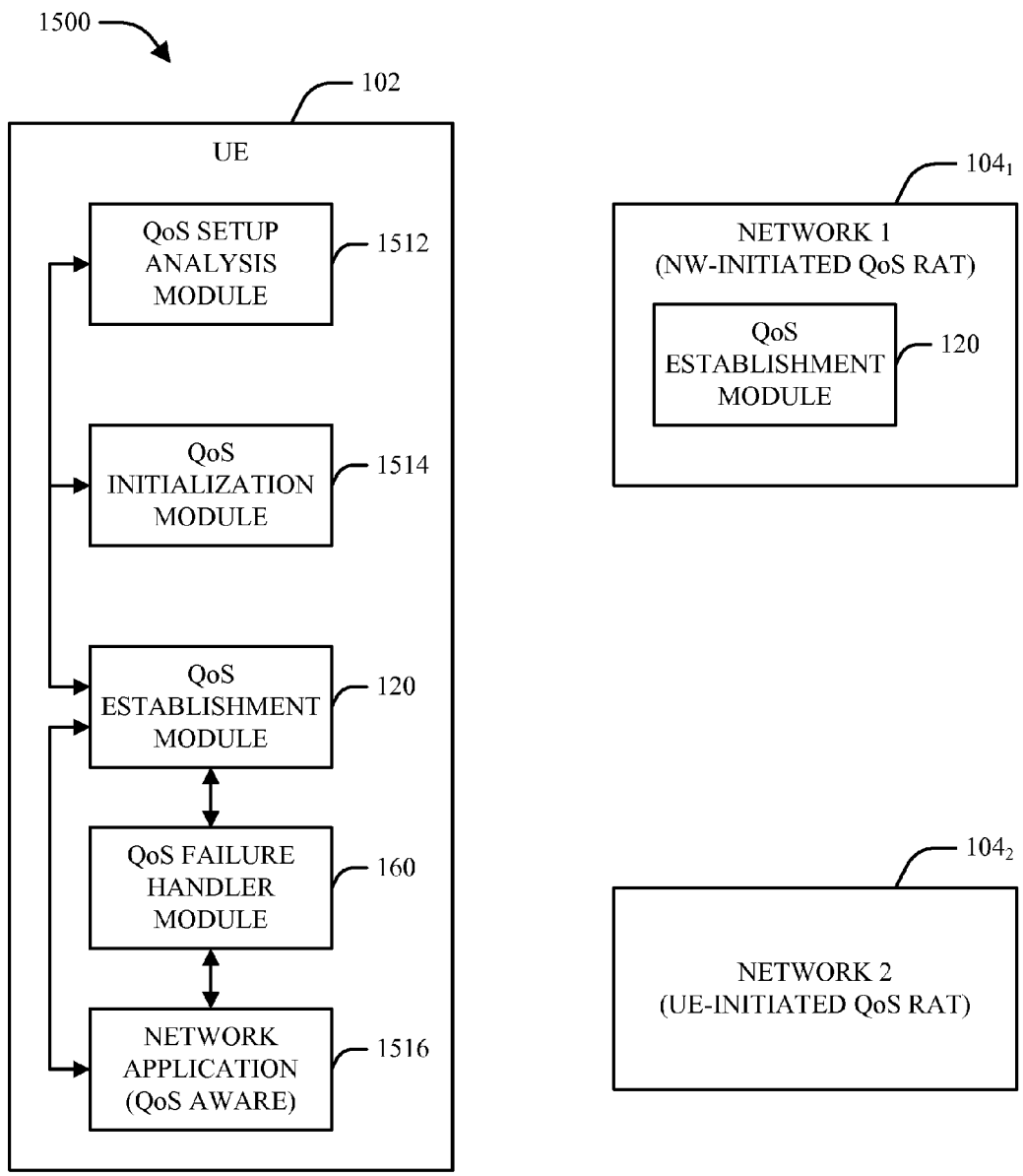

In an alternate example, in the event that UE 102 is associated with a QoS-aware application, management of QoS for the application can be conducted in various manners as shown by system 1500 in FIG. 15. In a first scenario illustrated by system 1500, UE 102 can move from a network 104 with a network-initiated QoS RAT to a network 104 with a UE-initiated QoS RAT. In such a scenario, upon determining (e.g., via a QoS setup analysis module 1512) that the network 104 will not initiate QoS, UE 102 can initiate QoS for an associated QoS-aware application 1516 on its own (e.g., via a QoS initialization module and/or other suitable means). In one example, in the event that UE 102 is moving to an E-UTRAN, UE 102 can additionally set up the QoS context over the S101 tunnel with the HSGW, but in a switched off state.

In a second scenario illustrated by system 1500, UE 102 can move from a network 104 with a UE-initiated QoS RAT to a network 104 with a network-initiated QoS RAT. In such a case, as UE 102 is associated with a QoS-aware application 1516, the application 1516 can indicate the required QoS for a specific filter to UE 102. Once the inter-RAT mobility to a network-initiated QoS RAT occurs, UE 102 can check (e.g., via a QoS establishment module 120 and/or other suitable means) whether the QoS setup by the network is satisfactory or not. UE 102 can then convey this information to the application 1516, which can in turn decide what to do in case QoS is not satisfactory (e.g., via a QoS failure handler module 160, etc.). For example, in the case of unsatisfactory QoS, application 1516 can decide to continue without QoS, notify the user, tear down the service, re-request for a different QoS, and/or perform any other suitable action(s). Further, in a similar manner to the first scenario described above, in the specific example where UE 102 is moving to a E-UTRAN and has to pre-register with an eHRPD over the S101 tunnel, UE 102 can also set up the QoS context with the HSGW in a switched off state.

In view of the above, UE 102 in system 1500 can be operable to identify an application 1516 that facilitates communication over at least a first RAT and a second RAT, detect a handover of the application from the first RAT to the second RAT, determine whether a network 104 associated with the second RAT is configured to initialize QoS for the application, and to establish QoS for the application on the second RAT based at least in part on the determining. In the event that the network 104 associated with the second RAT is not configured to initialize QoS for the application (e.g., the handover is from a network-initiated QoS RAT to a UE-initiated QoS RAT), UE 102 can initialize QoS for the application on the second RAT, establish a QoS context with the first RAT via tunneling to the first RAT, and/or perform any other suitable action(s).

Additionally or alternatively, in the event that the network 104 associated with the second RAT is configured to initialize QoS for the application (e.g., the handover is from a UE-initiated QoS RAT to a network-initiated QoS RAT), UE 102 can identify a required QoS for the application 1516, obtain information relating to a network-initiated QoS for the application 1516 on the second RAT, and determine whether the network-initiated QoS is satisfactory for the application 1516 based on the required QoS for the application 1516. In addition, a result of such determination can be indicated to the application 1516. Upon determining that the network-initiated QoS is unsatisfactory for the application 1516, the unsatisfactory QoS can be indicated to the application 1516. Further, in such a case UE 102 can facilitate, via the application 1516, one or more actions such as continuing use of the application 1516 without QoS, indicating unsatisfactory QoS for the application 1516 to a user of the application 1516, terminating the application 1516, re-requesting QoS for the application 1516, or the like. In another example, UE 102 can further be configured to establish a QoS context with the first RAT via tunneling to the first RAT.

Referring now to FIGS. 16-29, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 16:
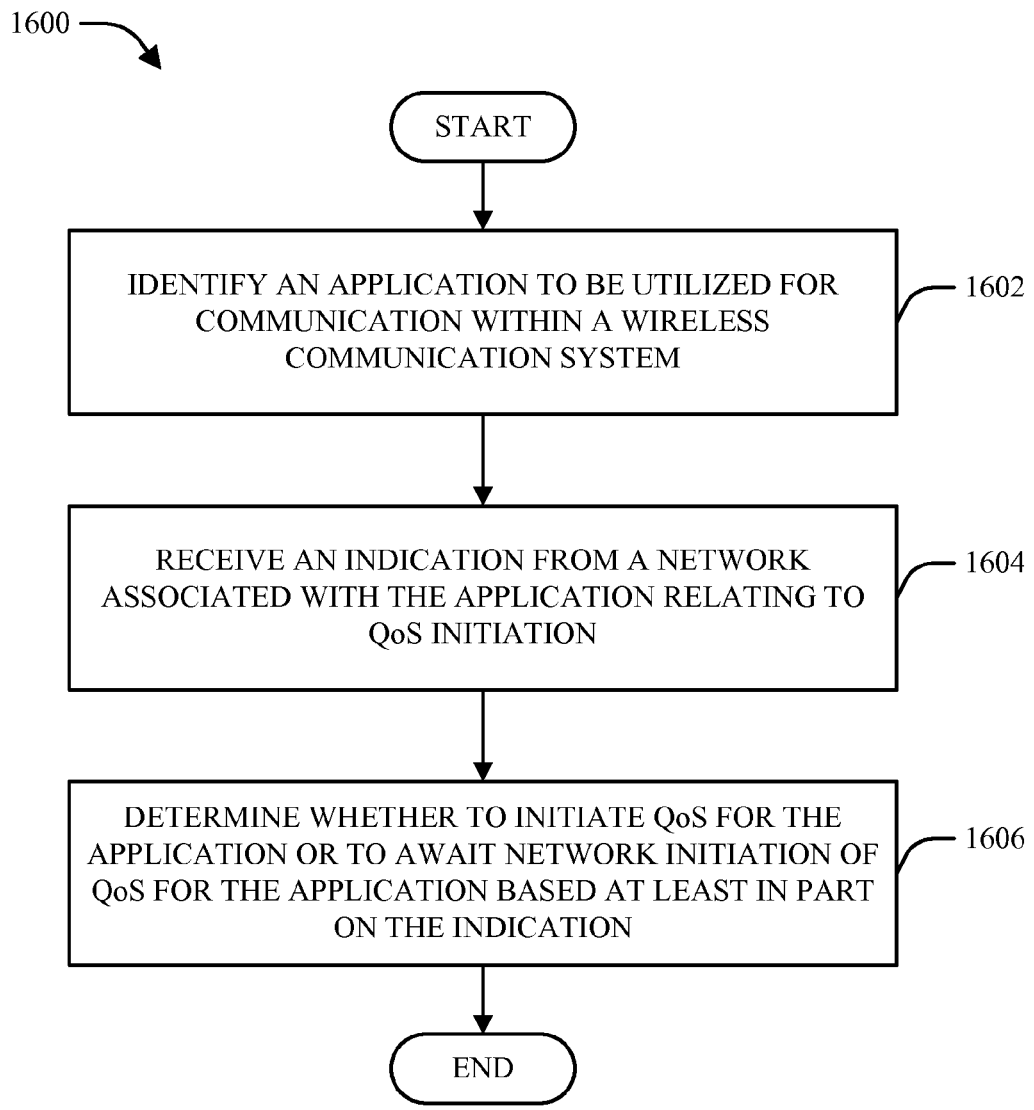
FIGS. 16-19 are flow diagrams of respective methods for managing establishment of QoS for a mixed-mode application utilized in a wireless communication system.

With reference to FIG. 16, illustrated is a first method 1600 that facilitates managing establishment of QoS for a mixed-mode application utilized in a wireless communication system. It is to be appreciated that method 1600 can be performed by, for example, a UE (e.g., UE 102) and/or any other appropriate network entity. Method 1600 begins at block 1602, wherein an application to be utilized for communication within a wireless communication system is identified. At block 1604, an indication relating to QoS initiation is received from a network associated with the application. At block 1606, it is determined whether to initiate QoS for the application or to await network initiation of QoS for the application based at least in part on the indication.

Figure 17:
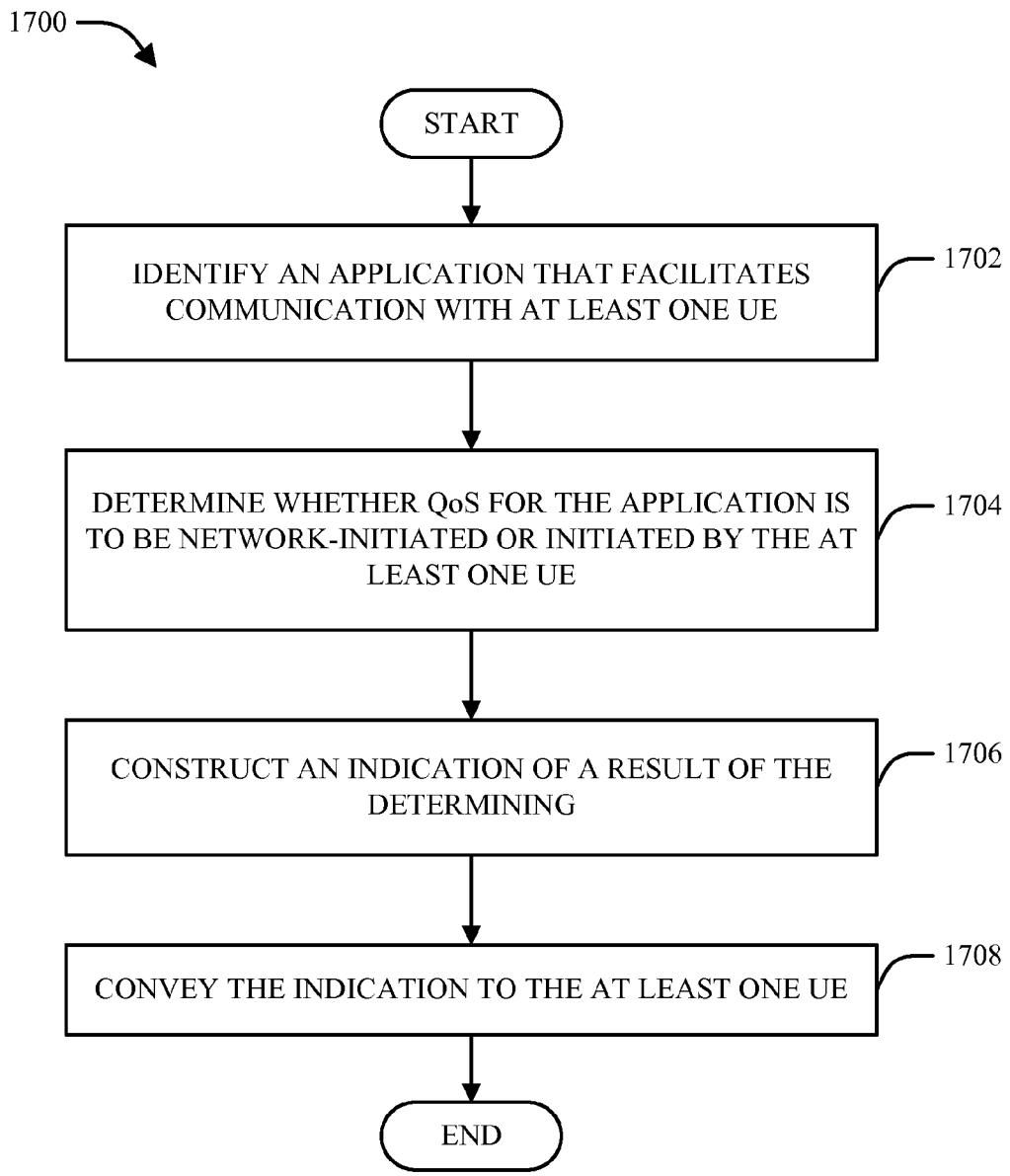

FIG. 17 illustrates a second method 1700 for managing establishment of QoS for a mixed-mode application utilized in a wireless communication system. Method 1700 can be performed by, for example, a communication network (e.g., network 104) and/or any other suitable entity. Method 1700 begins at block 1702, wherein an application that facilitates communication with at least one UE is identified. At block 1704, it is determined whether QoS for the application is to be network-initiated or initiated by the at least one UE. At block 1706, an indication of a result of the determining is constructed. At block 1708, the indication is conveyed to the at least one UE.

Figure 18:
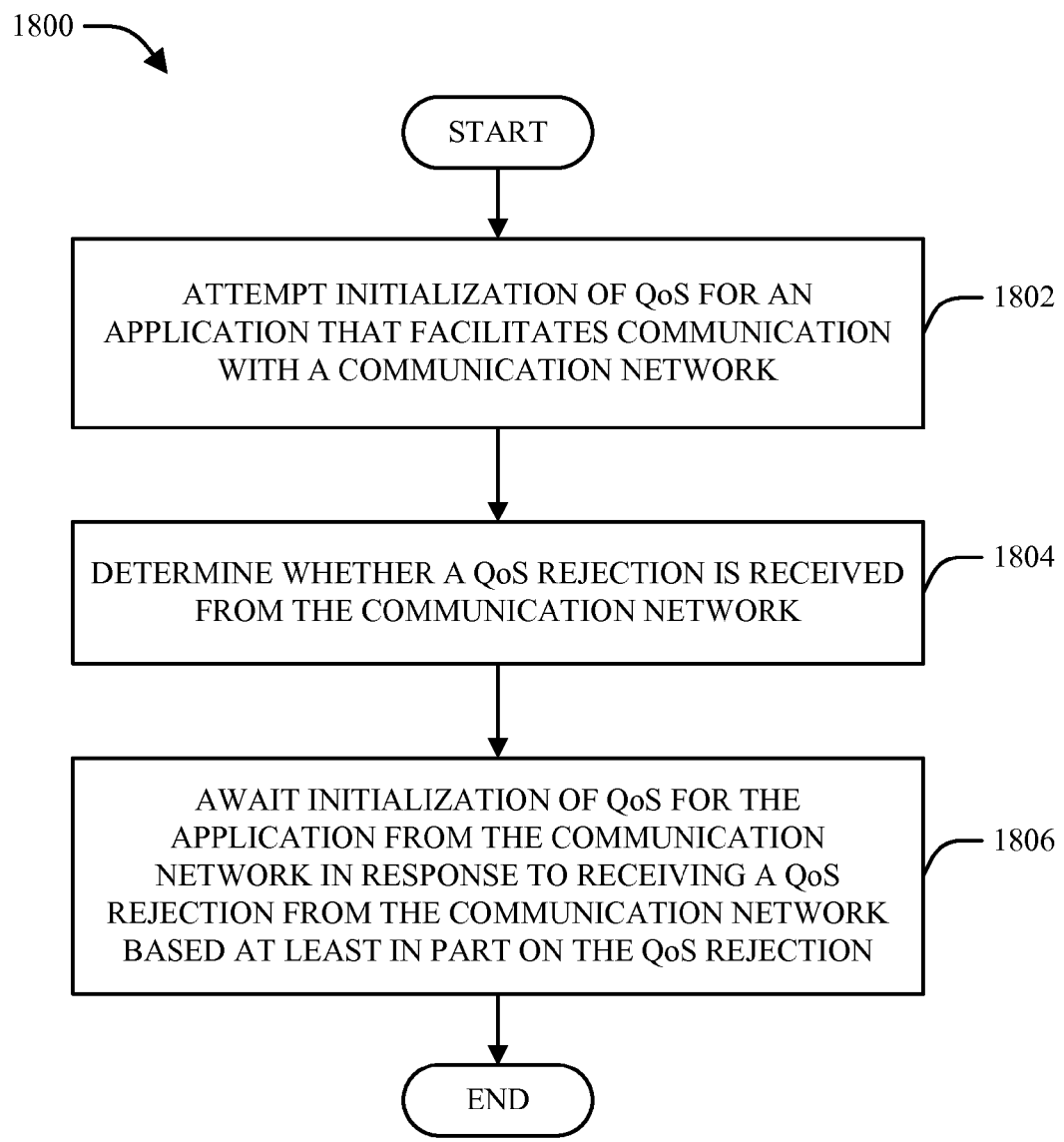

Referring next to FIG. 18, a third method 1800 for managing establishment of QoS for a mixed-mode application utilized in a wireless communication system is illustrated. Method 1800 can be performed by, for example, a mobile device and/or any other suitable entity. Method 1800 begins at block 1802, wherein initialization of QoS is attempted for an application that facilitates communication with a communication network. At block 1804, it is determined whether a QoS rejection is received from the communication network. At block 1806, an entity performing method 1800 awaits initialization of QoS for the application from the communication network in response to receiving a QoS rejection from the communication network based at least in part on the QoS rejection.

Figure 19:
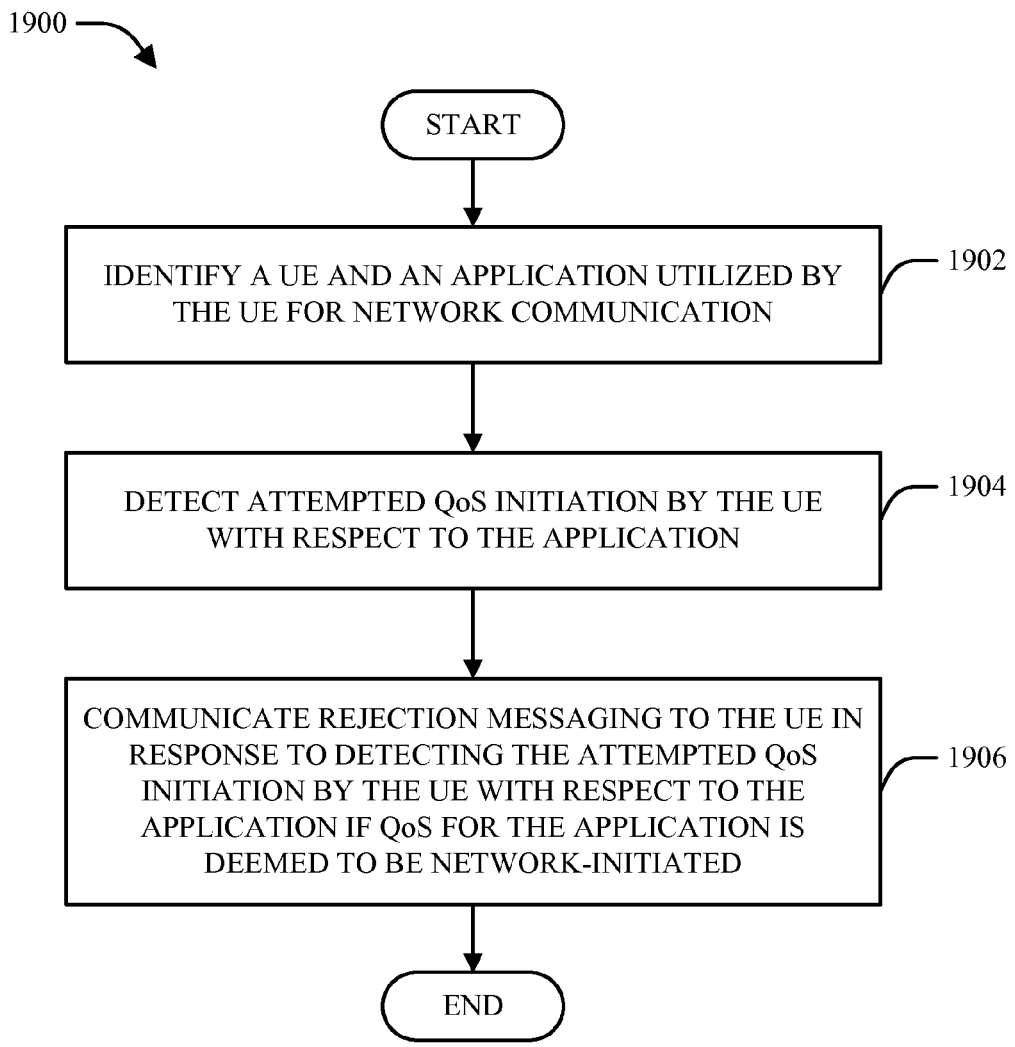

FIG. 19 illustrates a fourth method 1900 that facilitates managing establishment of QoS for a mixed-mode application utilized in a wireless communication system. Method 1900 can be performed by, for example, a wireless communication network and/or any other suitable entity. Method 1900 begins at block 1902, wherein a UE and an application utilized by the UE for network communication are identified. At block 1904, attempted QoS initiation by the UE with respect to the application is detected. At block 1906, rejection messaging is communicated to the UE in response to detecting the attempted QoS initiation by the UE with respect to the application if QoS for the application is deemed to be network-initiated.

Figure 20:
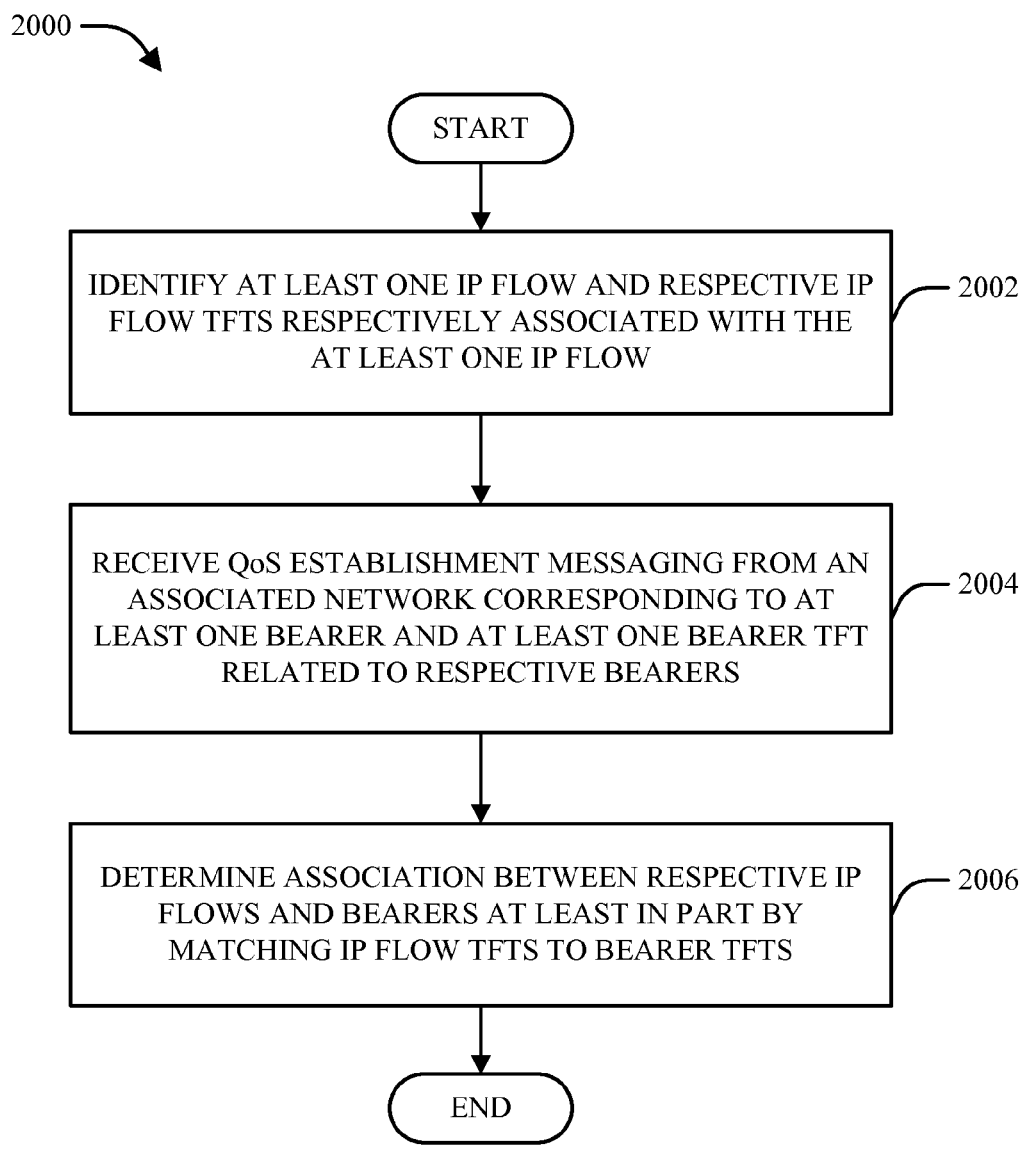
FIG. 20 is a flow diagram of a method for performing flow to bearer QoS mapping in association with an inter-RAT handover.

Turning to FIG. 20, a flow diagram of a method 2000 for performing flow to bearer QoS mapping in association with an inter-RAT handover is illustrated. Method 2000 can be performed by, for example, a UE and/or any other suitable network entity. Method 2000 starts at block 2002, wherein at least one IP flow and respective IP flow TFTs respectively associated with the at least one IP flow are identified. At block 2004, QoS establishment messaging corresponding to at least one bearer and at least one bearer TFT related to respective bearers is received from an associated network. At block 2006, association between respective IP flows and bearers is determined at least in part by matching IP flow TFTs to bearer TFTs.

Figure 21:
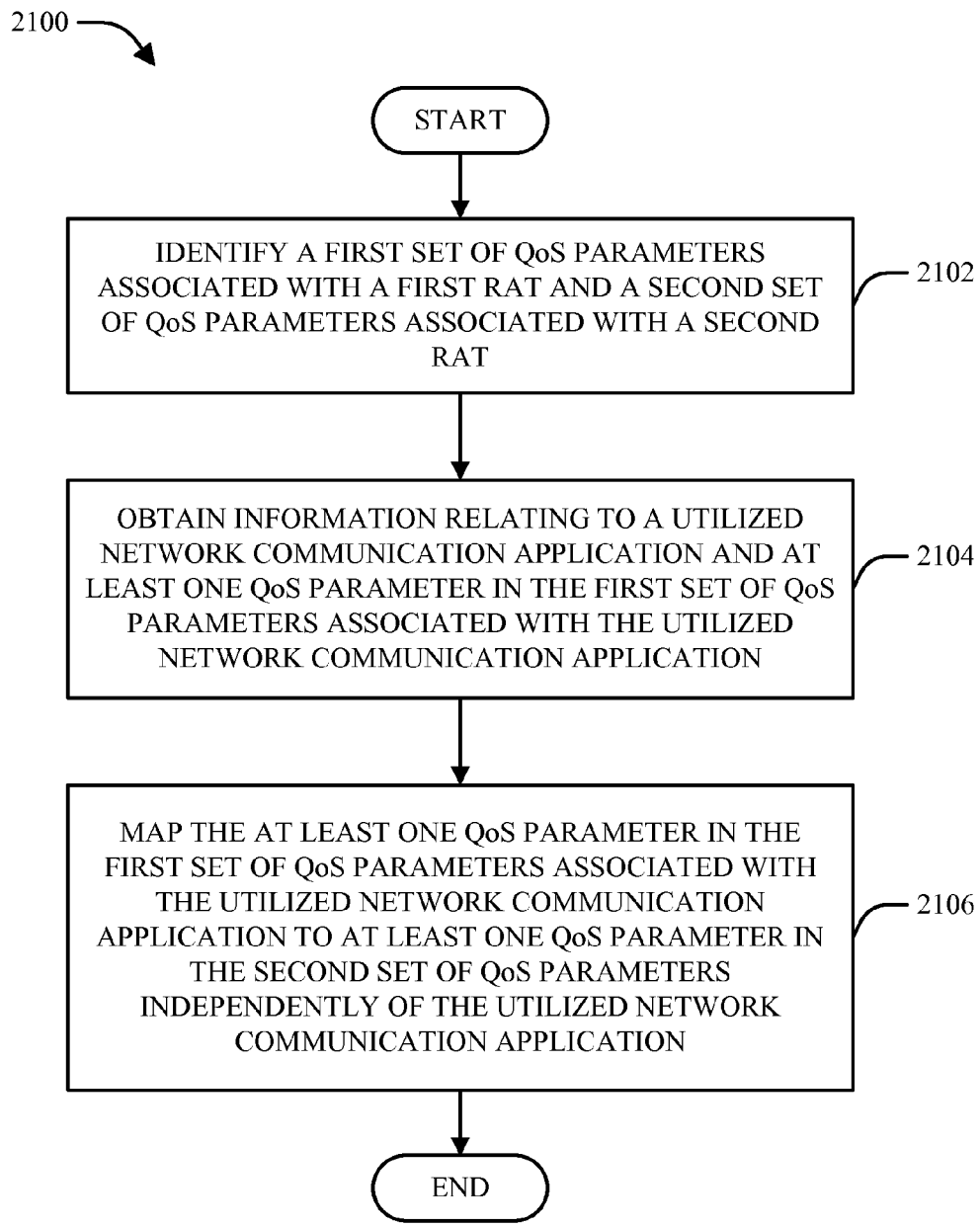
FIGS. 21-22 are flow diagrams of respective methods that facilitate mapping of QoS parameters corresponding to multiple RATs.

Referring now to FIG. 21, a first method 2100 that facilitate mapping of QoS parameters corresponding to multiple RATs is illustrated. Method 2100 can be performed by, for example, a UE, one or more networks serving a UE, and/or any other suitable network entities. Method 2100 begins at block 2102, wherein a first set of QoS parameters associated with a first RAT and a second set of QoS parameters associated with a second RAT are identified. Next, at block 2104, information is obtained relating to a utilized network communication application and at least one QoS parameter in the first set of QoS parameters associated with the utilized network communication application. At block 2106, the at least one QoS parameter in the first set of QoS parameters associated with the utilized network communication application is mapped to at least one QoS parameter in the second set of QoS parameters independently of the utilized network communication application.

Figure 22:
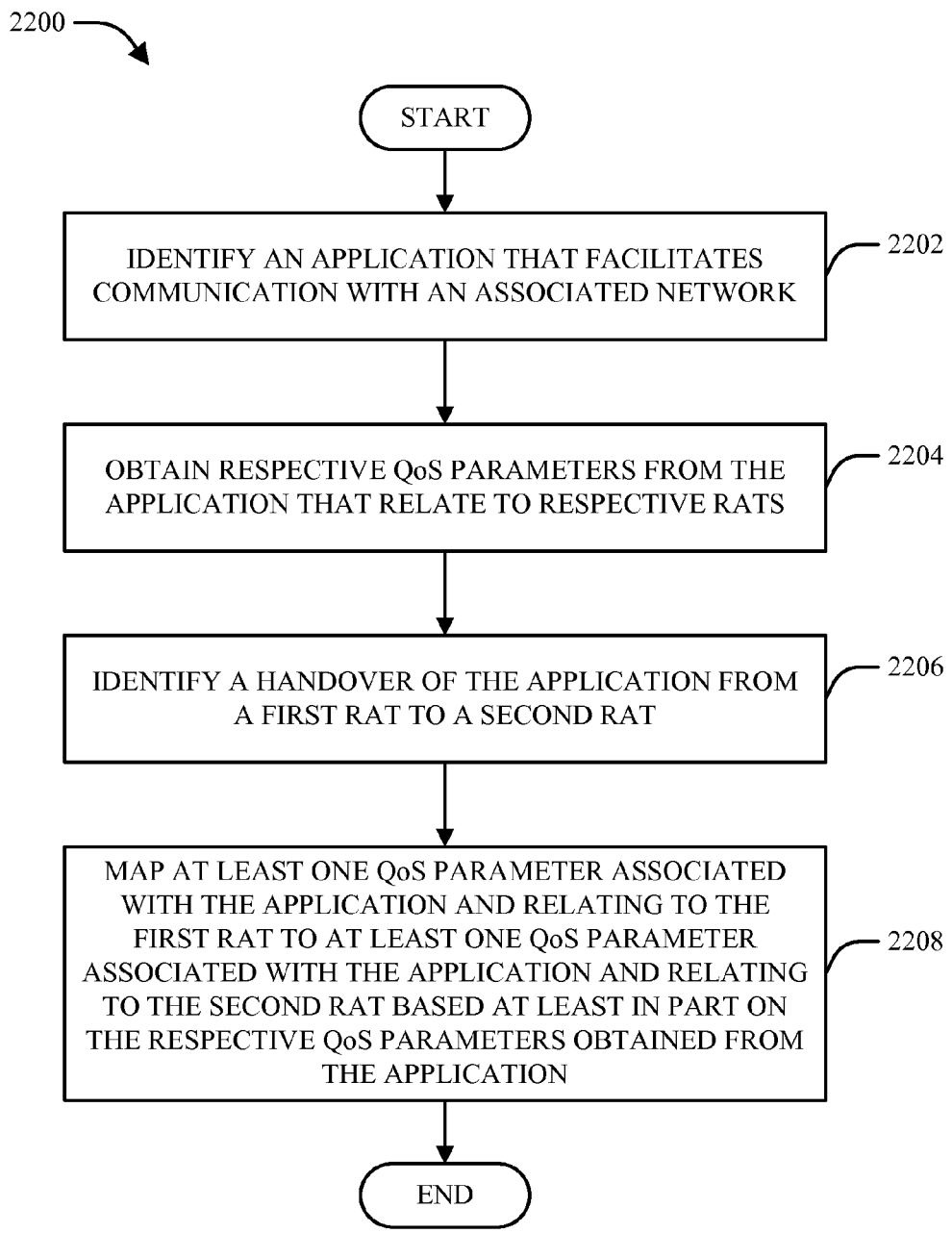

FIG. 22 illustrates a second method 2200 that facilitate mapping of QoS parameters corresponding to multiple RATs. Method 2200 can be performed by, for example, a user device, one or more networks serving a user device, and/or any other suitable network entities. Method 2200 begins at block 2202, wherein an application that facilitates communication with an associated network is identified. At block 2204, respective QoS parameters are obtained from the application that relate to respective RATs. At block 2206, a handover of the application from a first RAT to a second RAT is identified. At block 2208, an entity performing method 2200 can map at least one QoS parameter associated with the application and relating to the first RAT to at least one QoS parameter associated with the application and relating to the second RAT based at least in part on the respective QoS parameters obtained from the application.

Figure 23:
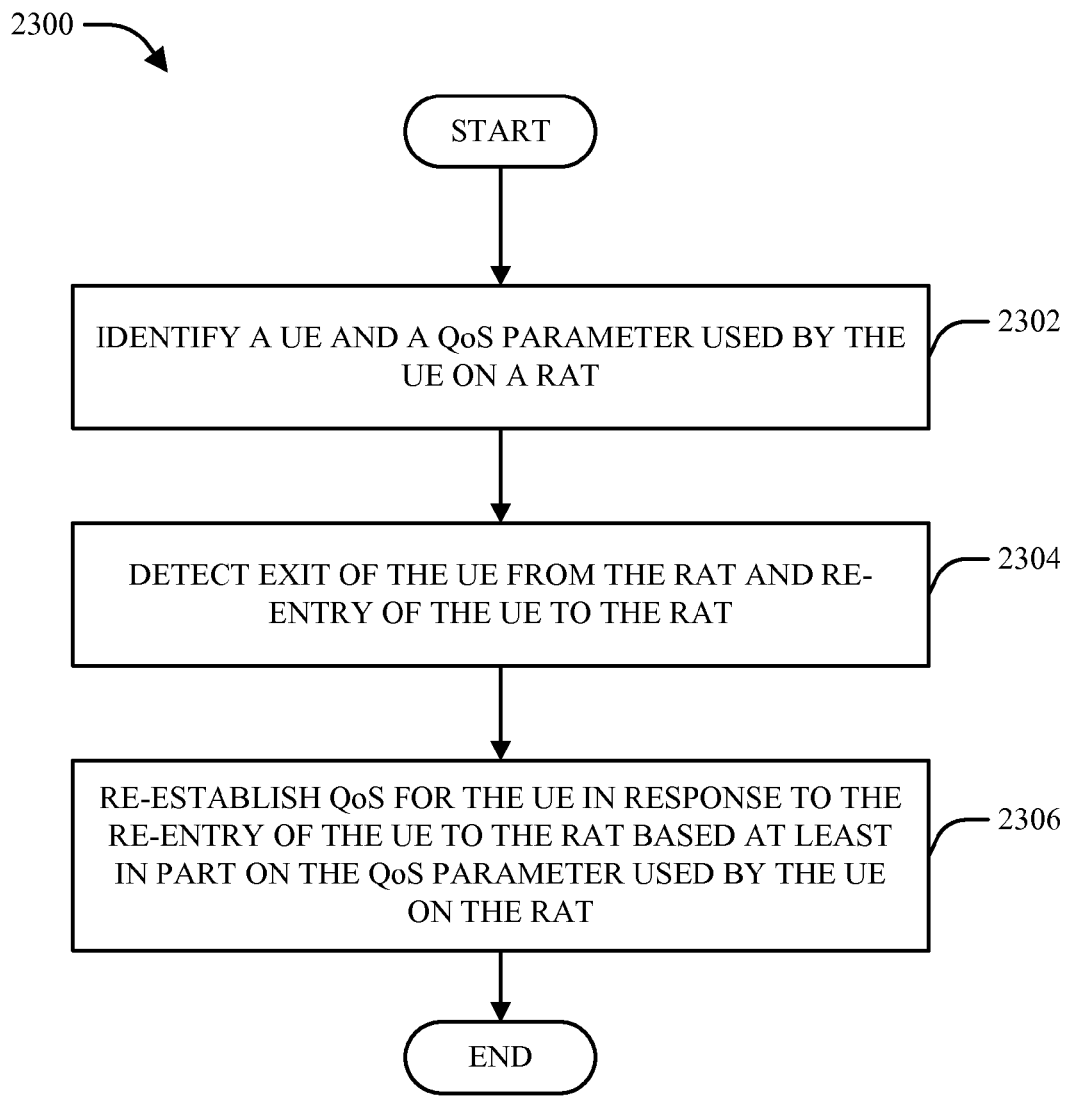
FIGS. 23-24 are flow diagrams of respective methods that facilitate preservation of QoS parameters over multiple inter-RAT handovers.

Turning now to FIG. 23, a first method 2300 that facilitates preservation of QoS parameters over multiple inter-RAT handovers is illustrated. Method 2300 can be performed by, for example, a radio access network and/or any other suitable entity. Method 2300 begins at block 2302, wherein a UE and a QoS parameter used by the UE on a RAT are identified. Next, at block 2304, exit of the UE from the RAT and re-entry of the UE to the RAT is detected. At block 2306, QoS for the UE is re-established in response to the re-entry of the UE to the RAT based at least in part on the QoS parameter used by the UE on the RAT.

Figure 24:
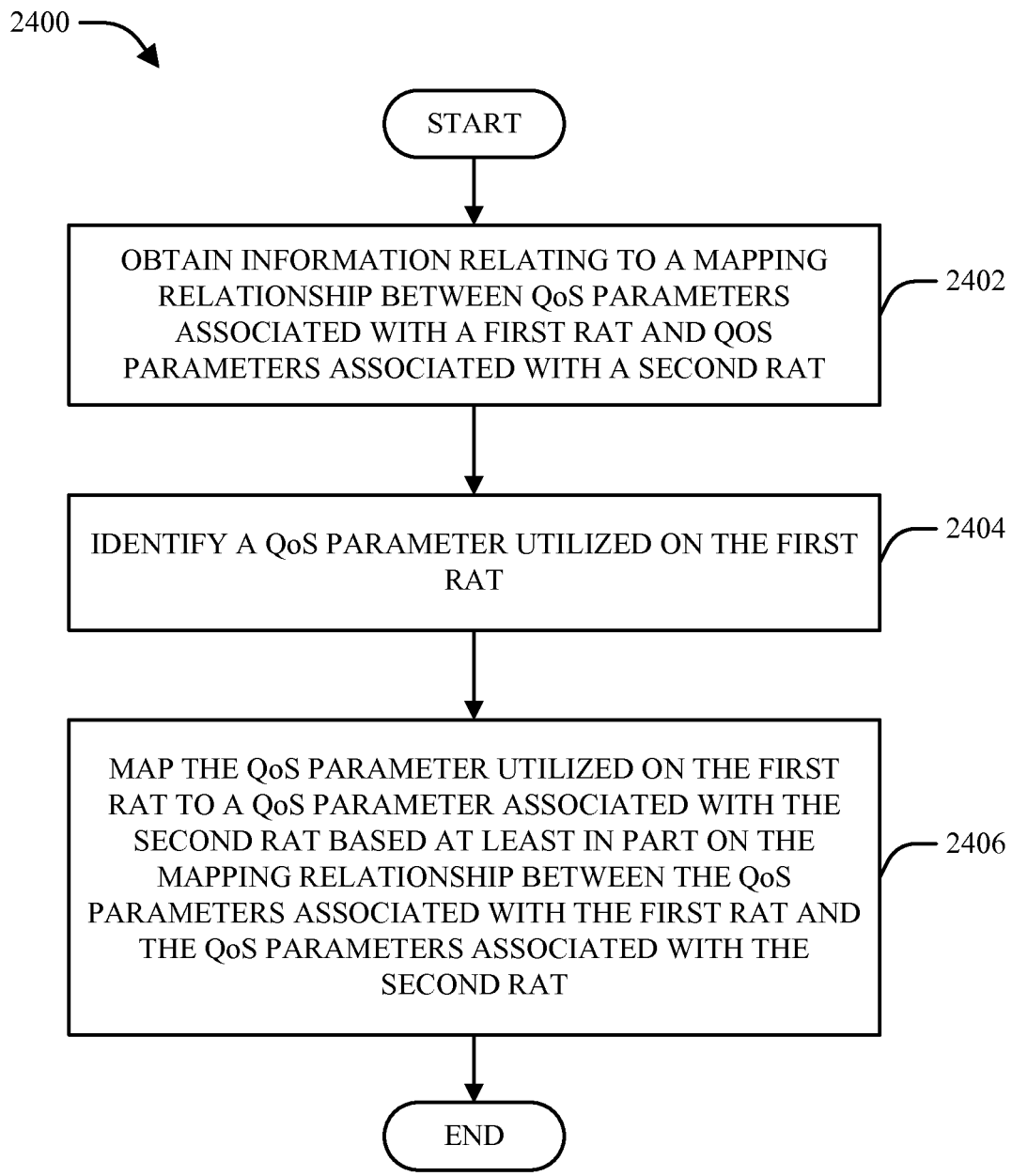

FIG. 24 illustrates a second method 2400 for preserving QoS parameters over multiple inter-RAT handovers. Method 2400 can be performed by, for example, a UE, a network serving a UE, and/or any other suitable entity. Method 2400 can begin at block 2402, wherein information is obtained relating to a mapping relationship between QoS parameters associated with a first RAT and QoS parameters associated with a second RAT. Next, at block 2404, a QoS parameter utilized on the first RAT is identified. At block 2406, the QoS parameter utilized on the first RAT is mapped to a QoS parameter associated with the second RAT based at least in part on the mapping relationship between the QoS parameters associated with the first RAT and the QoS parameters associated with the second RAT.

Figure 25:
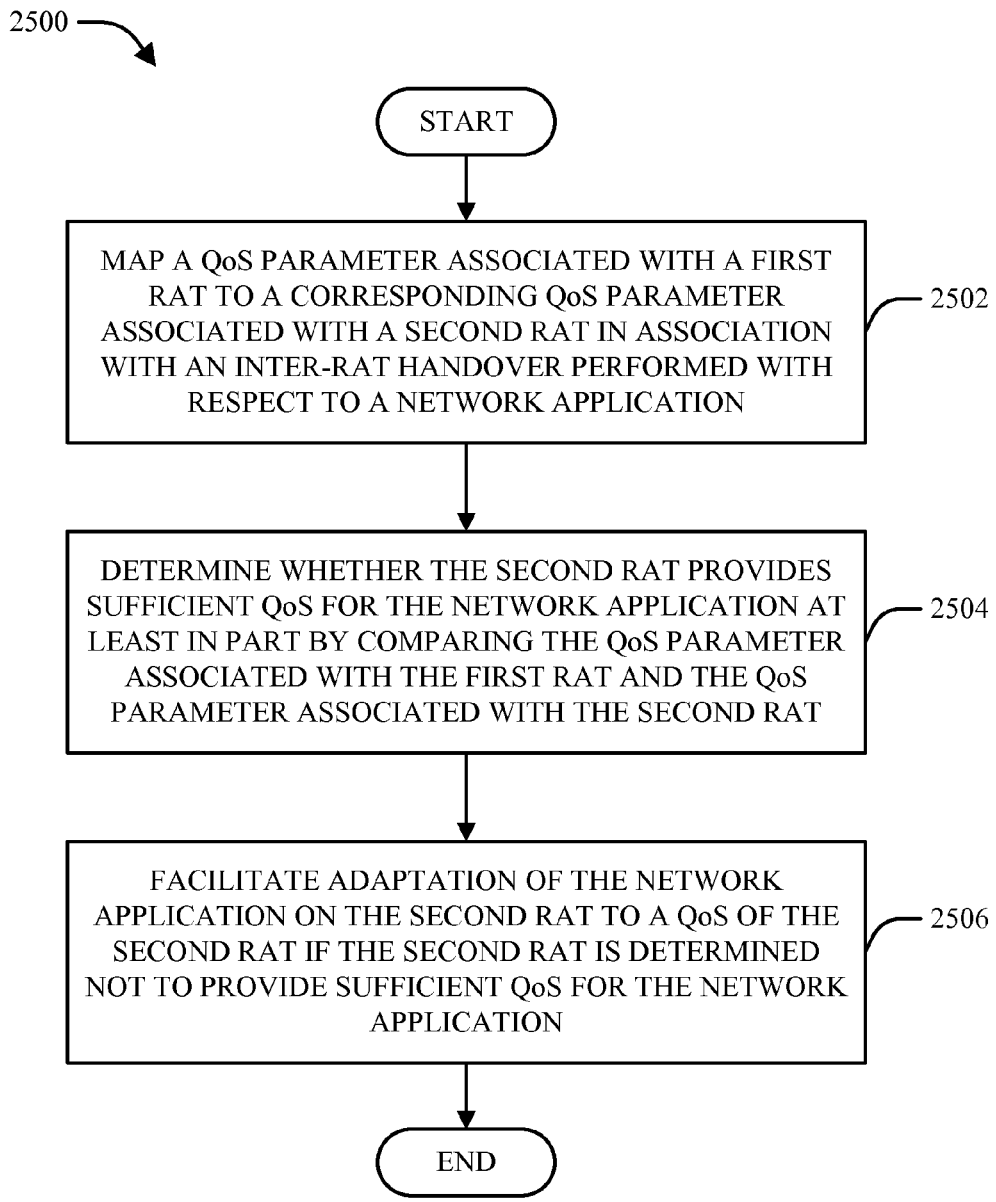
FIG. 25 is a flow diagram of a method for adapting operation of a network application in the case of downgraded QoS following an inter-RAT handover.

Referring to FIG. 25, a method 2500 for adapting operation of a network application in the case of downgraded QoS following an inter-RAT handover is illustrated. Method 2500 can be performed by, for example, a mobile device and/or any other suitable network entity. Method 2500 begins at block 2502, wherein a QoS parameter associated with a first RAT is mapped to a corresponding QoS parameter associated with a second RAT in association with an inter-RAT handover performed with respect to a network application. At block 2504, it is determined whether the second RAT provides sufficient QoS for the network application at least in part by comparing the QoS parameter associated with the first RAT and the QoS parameter associated with the second RAT. At block 2506, an entity performing method 2500 can facilitate adaptation of the network application on the second RAT to a QoS of the second RAT if the second RAT is determined not to provide sufficient QoS for the network application.

Figure 26:
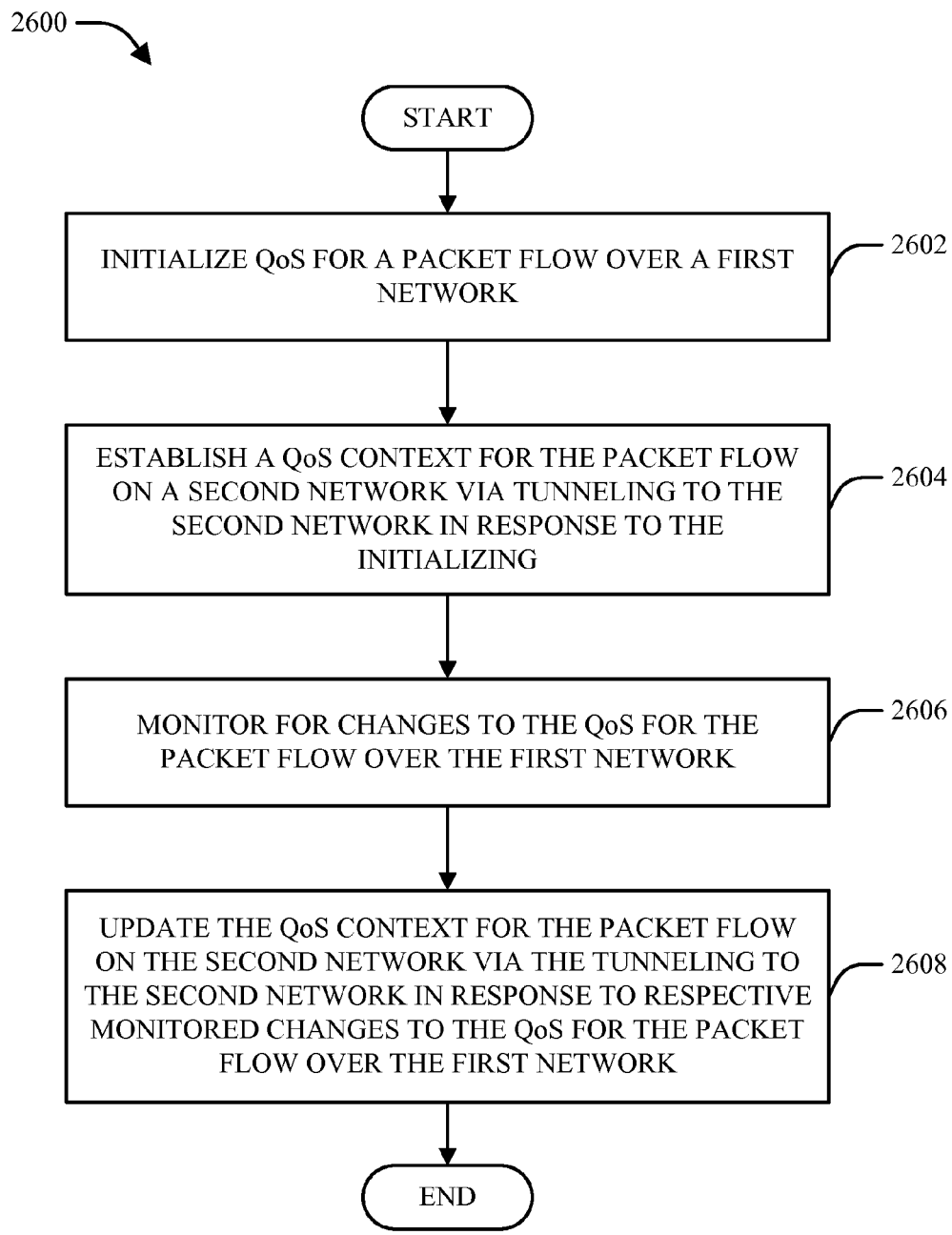
FIGS. 26-27 are flow diagrams of respective methods for utilizing tunneling to maintain QoS information over multiple RATs.

FIG. 26 illustrates a first method 2600 for utilizing tunneling to maintain QoS information over multiple RATs. Method 2600 can be performed by, for example, a UE and/or any other suitable network entities. Method 2600 begins at block 2602, wherein QoS is initialized for a packet flow over a first network. Next, at block 2604, a QoS context is established for the packet flow on a second network via tunneling to the second network in response to the initializing. At block 2606, monitoring is performed for changes to the QoS for the packet flow over the first network. At block 2608, the QoS context for the packet flow is updated on the second network via the tunneling to the second network in response to respective monitored changes to the QoS for the packet flow over the first network.

Figure 27:
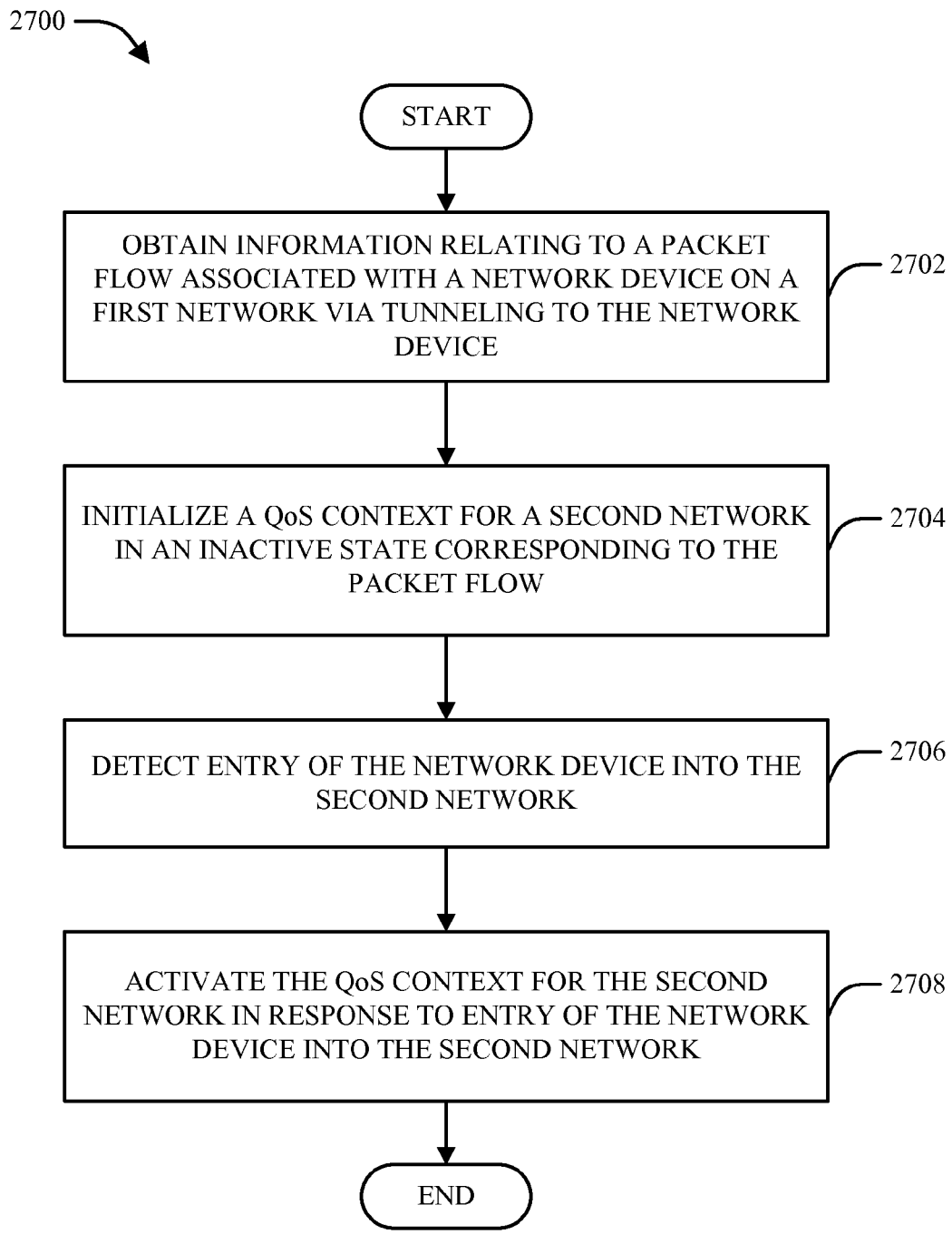

FIG. 27 illustrates a second method 2700 for utilizing tunneling to maintain QoS information over multiple RATs. Method 2700 can be performed by, for example, a network serving one or more UEs and/or any other suitable network entities. Method 2700 begins at block 2702, wherein information relating to a packet flow associated with a network device on a first network is obtained via tunneling to the network device. At block 2704, a QoS context is initialized for a second network in an inactive state corresponding to the packet flow. At block 2706, entry of the network device into the second network is detected. At block 2708, the QoS context for the second network is activated in response to entry of the network device into the second network.

Figure 28:
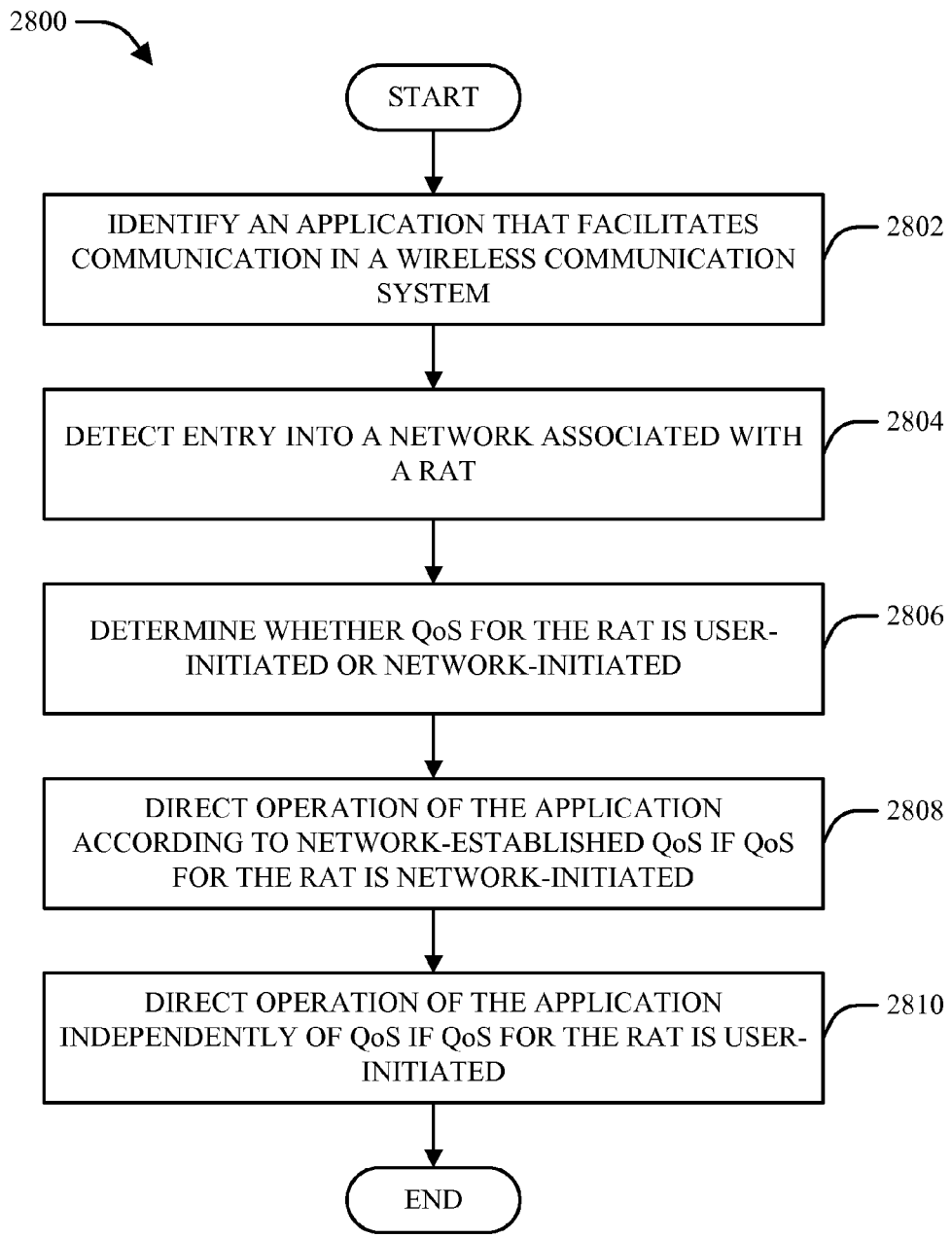
FIGS. 28-29 are flow diagrams of respective methods for handling QoS establishment operation during an inter-RAT handover.

Referring now to FIG. 28, a first method 2800 for handling QoS establishment operation during an inter-RAT handover is illustrated. Method 2800 can be performed by, for example, a UE and/or any other suitable network entity. Method 2800 can begin at block 2802, wherein an application that facilitates communication in a wireless communication system is identified. At block 2804, entry into a network associated with a RAT is detected. At block 2806, it is determined whether QoS for the RAT is user-initiated or network-initiated. At block 2808, operation of the application is directed according to network-established QoS if QoS for the RAT is network-initiated. Additionally or alternatively, at block 2810, operation of the application is directed independently of QoS if QoS for the RAT is user-initiated.

Figure 29:
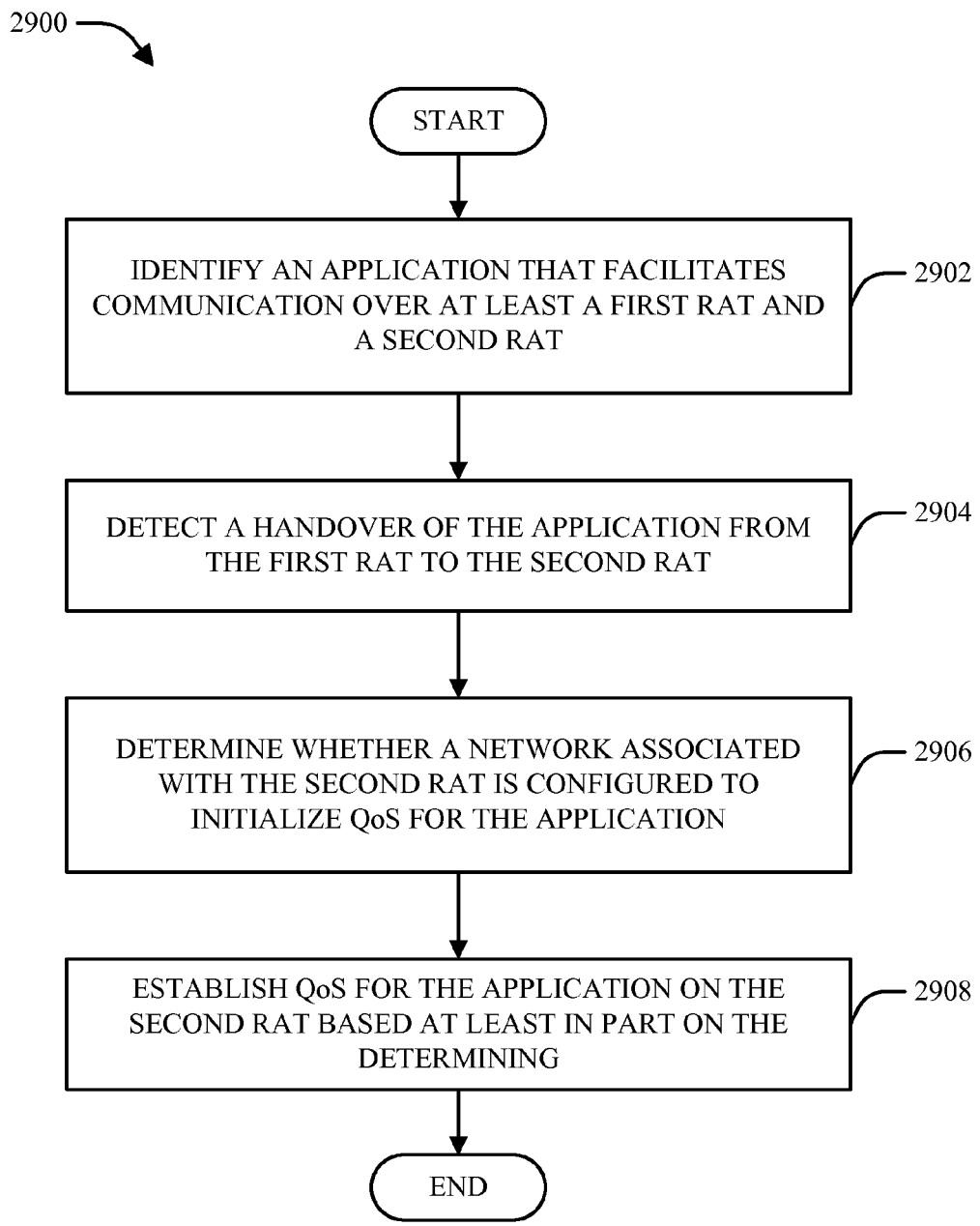

Turning to FIG. 29, a second method 2900 for handling QoS establishment operation during an inter-RAT handover is illustrated. Method 2900 can be performed by, for example, a UE and/or any other suitable network entity. Method 2900 can begin at block 2902, wherein an application that facilitates communication over at least a first RAT and a second RAT is identified. At block 2904, a handover of the application from the first RAT to the second RAT is detected. At block 2906, it is determined whether a network associated with the second RAT is configured to initialize QoS for the application. At block 2908, QoS for the application is established on the second RAT based at least in part on the determining.

Referring next to FIGS. 30-43, respective apparatuses 3000-4300 that can facilitate various aspects described herein are illustrated. It is to be appreciated that apparatuses 3000-4300 are represented as including functional blocks, which can be functional blocks that represent functions implemented by a processor, software, or combination thereof (e.g., firmware).

Figure 30:
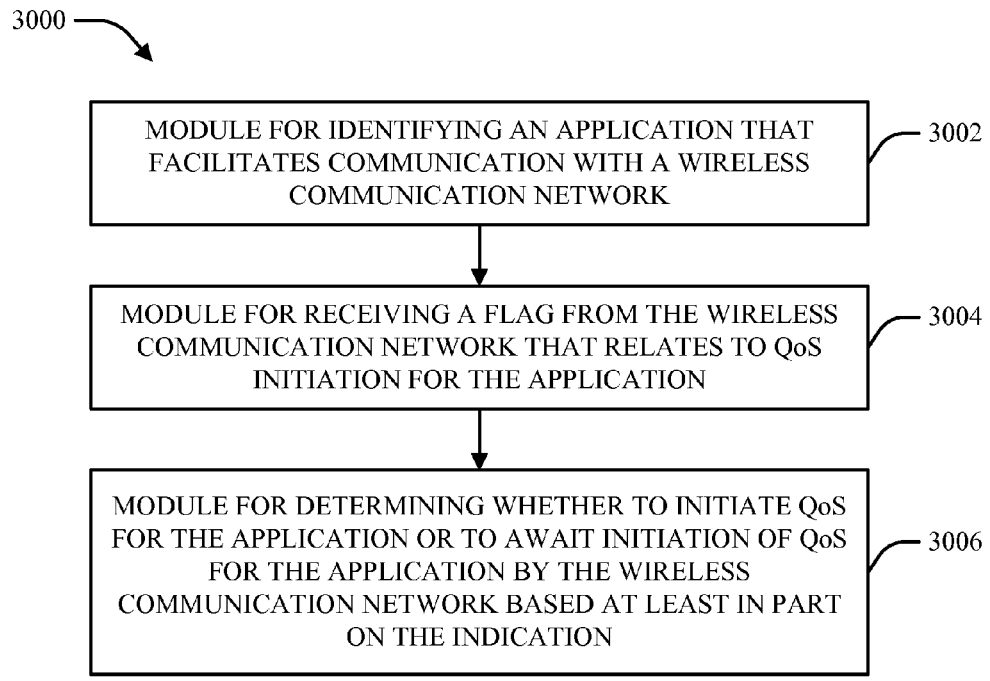
FIGS. 30-43 are block diagrams of respective apparatuses that facilitate efficient QoS context transfer with respect to an inter-RAT handover in a wireless communication system.

With reference first to FIG. 30, a first apparatus 3000 that facilitates efficient QoS context transfer with respect to an inter-RAT handover in a wireless communication system is illustrated. Apparatus 3000 can be implemented by a UE (e.g., UE 102) and/or any other suitable network entity and can include a module 3002 for identifying an application that facilitates communication with a wireless communication network, a module 3004 for receiving a flag from the wireless communication network that relates to QoS initiation for the application, and a module 3006 for determining whether to initiate QoS for the application or to await initiation of QoS for the application by the wireless communication network based at least in part on the indication.

Figure 31:
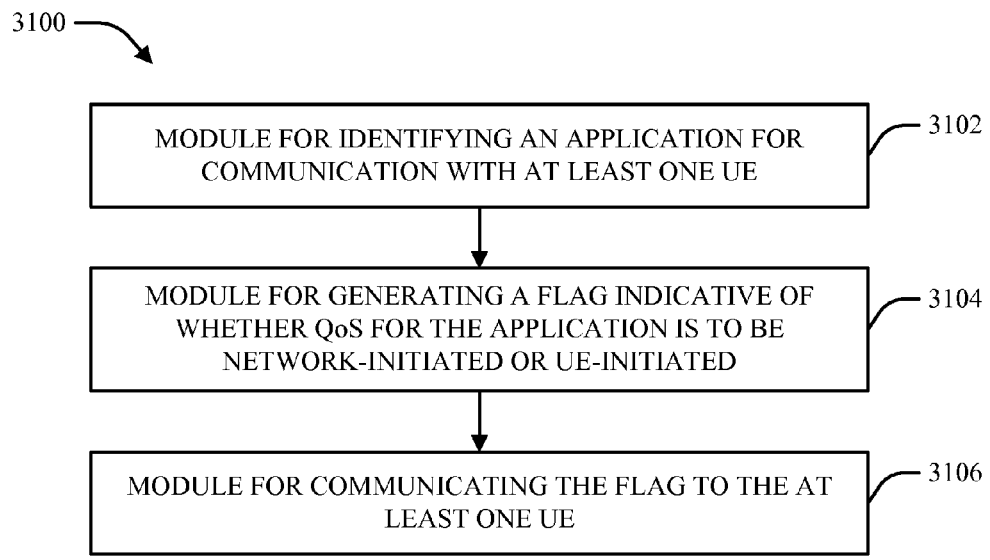

FIG. 31 illustrates a second apparatus 3100 that facilitates efficient QoS context transfer with respect to an inter-RAT handover in a wireless communication system. Apparatus 3100 can be implemented by a communication network (e.g., network 104) and/or any other suitable network entity and can include a module 3102 for identifying an application for communication with at least one UE, a module 3104 for generating a flag indicative of whether QoS for the application is to be network-initiated or UE-initiated, and a module 3106 for communicating the flag to the at least one UE.

Figure 32:
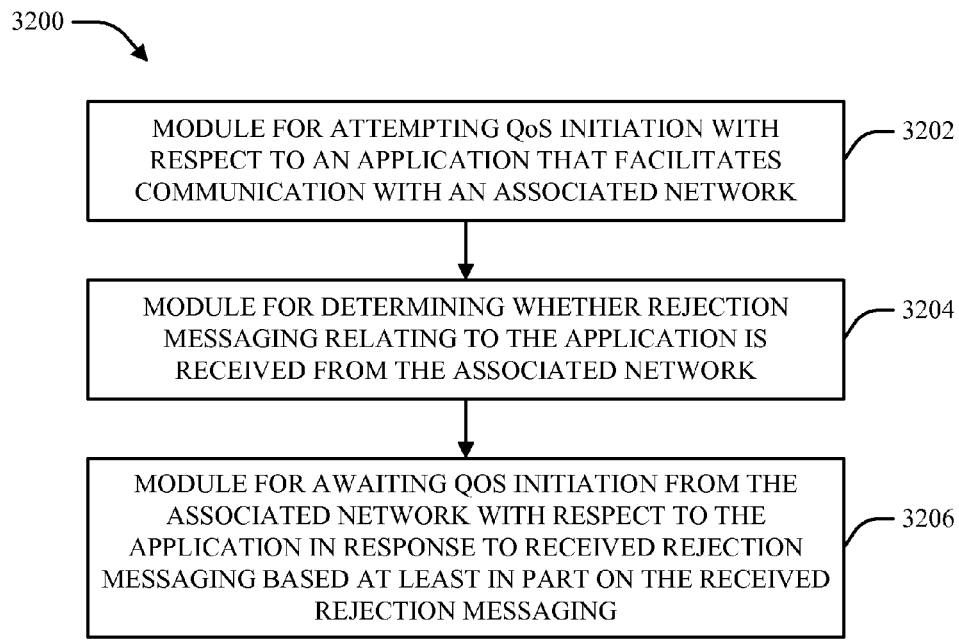

Turning next to FIG. 32, a third apparatus 3200 that facilitates efficient QoS context transfer with respect to an inter-RAT handover in a wireless communication system is illustrated. Apparatus 3200 can be implemented by a UE and/or any other suitable network entity and can include a module 3202 for attempting QoS initiation with respect to an application that facilitates communication with an associated network, a module 3204 for determining whether rejection messaging relating to the application is received from the associated network, and a module 3206 for awaiting QoS initiation from the associated network with respect to the application in response to received rejection messaging based at least in part on the received rejection messaging.

Figure 33:
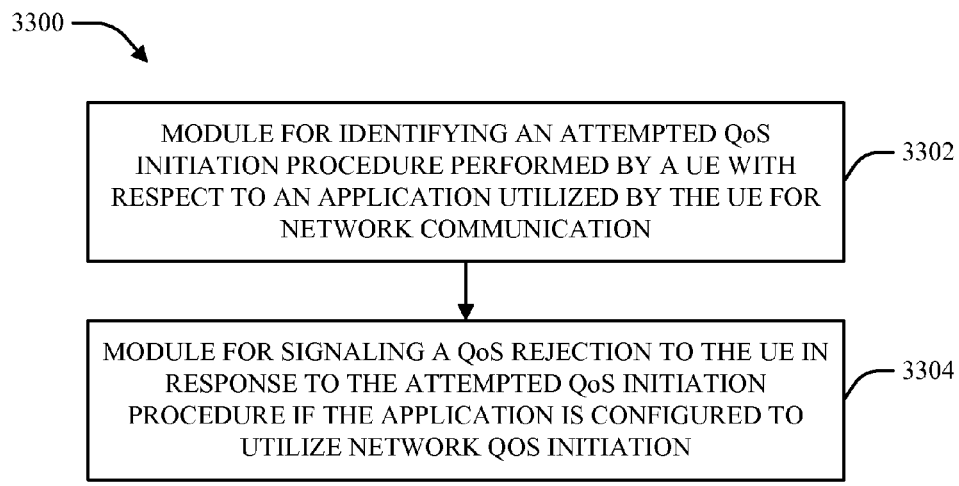

FIG. 33 illustrates a fourth apparatus 3300 that facilitates efficient QoS context transfer with respect to an inter-RAT handover in a wireless communication system. Apparatus 3300 can be implemented by a communication network and/or any other suitable network entity and can include a module 3302 for identifying an attempted QoS initiation procedure performed by a UE with respect to an application utilized by the UE for network communication and a module 3304 for signaling a QoS rejection to the UE in response to the attempted QoS initiation procedure if the application is configured to utilize network QoS initiation.

Figure 34:
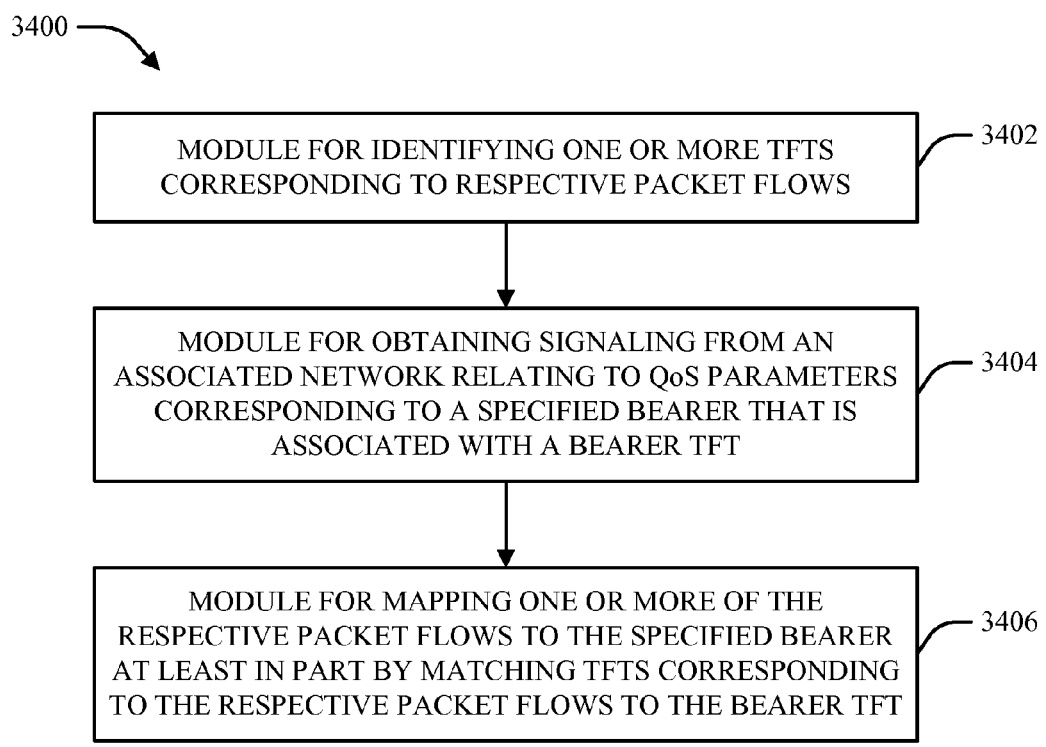

Referring to FIG. 34, a fifth apparatus 3400 that facilitates efficient QoS context transfer with respect to an inter-RAT handover in a wireless communication system is illustrated. Apparatus 3400 can be implemented by a network device and/or any other suitable network entity and can include a module 3402 for identifying one or more TFTs corresponding to respective packet flows, a module 3404 for obtaining signaling from an associated network relating to QoS parameters corresponding to a specified bearer that is associated with a bearer TFT, and a module 3406 for mapping one or more of the respective packet flows to the specified bearer at least in part by matching TFTs corresponding to the respective packet flows to the bearer TFT.

Figure 35:
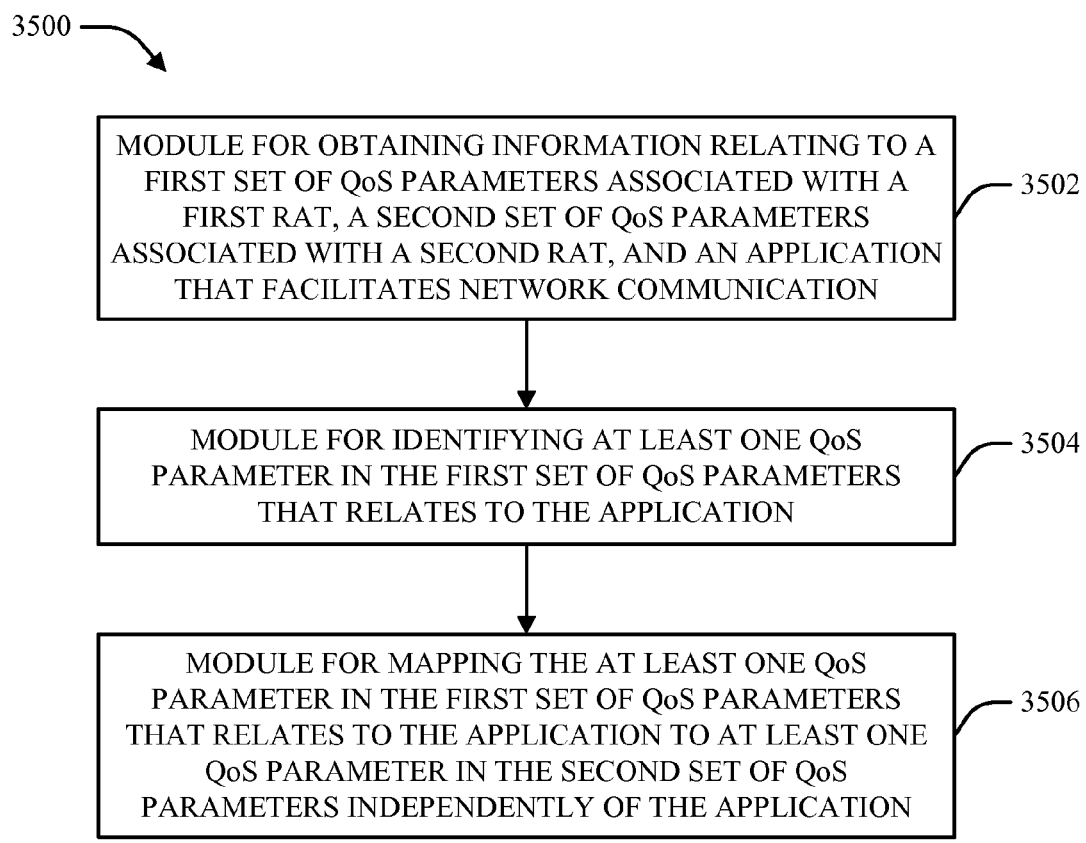

With reference next to FIG. 35, a sixth apparatus 3500 that facilitates efficient QoS context transfer with respect to an inter-RAT handover in a wireless communication system is illustrated. Apparatus 3500 can be implemented by a UE, a network serving one or more UEs, and/or any other suitable entities and can include a module 3502 for obtaining information relating to a first set of QoS parameters associated with a first RAT, a second set of QoS parameters associated with a second RAT, and an application that facilitates network communication; a module 3504 for identifying at least one QoS parameter in the first set of QoS parameters that relates to the application; and a module 3506 for mapping the at least one QoS parameter in the first set of QoS parameters that relates to the application to at least one QoS parameter in the second set of QoS parameters independently of the application.

Figure 36:
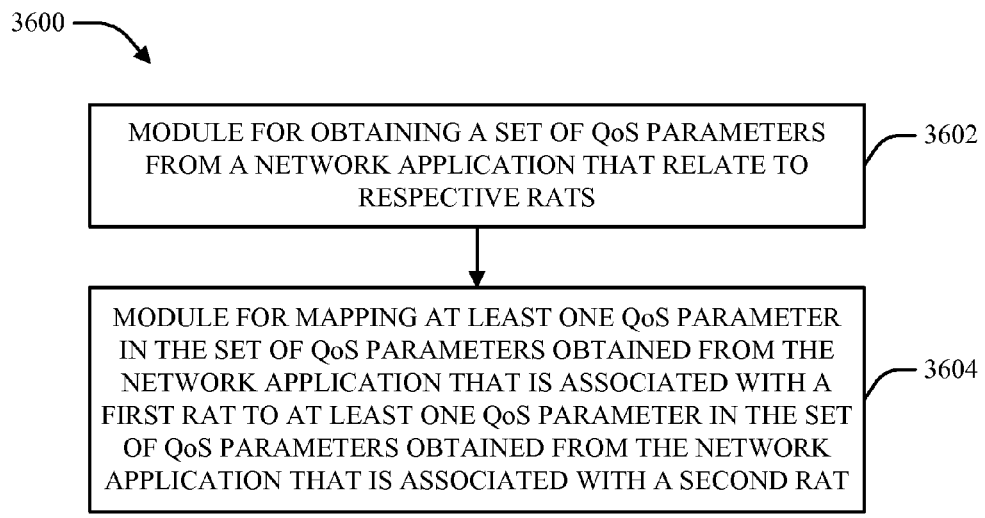

FIG. 36 illustrates a seventh apparatus 3600 that facilitates efficient QoS context transfer with respect to an inter-RAT handover in a wireless communication system. Apparatus 3600 can be implemented by a UE, a network serving one or more UEs, and/or any other suitable entities and can include a module 3602 for obtaining a set of QoS parameters from a network application that relate to respective RATs and a module 3604 for mapping at least one QoS parameter in the set of QoS parameters obtained from the network application that is associated with a first RAT to at least one QoS parameter in the set of QoS parameters obtained from the network application that is associated with a second RAT.

Figure 37:
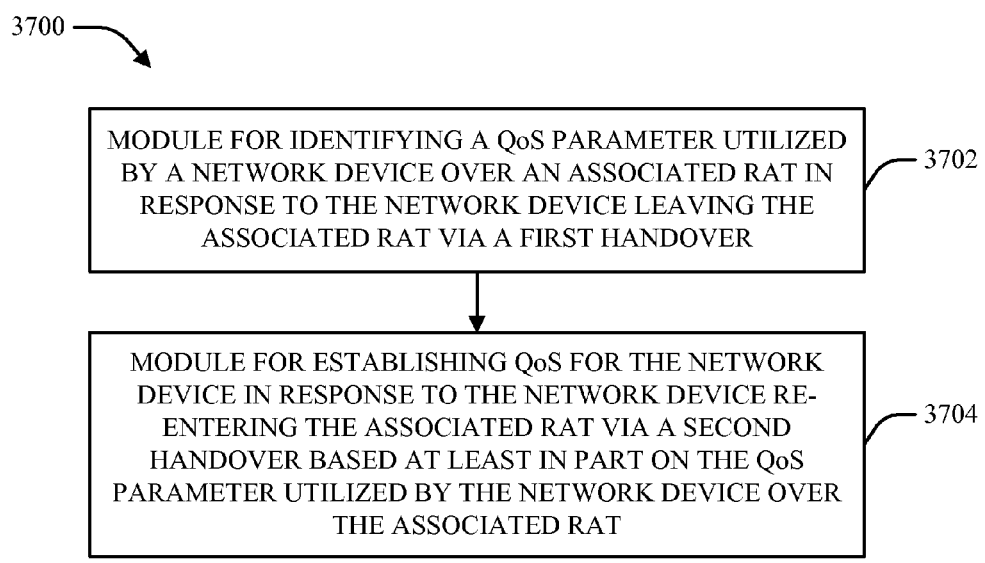

Turning to FIG. 37, an eighth apparatus 3700 that facilitates efficient QoS context transfer with respect to an inter-RAT handover in a wireless communication system is illustrated. Apparatus 3700 can be implemented by a communication network and/or any other suitable network entity and can include a module 3702 for identifying a QoS parameter utilized by a network device over an associated RAT in response to the network device leaving the associated RAT via a first handover and a module 3704 for establishing QoS for the network device in response to the network device re-entering the associated RAT via a second handover based at least in part on the QoS parameter utilized by the network device over the associated RAT.

Figure 38:
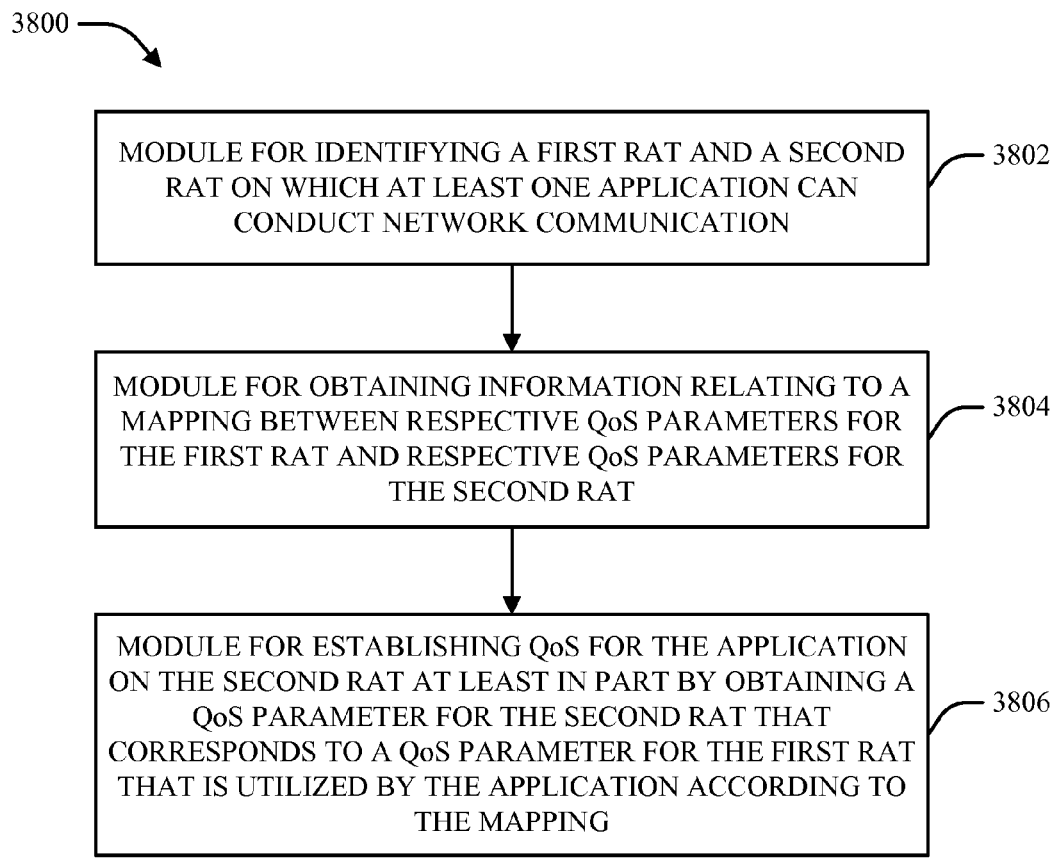

Referring next to FIG. 38, a ninth apparatus 3800 that facilitates efficient QoS context transfer with respect to an inter-RAT handover in a wireless communication system is illustrated. Apparatus 3800 can be implemented by a mobile device, a network serving one or more mobile devices, and/or any other suitable entity and can include a module 3802 for identifying a first RAT and a second RAT on which at least one application can conduct network communication, a module 3804 for obtaining information relating to a mapping between respective QoS parameters for the first RAT and respective QoS parameters for the second RAT, and a module 3806 for establishing QoS for the application on the second RAT at least in part by obtaining a QoS parameter for the second RAT that corresponds to a QoS parameter for the first RAT that is utilized by the application according to the mapping.

Figure 39:
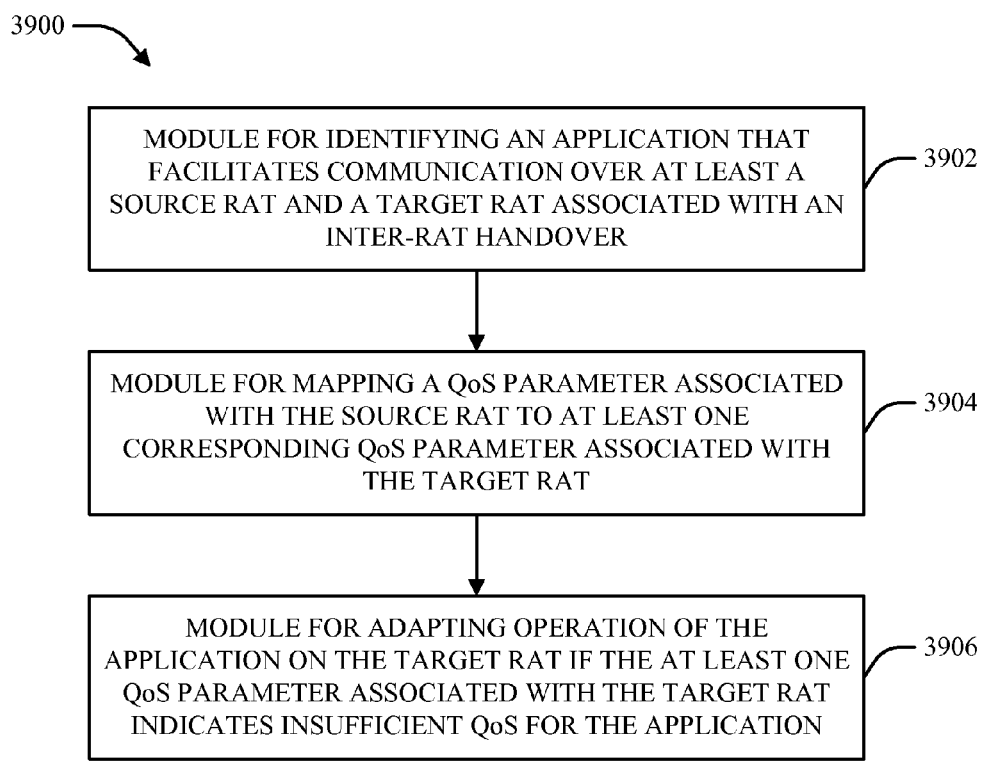

FIG. 39 illustrates a tenth apparatus 3900 that facilitates efficient QoS context transfer with respect to an inter-RAT handover in a wireless communication system. Apparatus 3900 can be implemented by a UE and/or any other suitable network entity and can include a module 3902 for identifying an application that facilitates communication over at least a source RAT and a target RAT associated with an inter-RAT handover, a module 3904 for mapping a QoS parameter associated with the source RAT to at least one corresponding QoS parameter associated with the target RAT, and a module 3906 for adapting operation of the application on the target RAT if the at least one QoS parameter associated with the target RAT indicates insufficient QoS for the application.

Figure 40:
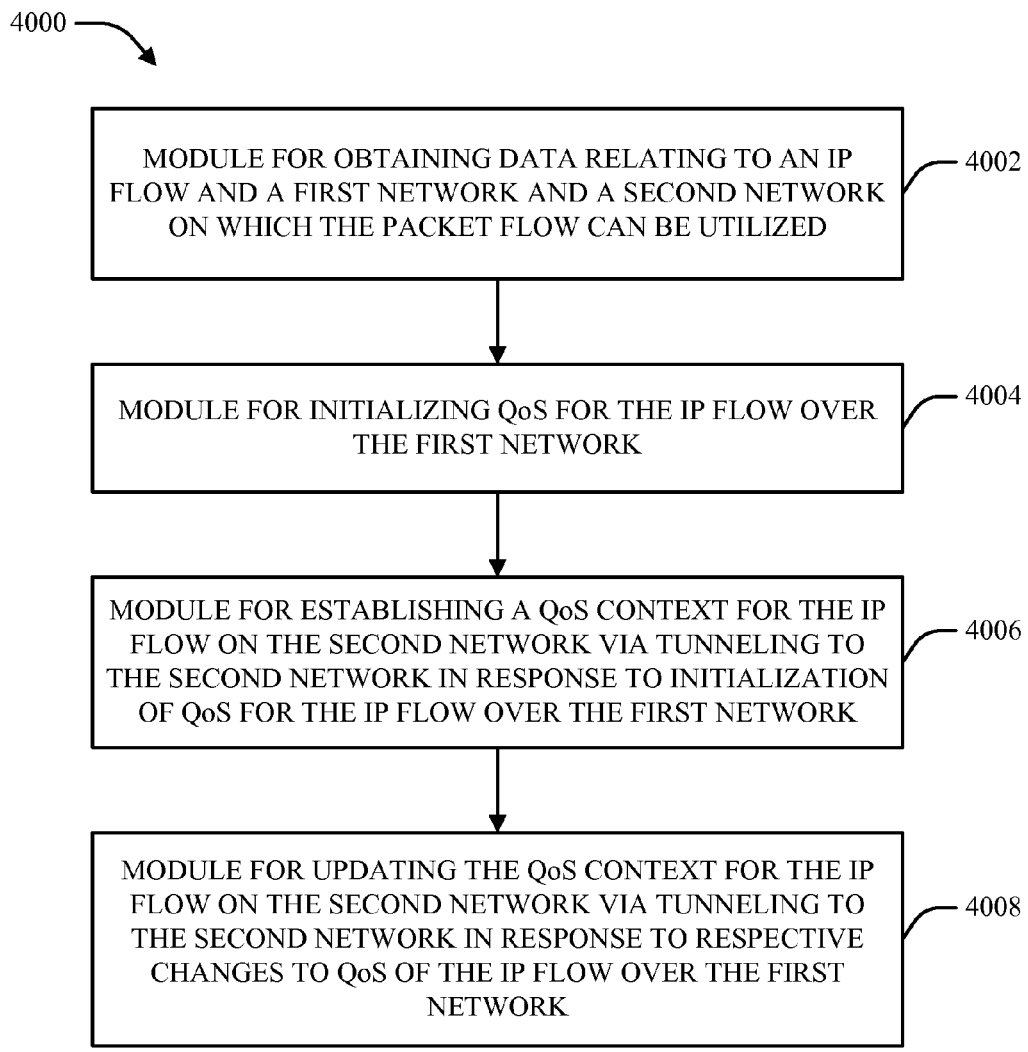

FIG. 40 illustrates an eleventh apparatus 4000 that facilitates efficient QoS context transfer with respect to an inter-RAT handover in a wireless communication system. Apparatus 4000 can be implemented by a UE and/or any other suitable network entity and can include a module 4002 for obtaining data relating to an IP flow and a first network and a second network on which the packet flow can be utilized, a module 4004 for initializing QoS for the IP flow over the first network, a module 4006 for establishing a QoS context for the IP flow on the second network via tunneling to the second network in response to initialization of QoS for the IP flow over the first network, and a module 4008 for updating the QoS context for the IP flow on the second network via tunneling to the second network in response to respective changes to QoS of the IP flow over the first network.

Figure 41:
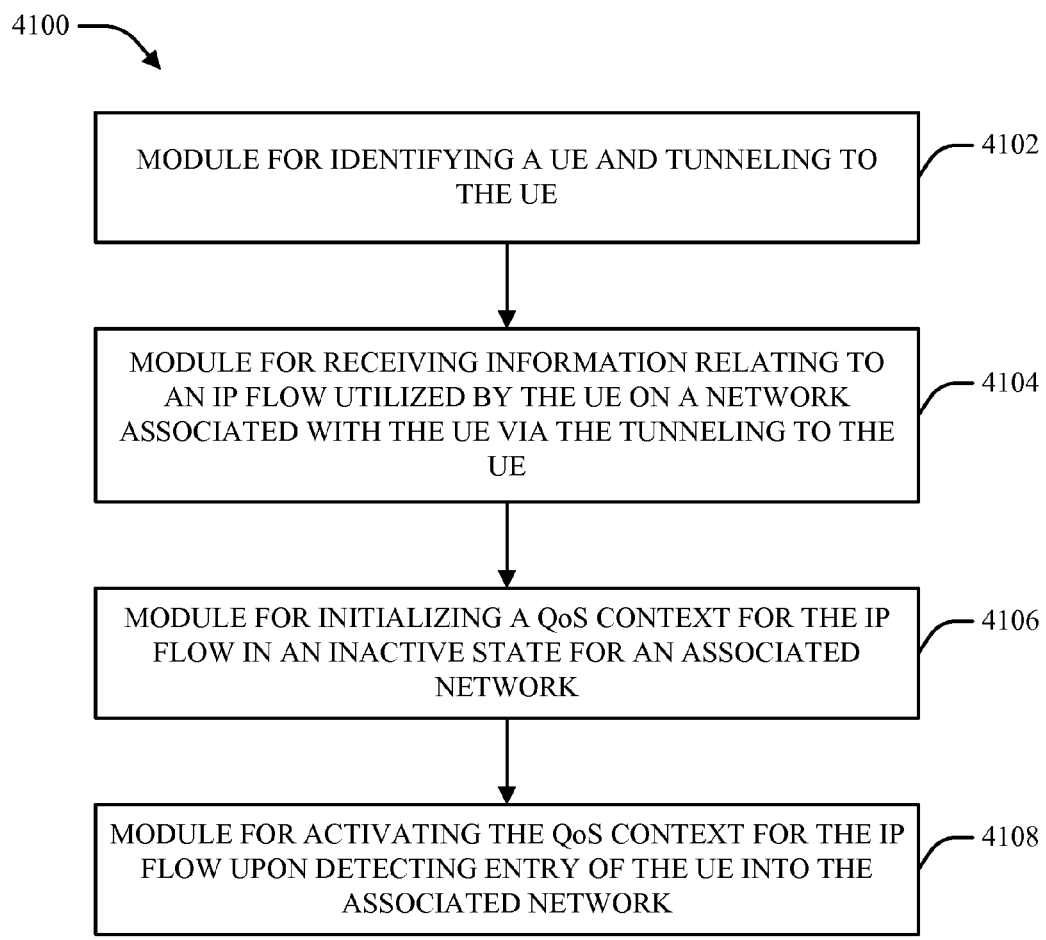

With reference next to FIG. 41, a twelfth apparatus 4100 that facilitates efficient QoS context transfer with respect to an inter-RAT handover in a wireless communication system is illustrated. Apparatus 4100 can be implemented by a radio access network and/or any other suitable wireless communication entity and can include a module 4102 for identifying a UE and tunneling to the UE, a module 4104 for receiving information relating to an IP flow utilized by the UE on a network associated with the UE via the tunneling to the UE, a module 4106 for initializing a QoS context for the IP flow in an inactive state for An associated network, and a module 4108 for activating the QoS context for the IP flow upon detecting entry of the UE into the associated network.

Figure 42:
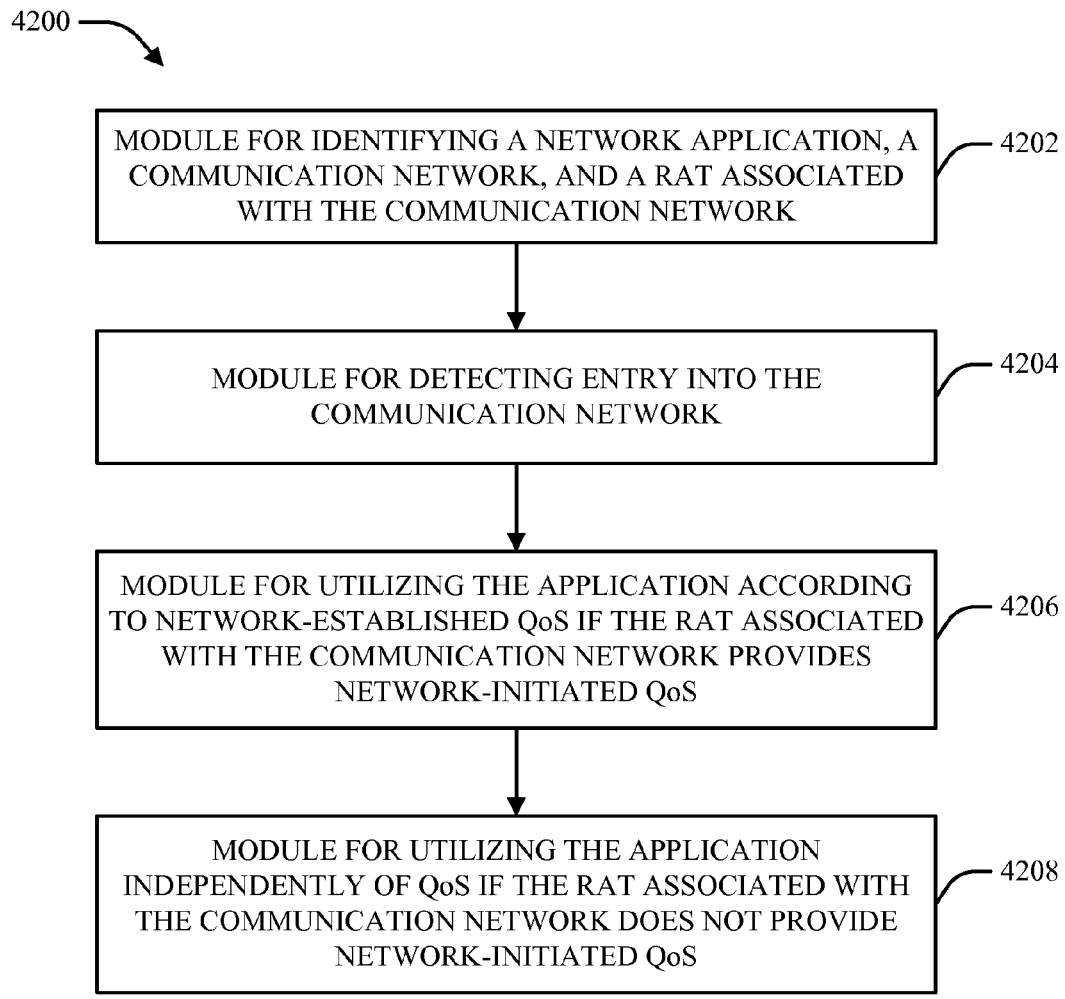

Turning to FIG. 42, a thirteenth apparatus 4200 that facilitates efficient QoS context transfer with respect to an inter-RAT handover in a wireless communication system is illustrated. Apparatus 4200 can be implemented by a UE and/or any other suitable wireless communication entity and can include a module 4202 for identifying a network application, a communication network, and a RAT associated with the communication network; a module 4204 for detecting entry into the communication network; a module 4206 for utilizing the application according to network-established QoS if the RAT associated with the communication network provides network-initiated QoS; and a module 4208 for utilizing the application independently of QoS if the RAT associated with the communication network does not provide network-initiated QoS.

Figure 43:
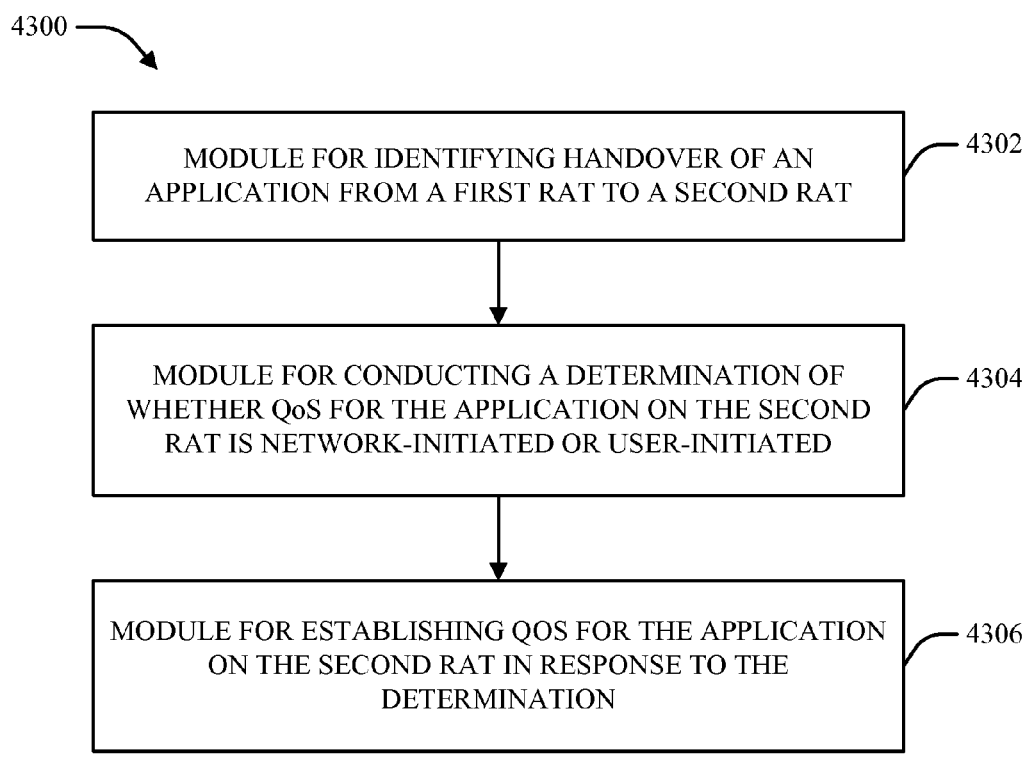

FIG. 43 illustrates a fourteenth apparatus 4300 that facilitates efficient QoS context transfer with respect to an inter-RAT handover in a wireless communication system. Apparatus 4300 can be implemented by a mobile device and/or any other suitable network entity and can include a module 4302 for identifying handover of an application from a first RAT to a second RAT, a module 4304 for conducting a determination of whether QoS for the application on the second RAT is network-initiated or user-initiated, and a module 4306 for establishing QoS for the application on the second RAT in response to the determination.

Figure 44:
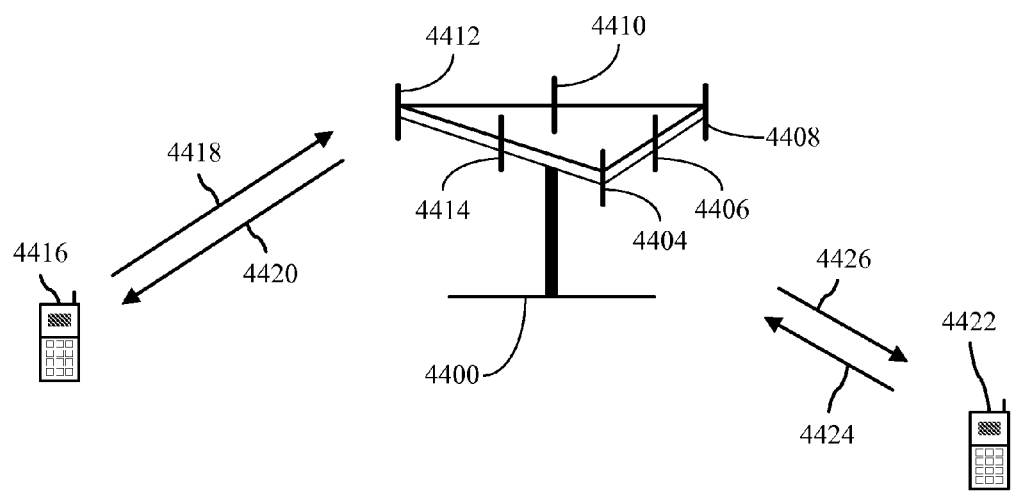
FIG. 44 illustrates a wireless multiple-access communication system in accordance with various aspects set forth herein.

Referring now to FIG. 44, an illustration of a wireless multiple-access communication system is provided in accordance with various aspects. In one example, an access point 4400 (AP) includes multiple antenna groups. As illustrated in FIG. 44, one antenna group can include antennas 4404 and 4406, another can include antennas 4408 and 4410, and another can include antennas 4412 and 4414. While only two antennas are shown in FIG. 44 for each antenna group, it should be appreciated that more or fewer antennas may be utilized for each antenna group. In another example, an access terminal 4416 can be in communication with antennas 4412 and 4414, where antennas 4412 and 4414 transmit information to access terminal 4416 over forward link 4420 and receive information from access terminal 4416 over reverse link 4418. Additionally and/or alternatively, access terminal 4422 can be in communication with antennas 4406 and 4408, where antennas 4406 and 4408 transmit information to access terminal 4422 over forward link 4426 and receive information from access terminal 4422 over reverse link 4424. In a frequency division duplex system, communication links 4418, 4420, 4424 and 4426 can use different frequency for communication. For example, forward link 4420 may use a different frequency then that used by reverse link 4418.

Each group of antennas and/or the area in which they are designed to communicate can be referred to as a sector of the access point. In accordance with one aspect, antenna groups can be designed to communicate to access terminals in a sector of areas covered by access point 4400. In communication over forward links 4420 and 4426, the transmitting antennas of access point 4400 can utilize beamforming in order to improve the signal-to-noise ratio of forward links for the different access terminals 4416 and 4422. Also, an access point using beamforming to transmit to access terminals scattered randomly through its coverage causes less interference to access terminals in neighboring cells than an access point transmitting through a single antenna to all its access terminals.

An access point, e.g., access point 4400, can be a fixed station used for communicating with terminals and can also be referred to as a base station, an eNB, an access network, and/or other suitable terminology. In addition, an access terminal, e.g., an access terminal 4416 or 4422, can also be referred to as a mobile terminal, user equipment, a wireless communication device, a terminal, a wireless terminal, and/or other appropriate terminology.

Figure 45:
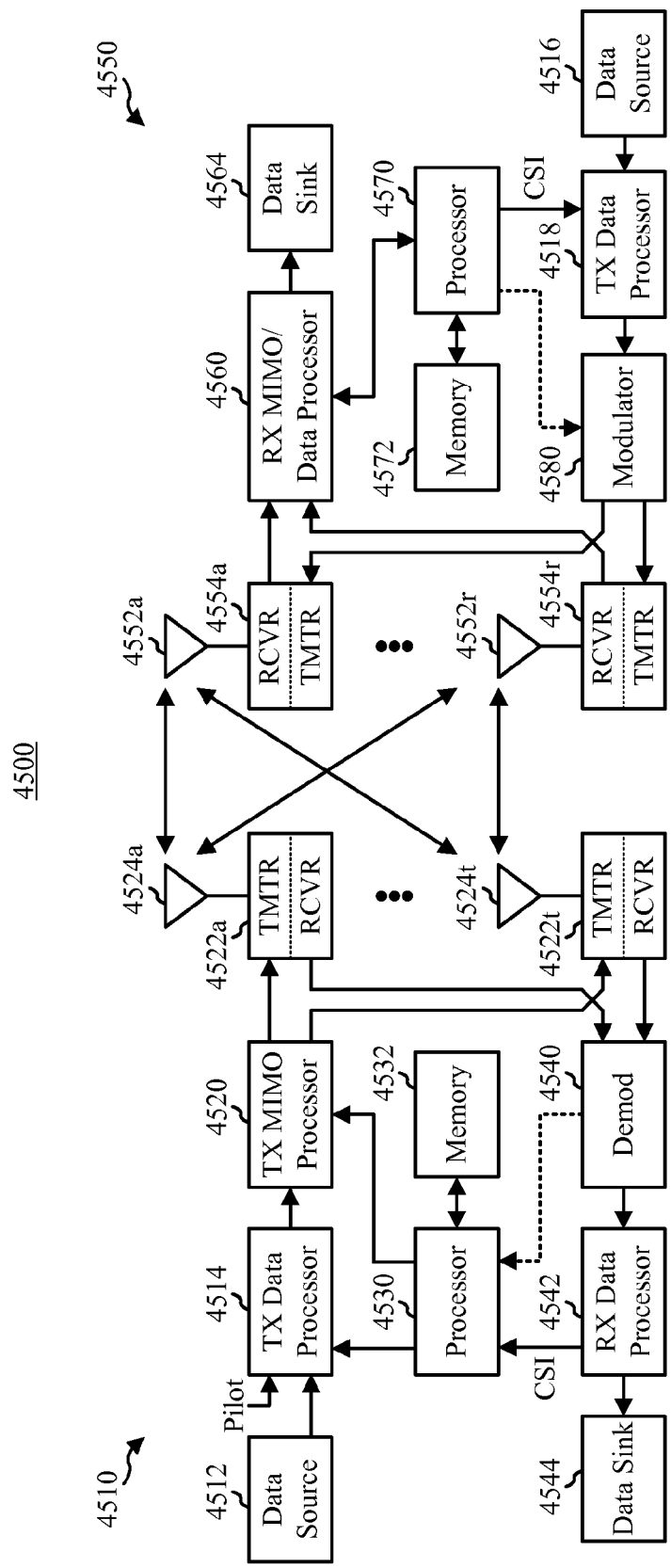
FIG. 45 is a block diagram illustrating an example wireless communication system in which various aspects described herein can function.

Referring now to FIG. 45, a block diagram illustrating an example wireless communication system 4500 in which various aspects described herein can function is provided. In one example, system 4500 is a multiple-input multiple-output (MIMO) system that includes a transmitter system 4510 and a receiver system 4550. It should be appreciated, however, that transmitter system 4510 and/or receiver system 4550 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 4510 and/or receiver system 4550 described herein could be utilized in connection with a single output to single input antenna system.

In accordance with one aspect, traffic data for a number of data streams are provided at transmitter system 4510 from a data source 4512 to a transmit (TX) data processor 4514. In one example, each data stream can then be transmitted via a respective transmit antenna 4524. Additionally, TX data processor 4514 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 4550 to estimate channel response. Back at transmitter system 4510, the multiplexed pilot and coded data for each data stream can be modulated (e.g., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 4530.

Next, modulation symbols for all data streams can be provided to a TX MIMO processor 4520, which can further process the modulation symbols (e.g., for OFDM). TX MIMO processor 4520 can then provides $N_T$ modulation symbol streams to $N_T$ transceivers 4522a through 4522t. In one example, each transceiver 4522 can receive and process a respective symbol stream to provide one or more analog signals. Each transceiver 4522 can then further condition (e.g., amplify, filter, and upconvert) the analog signals to provide a modulated signal suitable for transmission over a MIMO channel. Accordingly, $N_T$ modulated signals from transceivers 4522a through 4522t can then be transmitted from $N_T$ antennas 4524a through 4524t, respectively.

In accordance with another aspect, the transmitted modulated signals can be received at receiver system 4550 by $N_R$ antennas 4552a through 4552r. The received signal from each antenna 4552 can then be provided to respective transceivers 4554. In one example, each transceiver 4554 can condition (e.g., filter, amplify, and downconvert) a respective received signal, digitize the conditioned signal to provide samples, and then processes the samples to provide a corresponding "received" symbol stream. An RX MIMO/data processor 4560 can then receive and process the $N_R$ received symbol streams from $N_R$ transceivers 4554 based on a particular receiver processing technique to provide $N_T$ "detected" symbol streams. In one example, each detected symbol stream can include symbols that are estimates of the modulation symbols transmitted for the corresponding data stream. RX processor 4560 can then process each symbol stream at least in part by demodulating, deinterleaving, and decoding each detected symbol stream to recover traffic data for a corresponding data stream. Thus, the processing by RX processor 4560 can be complementary to that performed by TX MIMO processor 4520 and TX data processor 4514 at transmitter system 4510. RX processor 4560 can additionally provide processed symbol streams to a data sink 4564.

In accordance with one aspect, the channel response estimate generated by RX processor 4560 can be used to perform space/time processing at the receiver, adjust power levels, change modulation rates or schemes, and/or other appropriate actions. Additionally, RX processor 4560 can further estimate channel characteristics such as, for example, signal-to-noise-and-interference ratios (SNRs) of the detected symbol streams. RX processor 4560 can then provide estimated channel characteristics to a processor 4570. In one example, RX processor 4560 and/or processor 4570 can further derive an estimate of the "operating" SNR for the system. Processor 4570 can then provide channel state information (CSI), which can comprise information regarding the communication link and/or the received data stream. This information can include, for example, the operating SNR. The CSI can then be processed by a TX data processor 4518, modulated by a modulator 4580, conditioned by transceivers 4554a through 4554r, and transmitted back to transmitter system 4510. In addition, a data source 4516 at receiver system 4550 can provide additional data to be processed by TX data processor 4518.

Back at transmitter system 4510, the modulated signals from receiver system 4550 can then be received by antennas 4524, conditioned by transceivers 4522, demodulated by a demodulator 4540, and processed by a RX data processor 4542 to recover the CSI reported by receiver system 4550. In one example, the reported CSI can then be provided to processor 4530 and used to determine data rates as well as coding and modulation schemes to be used for one or more data streams. The determined coding and modulation schemes can then be provided to transceivers 4522 for quantization and/or use in later transmissions to receiver system 4550. Additionally and/or alternatively, the reported CSI can be used by processor 4530 to generate various controls for TX data processor 4514 and TX MIMO processor 4518. In another example, CSI and/or other information processed by RX data processor 4542 can be provided to a data sink 4544.

In one example, processor 4530 at transmitter system 4510 and processor 4570 at receiver system 4550 direct operation at their respective systems. Additionally, memory 4532 at transmitter system 4510 and memory 4572 at receiver system 4550 can provide storage for program codes and data used by processors 4530 and 4570, respectively. Further, at receiver system 4550, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   identifying at least one Internet Protocol (IP) flow and respective IP flow traffic format templates (TFTs) respectively associated with the at least one IP flow;
   receiving quality of service (QoS) establishment messaging from an associated network corresponding to at least one bearer and at least one bearer TFT related to respective bearers; and
   determining association between respective IP flows and the respective bearers at least in part by matching the respective IP flow TFTs to respective bearer TFTs, wherein the determining includes:
   constructing a packet header that matches the respective IP flow TFTs; and
   attempting matching of the packet header to the respective bearer TFTs.

2. The method of claim 1, wherein the receiving comprises receiving QoS establishment messaging corresponding to an inter-radio access technology (RAT) handover from a network associated with the inter-RAT handover.

3. The method of claim 1, further comprising:
   identifying a QoS requirement for an application associated with a selected IP flow;
   comparing the QoS requirement for the application associated with the selected IP flow to a QoS parameter provided within QoS establishment messaging for a bearer TFT with which the selected IP flow is associated; and
   if the QoS parameter provided within the QoS establishment messaging indicates a substantially unacceptable QoS for the application, performing one or more of releasing the selected IP flow, re-negotiating the QoS parameter with the associated network to facilitate modification of the QoS parameter such that a substantially acceptable QoS for the application is obtained, or continuing with an assigned QoS if the assigned QoS is acceptable by the application.

4. The method of claim 3, wherein the identifying a QoS requirement comprises identifying a QoS requirement provided by the application corresponding to substantially all radio access technologies (RATs) usable by the application.

5. The method of claim 3, wherein the identifying a QoS requirement comprises:
   identifying a reference QoS requirement provided by the application corresponding to a reference radio access technology (RAT) usable by the application; and
   mapping the reference QoS requirement to a QoS requirement corresponding to a RAT utilized by the associated network.

6. The method of claim 1, wherein the determining further comprises determining the respective IP flows that are associated with respective bearer TFTs in an application-independent manner.

7. The method of claim 1, wherein the determining further comprises at least one of:
   attempting detection of a substantially full match between IP flow TFTs respectively associated with the at least one IP flow and respective bearer TFTs; or
   attempting detection of at least a partial match between IP flow TFTs respectively associated with the at least one IP flow and respective bearer TFTs.

8. A wireless communications apparatus, comprising:
   a memory that stores data relating to at least one Internet Protocol (IP) flow and respective IP flow traffic format templates (TFTs) respectively associated with the at least one IP flow; and a processor configured to receive quality of service (QoS) establishment messaging from an associated network corresponding to at least one bearer and at least one bearer TFT relating to respective bearers and to determine association between respective IP flows and bearers at least in part by matching the respective IP flow TFTs to bearer TFTs, wherein the processor is further configured to construct a packet header that matches the respective IP flow TFTs and to attempt matching of IP flow TFTs to respective bearer TFTs at least in part by attempting matching of the packet header to the respective bearer TFTs.

9. The wireless communications apparatus of claim 8, wherein the processor is further configured to identify a QoS requirement for an application associated with a selected IP flow in the at least one IP flow, to compare the QoS requirement for the application associated with the selected IP flow to a QoS parameter provided within QoS establishment messaging for a bearer TFT with which the selected IP flow is associated, and, if the QoS parameter provided within the QoS establishment messaging indicates a substantially unacceptable QoS for the application, to perform one or more of releasing the selected IP flow, re-negotiating the QoS parameter with the associated network to facilitate modification of the QoS parameter such that a substantially acceptable QoS for the application is obtained, or continuing with an assigned QoS if the assigned QoS is acceptable by the application.

10. An apparatus, comprising:
    means for identifying one or more traffic format templates (TFTs) corresponding to respective packet flows;
    means for obtaining signaling from an associated network relating to quality of service (QoS) parameters corresponding to a specified bearer that is associated with a bearer TFT; and
    means for mapping one or more of the respective packet flows to the specified bearer at least in part by matching TFTs corresponding to the respective packet flows to the bearer TFT, wherein the means for mapping includes:
        means for constructing a packet header that matches the TFTs corresponding to the respective packet flows; and
        means for attempting matching of the packet header to the bearer TFTs.

11. A computer program product, comprising:
a non-transitory computer-readable medium, comprising:
code for identifying one or more traffic format templates (TFTs) corresponding to respective packet flows;
code for obtaining signaling from an associated network relating to quality of service (QoS) parameters corresponding to a specified bearer that is associated with a bearer TFT; and
code for mapping one or more of the respective packet flows to the specified bearer at least in part by matching TFTs corresponding to the respective packet flows to the bearer TFT wherein the code for causing the at least one computer to map one or more of the respective packet flows to the specified bearer includes:
    code for constructing a packet header that matches the TFTs corresponding to the respective packet flows; and
    code for matching the packet header to the bearer TFTs.

* * * * *